(12) United States Patent
Hyde et al.

(10) Patent No.: US 9,691,508 B2
(45) Date of Patent: Jun. 27, 2017

(54) SYSTEM AND METHOD FOR DETERMINING A STATE OF OPERATIONAL READINESS OF A FUEL CELL BACKUP SYSTEM OF A NUCLEAR REACTOR SYSTEM

(75) Inventors: Roderick A. Hyde, Redmond, WA (US); Clarence T. Tegreene, Bellevue, WA (US); Joshua C. Walter, Kirkland, WA (US)

(73) Assignee: TerraPower, LLC, Bellevue, WA (US)

( * ) Notice: Subject to any disclaimer, the term of this patent is extended or adjusted under 35 U.S.C. 154(b) by 1421 days.

(21) Appl. No.: 12/925,940

(22) Filed: Nov. 2, 2010

(65) Prior Publication Data
US 2012/0082284 A1 Apr. 5, 2012

Related U.S. Application Data

(63) Continuation-in-part of application No. 12/924,704, filed on Oct. 1, 2010, now abandoned, and a
(Continued)

(51) Int. Cl.
*G21C 17/00* (2006.01)
*G21D 3/00* (2006.01)
(Continued)

(52) U.S. Cl.
CPC .............. *G21D 3/001* (2013.01); *G21C 17/02* (2013.01); *G21C 17/10* (2013.01); *G21D 3/06* (2013.01);
(Continued)

(58) Field of Classification Search
None
See application file for complete search history.

(56) References Cited

U.S. PATENT DOCUMENTS 3,416,966 A 12/1968 Oswin
4,378,329 A 3/1983 Uchikawa et al.
(Continued)

FOREIGN PATENT DOCUMENTS

WO WO02/084670 10/2002

OTHER PUBLICATIONS

Hamelin, J., Agbossou, K., Laperriere, A., Laurencelle, F., Bose, T.K., Dynamic Behavior of a PEM Fuel Cell Stack for Stationary Applications, International Journal of Hydrogen Energy, Oct. 23, 2000, pp. 625-629, 2001-26, Published by Elsevier Science Ltd.
(Continued)

*Primary Examiner* — Barbara Gilliam
*Assistant Examiner* — Adam A Arciero

(57) ABSTRACT

A method for determining a state of operational readiness of a fuel cell backup system of a nuclear reactor system includes monitoring a readiness state of a fuel cell system associated with a nuclear reactor system, and providing a readiness determination of the fuel cell system by comparing the monitored state of readiness of the fuel cell system to an established operating readiness state, the established operating readiness state a function of at least one characteristic of the nuclear reactor system. An apparatus includes a fuel cell monitoring system configured to monitor a readiness state of a fuel cell system associated with a nuclear reactor system, and a readiness determination system configured to provide a readiness determination of the fuel cell system by comparing the monitored state of readiness of the fuel cell system to an established operating readiness state.

40 Claims, 34 Drawing Sheets

Related U.S. Application Data continuation-in-part of application No. 12/924,753, filed on Oct. 4, 2010, and a continuation-in-part of application No. 12/925,890, filed on Nov. 1, 2010, now abandoned.

(51) Int. Cl.

| | | |
|---|---|---|
| *G21C 17/02* | (2006.01) | |
| *G21C 17/10* | (2006.01) | |
| *G21D 3/06* | (2006.01) | |
| *H01M 8/04298* | (2016.01) | |

(52) U.S. Cl.
CPC ......... *H01M 8/04298* (2013.01); *Y02E 30/40* (2013.01); *Y02E 60/50* (2013.01)

(56) References Cited

U.S. PATENT DOCUMENTS

| | | | |
|---|---|---|---|
| 5,069,987 A | 12/1991 | Gordon | |
| 5,401,589 A | 3/1995 | Palmer et al. | |
| 5,925,476 A * | 7/1999 | Kawatsu ........... | H01M 8/04089 429/424 |
| 5,952,116 A | 9/1999 | Blum et al. | |
| 6,011,324 A | 1/2000 | Kohlstruck et al. | |
| 6,759,156 B1 | 7/2004 | Wheat et al. | |
| 6,764,782 B2 | 7/2004 | Raiser et al. | |
| 6,934,350 B1 | 8/2005 | Challberg et al. | |
| 7,250,231 B2 | 7/2007 | Edlund et al. | |
| 7,326,480 B2 | 2/2008 | Fuglevand | |
| 7,359,790 B2 | 4/2008 | Gottwick et al. | |
| 7,468,215 B2 | 12/2008 | Nielsen et al. | |
| 2002/0110714 A1 * | 8/2002 | Andrews et al. ............... | 429/24 |
| 2002/0160238 A1 * | 10/2002 | Labinov ................... | F02C 3/28 48/127.9 |
| 2002/0160242 A1 * | 10/2002 | Dagard ........................... | 429/22 |
| 2002/0177015 A1 | 11/2002 | Fuglevand | |
| 2003/0027026 A1 | 2/2003 | Bruck et al. | |
| 2003/0118876 A1 | 6/2003 | Sugiura et al. | |
| 2004/0016769 A1 | 1/2004 | Redmond | |
| 2004/0247961 A1 | 12/2004 | Edlund | |
| 2005/0112428 A1 * | 5/2005 | Freeman ............ | B60L 11/1881 429/430 |
| 2005/0136312 A1 | 6/2005 | Bourgeois et al. | |
| 2005/0287402 A1 | 12/2005 | Maly et al. | |
| 2006/0227924 A1 * | 10/2006 | Hallstadius ............... | G21C 3/07 376/414 |
| 2007/0119638 A1 | 5/2007 | Grieve | |
| 2008/0123794 A1 | 5/2008 | Mertyurek et al. | |
| 2008/0288121 A1 | 11/2008 | Fedosovskiy et al. | |
| 2008/0299429 A1 * | 12/2008 | Desrosiers et al. ............. | 429/26 |
| 2010/0151344 A1 | 6/2010 | Otomaru et al. | |
| 2010/0260309 A1 | 10/2010 | Hyde et al. | |
| 2012/0082912 A1 | 4/2012 | Hyde et al. | |
| 2012/0082913 A1 | 4/2012 | Hyde et al. | |

OTHER PUBLICATIONS

Lim, Ho-Gon, Yang, Joon-Eon, Hwang, Mee-Jeong, A Quantitative Analysis of a Risk Impact Due to a Starting Time Extension of the Emergency Diesel Generator in Optimized Power Reactor-1000, Reliability Engineering & System Safety, Sep. 7, 2006, pp. 961-970, 2007-92, Published by Elsevier Science Ltd.

PCT International Search Report; International App. No. PCT/US11/01669; Jan. 17, 2012; pp. 1-2.

PCT International Search Report; International App. No. PCT/US11/01677; Jan. 18, 2012; pp. 1-2.

PCT International Search Report; International App. No. PCT/US11/01678; Jan. 18, 2012; pp. 1-3.

Rónaky, József; "Design Requirement for Nuclear Power Plant Electric, Instrumentation and Control Systems and Components"; Jul. 2006; pp. 1-55; Version 2; Hungarian Atomic Energy Authority Nuclear Safety Directorate; Budapest.

PCT International Search Report; International App. No. PCT/US2011/001676; Jan. 11, 2012; pp. 1-2.

* cited by examiner

SYSTEM AND METHOD FOR DETERMINING A STATE OF OPERATIONAL READINESS OF A FUEL CELL BACKUP SYSTEM OF A NUCLEAR REACTOR SYSTEM

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

Related Applications:

For purposes of the USPTO extra-statutory requirements, the present application constitutes a continuation-in-part of United States Patent Application entitled SYSTEM AND METHOD FOR MAINTAINING AND ESTABLISHING OPERATIONAL READINESS IN A FUEL CELL BACKUP SYSTEM OF A NUCLEAR REACTOR SYSTEM, naming RODERICK A. HYDE, CLARENCE T. TEGREENE, AND JOSHUA C. WALTER as inventors, filed Oct. 1, 2010, Application Ser. No. 12/924,704, now abandoned, application is entitled to the benefit of the filing date.

For purposes of the USPTO extra-statutory requirements, the present application constitutes a continuation-in-part of United States Patent Application entitled SYSTEM AND METHOD FOR MAINTAINING AND ESTABLISHING OPERATIONAL READINESS IN A FUEL CELL BACKUP SYSTEM OF A NUCLEAR REACTOR SYSTEM, naming RODERICK A. HYDE, CLARENCE T. TEGREENE, AND JOSHUA C. WALTER as inventors, filed Oct. 4, 2010, Application Ser. No. 12/924,753, which is currently co-pending, or is an application of which a currently co-pending application is entitled to the benefit of the filing date.

For purposes of the USPTO extra-statutory requirements, the present application constitutes a continuation-in-part of United States Patent Application entitled SYSTEM AND METHOD FOR DETERMINING A STATE OF OPERATIONAL READINESS OF A FUEL CELL BACKUP SYSTEM OF A NUCLEAR REACTOR SYSTEM, naming RODERICK A. HYDE, CLARENCE T. TEGREENE, AND JOSHUA C. WALTER as inventors, filed Nov. 1, 2010, Application Ser. No. 12/925,890, now abandoned, application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/weekll/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present disclosure generally relates to the implementation of a fuel cell backup system in a nuclear reactor system and, more particularly, to determining the state of operational readiness of a fuel cell backup system of a nuclear reactor system.

SUMMARY

In one aspect, a method includes but is not limited to monitoring a readiness state of a fuel cell system associated with a nuclear reactor system, and providing a readiness determination of the fuel cell system by comparing the monitored state of readiness of the fuel cell system to an established operating readiness state, the established operating readiness state a function of at least one characteristic of the nuclear reactor system. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, an apparatus includes but is not limited to a fuel cell monitoring system configured to monitor a readiness state of a fuel cell system associated with a nuclear reactor system, and a readiness determination system configured to provide a readiness determination of the fuel cell system by comparing the monitored state of readiness of the fuel cell system to an established operating readiness state, the established operating readiness state a function of at least one characteristic of the nuclear reactor system. In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

DETAILED DESCRIPTION

Figure 1A:
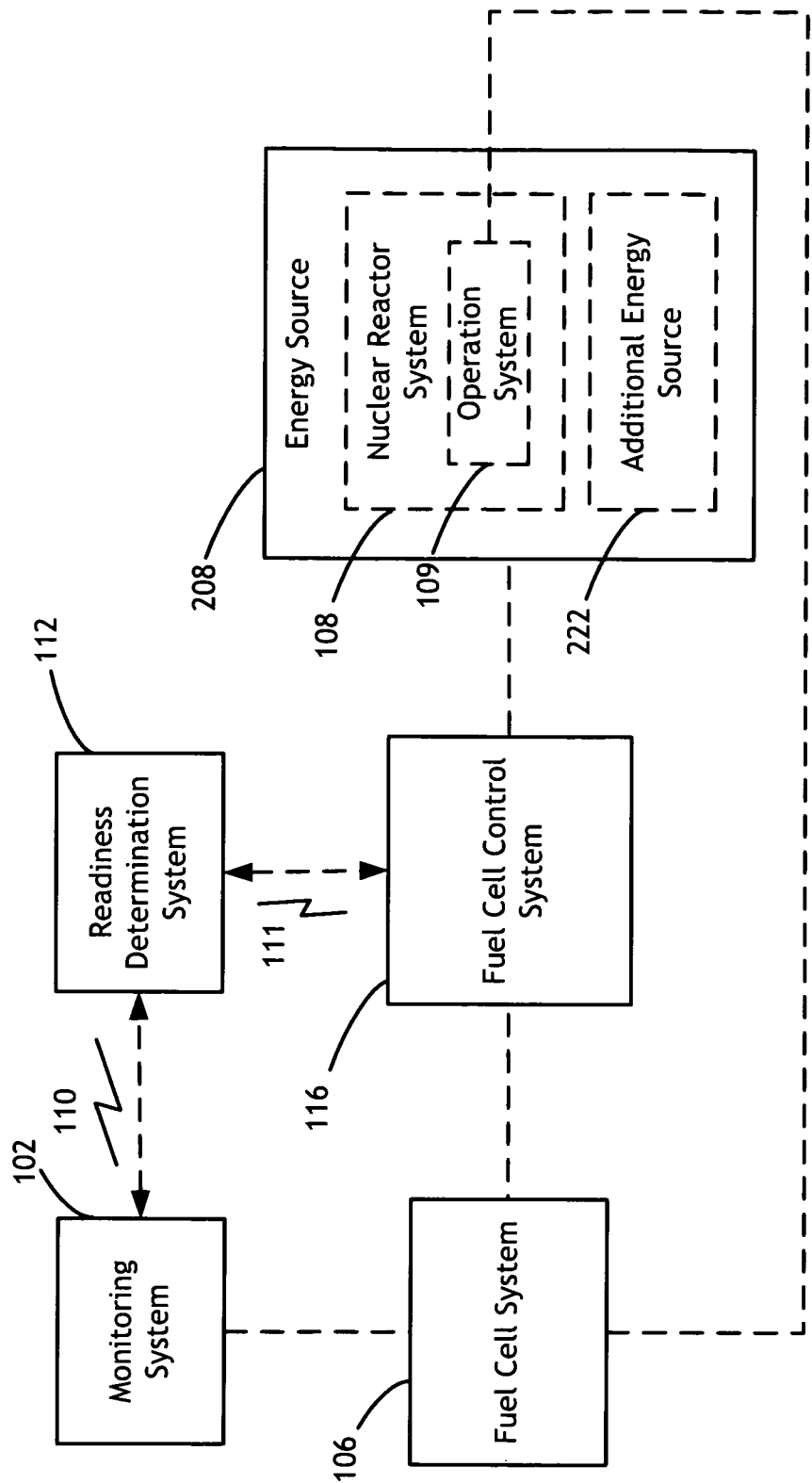
FIG. 1A is a block diagram illustrating a system for determining a state of operational readiness of a fuel cell backup system of a nuclear reactor system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to FIGS. 1A through 2L, a system 100 for determining a state of operational readiness of a fuel cell backup system of a nuclear reactor system is described in accordance with the present disclosure. One or more fuel cell monitoring systems 102 may monitor a readiness state (e.g., temperature, pressure, humidity, or electrical output) of a portion of a fuel cell system 106 associated with a nuclear reactor system 108 (e.g., fuel cell system provides backup power to an operation system 109 of the nuclear reactor system 108). Then, the monitoring system may transmit a signal 110 indicative of the state of readiness of the fuel cell system 106 to a readiness determination system 112. In response to the signal 110 transmitted by the monitoring system 102, the readiness determination system 112 may provide an operational readiness determination by comparing the monitored readiness state of the fuel cell system 106 to an established readiness state of the fuel cell system 106. The established readiness state may be a function (e.g., variable function) of one or more characteristics (e.g., operational characteristic or design characteristic) of the nuclear reactor system 108. In some embodiments, the readiness determination system 112 may transmit a signal 114 indicative of the operational readiness determination to a fuel cell control system 116. In response to the signal transmitted 114 by the readiness determination system 112, the fuel cell control system 116 may adjust one or more characteristics (e.g., characteristic of one or more individual fuel cells 122 of the fuel cell system 106) of the fuel cell system 106.

Figure 1B:
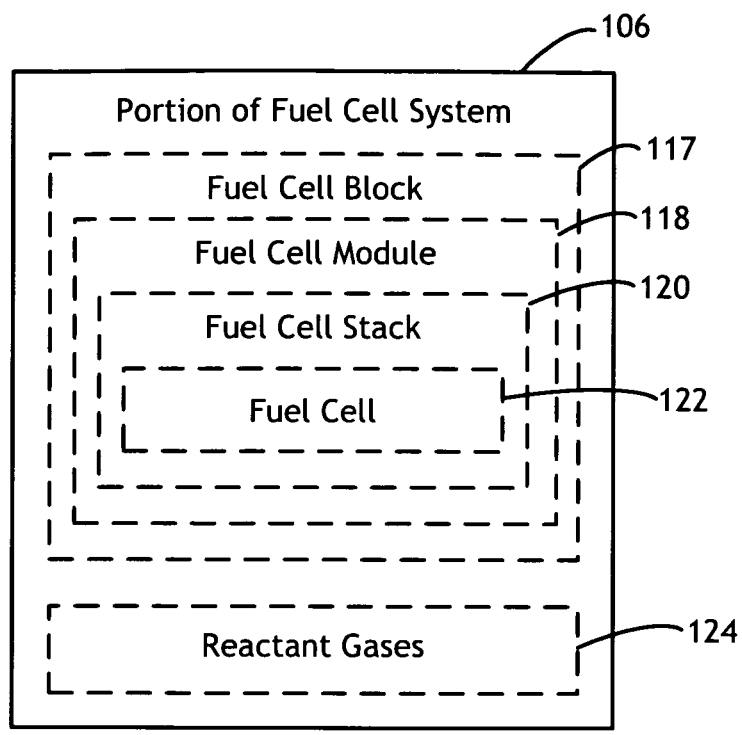
FIG. 1B is a block diagram illustrating portions of a fuel cell system that may be monitored in order to determine a state of operational readiness of a fuel cell system.

Referring now to FIG. 1B, the system 100 for providing a readiness determination may include a fuel cell monitoring system 102 configured to monitor a readiness state of the fuel cell block 117 of the fuel cell system. For example, the monitoring system 102 may monitor a readiness state of a portion of the fuel cell block 117 of a fuel cell system 106 associated with a nuclear reactor system 108. Then, the monitoring system may transmit a signal 110 indicative of the state of readiness of the fuel cell system 106 to a readiness determination system 112. In response to the signal 110 transmitted by the monitoring system 102, the readiness determination system 112 may provide an operational readiness determination by comparing the monitored readiness state of the fuel cell system 106 to an established readiness state of the fuel cell system 106.

In a further embodiment, the portion of the fuel cell block 117 may include one or more fuel cell modules 118 of the fuel cell system 106. For example, the monitoring system 102 may monitor a readiness state of a portion of one or more fuel cell modules 118 of a fuel cell system 106 associated with a nuclear reactor system 108. For instance, the fuel cell monitoring system 102 may independently monitor each fuel cell module 118 of a plurality of fuel cell modules of the fuel cell system 106. As a result, the fuel cell monitoring system 102 may monitor the state of readiness of the fuel cell system 106 by monitoring the individual fuel cell modules 118 of the fuel cell system 106. Then, the monitoring system may transmit a signal 110 indicative of the state of readiness of the fuel cell system 106 to a readiness determination system 112. Moreover, the signal indicative of the fuel cell system 106 readiness may also transmit the readiness of the individual fuel cell modules 118 of the fuel cell system 106 to a readiness determination system 112. In response to the signal 110 transmitted by the monitoring system 102, the readiness determination system 112 may provide an operational readiness determination by comparing the monitored readiness state of the fuel cell system 106 to an established readiness state of the fuel cell system 106. This operational readiness determination may include an operational readiness determination of the entire fuel cell system 106 or an operational readiness determination of the individual fuel cell system modules 118.

In a further embodiment, the portion of the fuel cell block 117 may include one or more fuel cell stacks 120 of the fuel cell system 106. For example, the monitoring system 102 may monitor a readiness state of a portion of one or more fuel cell stacks 118 of a fuel cell system 106 associated with a nuclear reactor system 108. For instance, the monitoring system 102 may monitor the temperature of the bipolar plates between two adjacent fuel cells 122 of a fuel cell stack 120. Further, the fuel cell monitoring system 102 may independently monitor each fuel cell stack 120 of one or more fuel cell modules 122 of the fuel cell system 106. The fuel cell monitoring system 102 may monitor the state of readiness of the fuel cell system 106 by monitoring the individual fuel cell stacks 120 of the fuel cell system 106. Then, the monitoring system may transmit a signal 110 indicative of the state of readiness of the fuel cell system 106 to a readiness determination system 112. Moreover, the signal indicative of the fuel cell system 106 readiness state may also transmit the readiness state of the individual fuel cell stacks 120 of the fuel cell system 106 to a readiness determination system 112. In response to the signal 110 transmitted by the monitoring system 102, the readiness determination system 112 may provide an operational readiness determination by comparing the monitored readiness state of the fuel cell system 106 to an established readiness state of the fuel cell system 106. This operational readiness determination may include an operational readiness determination of the entire fuel cell system 106 or an operational readiness determination of the individual fuel cell stacks 120 of the fuel cell system 106.

In a further embodiment, the portion of the fuel cell block 117 may include one or more fuel cells 122 of one or more fuel cell stacks 120 of the fuel cell system 106. For example, the monitoring system 102 may monitor a readiness state of a portion of one or more fuel cells 122 of a fuel cell system 106 associated with a nuclear reactor system 108. For instance, the monitoring system 102 may monitor the readiness state, such as the temperature or humidity, of a fuel cell membrane of one or more fuel cells 122 of the fuel cell system 106. In another instance, the monitoring system 102 may monitor one or more electrical characteristics, such as current output, voltage, or resistance, of one or more fuel cells 122 of the fuel cell system 106. Further, the fuel cell monitoring system 102 may independently monitor each fuel cell 122 of one or more fuel cell stacks 120 of the fuel cell system 106. The fuel cell monitoring system 102 may monitor the state of readiness of the fuel cell system 106 by monitoring the individual fuel cells 122 of the one or more fuel cell stacks 120 of the fuel cell system 106. Then, the monitoring system may transmit a signal 110 indicative of the state of readiness of the fuel cell system 106 to a readiness determination system 112. Moreover, the signal indicative of the fuel cell system 106 readiness state may also transmit the readiness state of the individual fuel cells 122 of the fuel cell system 106 to a readiness determination system 112. In response to the signal 110 transmitted by the monitoring system 102, the readiness determination system 112 may provide an operational readiness determination by comparing the monitored readiness state of the fuel cell system 106 to an established readiness state of the fuel cell system 106. This operational readiness determination may include an operational readiness determination of the entire fuel cell system 106 or an operational readiness determination of the individual fuel cells 122 of the fuel cell system 106.

In some embodiments, the portion of the fuel cell system 106 may include a reactant gas of the fuel cell system 106. For example, the monitoring system 102 may monitor a readiness state of a reactant gas 124 of a fuel cell system 106 associated with a nuclear reactor system 108. For instance, the monitoring system 102 may monitor the readiness state, such as the temperature, pressure, or humidity, of a reactant gas 124 (e.g., fuel or oxidant) of the fuel cell system 106. Then, the monitoring system may transmit a signal 110 indicative of the state of readiness of the fuel cell system 106 to a readiness determination system 112. In response to the signal 110 transmitted by the monitoring system 102, the readiness determination system 112 may provide an operational readiness determination by comparing the monitored readiness state of the fuel cell system 106 to an established readiness state of the fuel cell system 106.

Figure 1C:
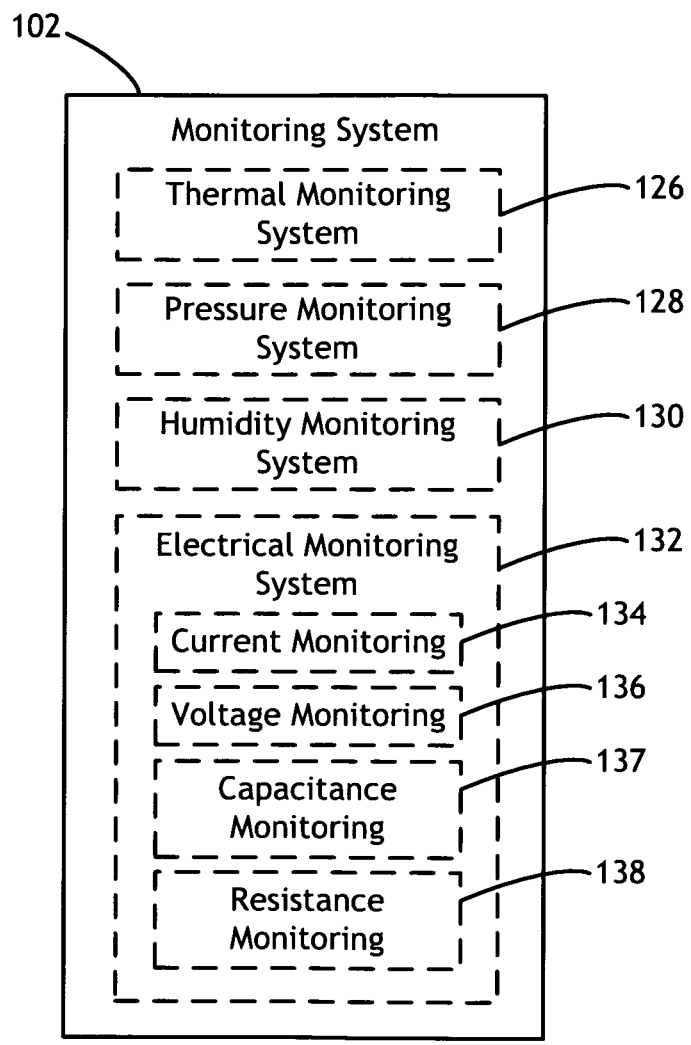
FIG. 1C is a block diagram illustrating types of monitoring systems suitable for monitoring a readiness state of a fuel cell system.

Referring now to FIG. 1C, the fuel cell monitoring system 102 may include, but is not limited to, a thermal monitoring system 126, a pressure monitoring system 128, a humidity monitoring system 130, or an electrical monitoring system 132. For example, a thermal monitoring system 126 (e.g., thermocouple device communicatively coupled to a computer controlled data management system) may monitor one or more thermal characteristics (e.g., temperature or rate of change of temperature) of a portion (e.g., portion of one or more fuel cells 104) of one or more fuel cells 122 of the fuel cell system 106 associated with a nuclear reactor system 108. For instance, the thermal monitoring system 126 may monitor the temperature of the fuel cell membrane of one or more fuel cells 122 of the fuel cell system 106. Then, the thermal monitoring system 126 may transmit a signal 110 indicative of the fuel cell membrane temperature of the one or more fuel cells 122 of the fuel cell system 106 to a readiness determination system 112. In another instance, the thermal monitoring system 126 may monitor the temperature of one or more bipolar plates of one or more fuel cells 122 of one or more fuel cell stacks 120 of the fuel cell system 106. Then, the thermal monitoring system 126 may transmit a signal 110 indicative of the temperature of one or more bipolar plates of one or more fuel cell stacks 120 of the fuel cell system 106 to a readiness determination system 112.

By way of another example, a pressure monitoring system 128 may monitor one or more pressure characteristics (e.g., pressure or rate of change of pressure) of a portion of the fuel cell system 106 associated with a nuclear reactor system 108. For instance, the pressure monitoring system 128 may monitor the pressure in one or more fuel cells 122 of the fuel cell system 106. Then, the pressure monitoring system 128 may transmit a signal 110 indicative of the fuel cell pressure of the one or more fuel cells 122 of the fuel cell system 106 to a readiness determination system 112. In another instance, the pressure monitoring system 128 may monitor the pressure of one or more of the reactant gas streams 124 (e.g., fuel stream or oxidant stream) of the fuel cell system 106. Then, the pressure monitoring system 128 may transmit a signal 110 indicative of the gas pressure of one or more of the reactants 124 of the fuel cell system 106 to a readiness determination system 112.

In another example, a humidity monitoring system 130 may monitor one or more humidity characteristics (e.g., humidity level or rate of change of humidity level) of a portion of the fuel cell system 106 associated with a nuclear reactor system 108. For instance, the humidity monitoring system 130 may monitor the humidity in one or more fuel cells 122 of the fuel cell system 106. Then, the humidity monitoring system 130 may transmit a signal 110 indicative of the humidity of the one or more fuel cells 122 of the fuel cell system 106 to a readiness determination system 112. Further, the humidity monitoring system 130 may monitor the humidity of the fuel cell membrane of one or more fuel cells 122 of the fuel cell system 106. Then, the humidity monitoring system 130 may transmit a signal 110 indicative of the humidity of the fuel cell membrane of the one or more fuel cells 122 of the fuel cell system 106 to a readiness determination system 112.

In an additional example, an electrical monitoring system 132 may monitor one or more electrical characteristics (e.g., electrical current 134, voltage 136, capacitance 137 or resistance 138, rate of change of electrical current, rate of change of voltage, or rate of change of resistance) of one or more fuel cells 122 of the fuel cell system 106 associated with a nuclear reactor system 108. For instance, the electrical monitoring system 132 may include a monitoring system 134 configured to monitor the electrical current output of one or more fuel cells 122 of the fuel cell system 106. Upon measuring the electrical current output of one or more fuel cells 122 of the fuel cell system 106, the electrical current monitoring system 134 may transmit a signal 110 indicative of the electrical current of the one or more fuel cells 122 of the fuel cell system 106 to a readiness determination system 112. In another instance, the electrical monitoring system 132 may include a monitoring system 136 configured to monitor the voltage of one or more fuel cells 122 of the fuel cell system 106. Upon measuring the voltage of one or more fuel cells 122 of the fuel cell system 106, the electrical voltage monitoring system 136 may transmit a signal 110 indicative of the voltage of the one or more fuel cells 104 of the fuel cell system 106 to a readiness determination system 112. In an additional instance, the electrical monitoring system 132 may include a monitoring system 138 configured to monitor the electrical resistance of one or more fuel cells 122 of the fuel cell system 106. Upon measuring the electrical resistance of one or more fuel cells 104 of the fuel cell system 106, the electrical resistance monitoring system 138 may transmit a signal 110 indicative of the electrical resistance of the one or more fuel cells 122 of the fuel cell system 106 to a readiness determination system 112. Further, the electrical monitoring system 132 may include a monitoring system 138 configured to monitor the capacitance of one or more fuel cells 122 of the fuel cell system 106. Upon measuring the capacitance of one or more fuel cells 122 of the fuel cell system 106, the capacitance monitoring system 137 may transmit a signal 110 indicative of the capacitance of the one or more fuel cells 122 of the fuel cell system 106 to a readiness determination system 112.

Figure 1D:
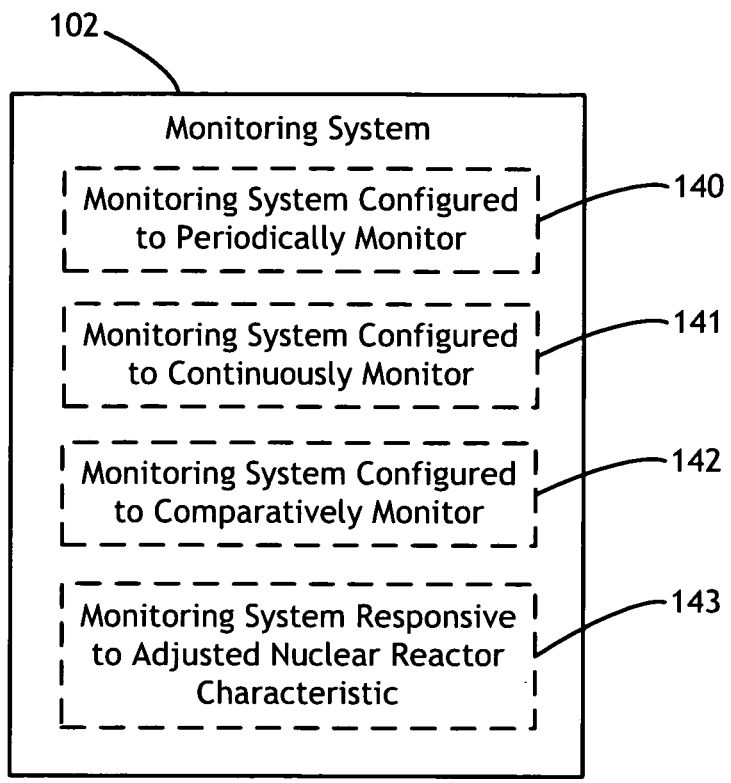
FIG. 1D is a block diagram illustrating types of monitoring systems suitable for monitoring a readiness state of a fuel cell system.

Referring now to FIG. 1D, the fuel cell monitoring system 102 may include, but is not limited to, a periodic monitoring system 140 configured to periodically monitor a readiness state of the fuel cell system 106. For example, a periodic monitoring system 140 may periodically monitor a portion of the fuel cell system 106. For instance, the temporal frequency with which the periodic monitoring system 140 monitors a portion of the fuel cell system 106 may be preselected by an operator of the fuel cell system 106. In another instance, the frequency with which the periodic monitoring system 140 monitors a portion of the fuel cell system 106 may be a function of a characteristic of the nuclear reactor system. For example, as the operating temperature of the reactor core of the nuclear reactor system 108 increases the frequency with which the periodic monitoring system 140 monitors a portion of the fuel cell control system may increase. Upon monitoring the fuel cell system 106, the periodic monitoring system 140 may transmit a signal 110 indicative of the readiness state of the fuel cell system 106 to a readiness determination system 112.

In additional embodiments, the fuel cell monitoring system 102 may include, but is not limited to, a continuous monitoring system 142 configured to continuously monitor a readiness state of the fuel cell system 106. For example, a continuous monitoring system 142 may continuously monitor a portion of the fuel cell system 106. For instance, a temperature monitoring system 126 may continuously monitor the temperature of one or more bipolar plates of one or more fuel cell stacks 120 of the fuel cell system 106. Then, the continuous monitoring system 142 may transmit one or more signals 110 indicative of the readiness state of the fuel cell system 106 to a readiness determination system 112.

In other embodiments, the fuel cell monitoring system 102 may include, but is not limited to, a comparative monitoring system 144 configured to comparatively monitor a readiness state of the fuel cell system 106. For example, a comparative monitoring system 142 may comparatively monitor a portion of the fuel cell system 106. For instance, a thermal monitoring system 126 may comparatively monitor the temperature of one or more bipolar plates of one or more fuel cell stacks 120 of the fuel cell system 106. Then, the comparative monitoring system 142 may transmit one or more signals 110 indicative of the readiness state of the fuel cell system 106 to a readiness determination system 112.

In some embodiments, the fuel cell monitoring system 102 may include, but is not limited to, a monitoring system 146 configured to monitor a readiness state of the fuel cell system in response to an adjusted characteristic of the nuclear reactor system 108. For example, a monitoring system 146 configured to monitor a readiness state of the fuel cell system 106 in response to an adjusted nuclear reactor characteristic may monitor a readiness state of the fuel cell system 106. For instance, upon adjusting the power level of the nuclear reactor system 108, a monitoring system 146 may monitor a portion of the fuel cell system 106. In another instance, upon adjusting the coolant flow of a coolant system of the nuclear reactor system 108, a monitoring system 146 may monitor a portion of the fuel cell system 106. Then, the monitoring system may transmit a signal 110 indicative of the state of readiness of the fuel cell system 106 to a readiness determination system 112. It should be recognized that the monitoring system 146 may be used to verify that a fuel cell system 106 may provide the appropriate operational readiness in the event a nuclear reactor status is changed. This allows anticipated changes to a nuclear reactor system 108 to occur only when the operator (or an operation system) can verify, using the monitoring system 146, that the fuel cell system 106 is capable of providing sufficient auxiliary power in the even of an emergency situation.

Moreover, the monitoring system 146 configured to monitor a readiness state in response to an adjusted nuclear reactor characteristic may monitor a readiness state of the fuel cell system 106 before, during, or after the characteristic of the nuclear reactor system is adjusted. For example, the monitoring system 146 configured to monitor a readiness state in response to an adjusted nuclear reactor characteristic may monitor the electrical output (e.g., electrical current output or voltage) of one or more fuel cells 122 of the fuel cell system 106 prior to an operation system 109 of the nuclear reactor system 108 adjusts a condition of the nuclear reactor system 108. For instance, prior to adjusting a characteristic of the nuclear reactor system 108, a control system of the nuclear reactor system 108 may transmit a signal to the monitoring system 102 of the fuel cell system 106 directing the monitoring system 102 to monitor a readiness state of the fuel cell system 106. Then, the monitoring system 102 may monitor the readiness state of the fuel cell system 106 and transmit that monitored readiness state to a readiness determination system 112. The readiness determination system may then provide a readiness determination of the fuel cell system 106 and transmit that readiness determination to an operation system of the nuclear reactor system 108, such as the control system. Based on the readiness determination provided by the readiness determination system 112, the control system (or the operator of the nuclear reactor system) may determine whether adjusting the characteristic of the nuclear reactor system 108 is appropriate.

Figure 1E:
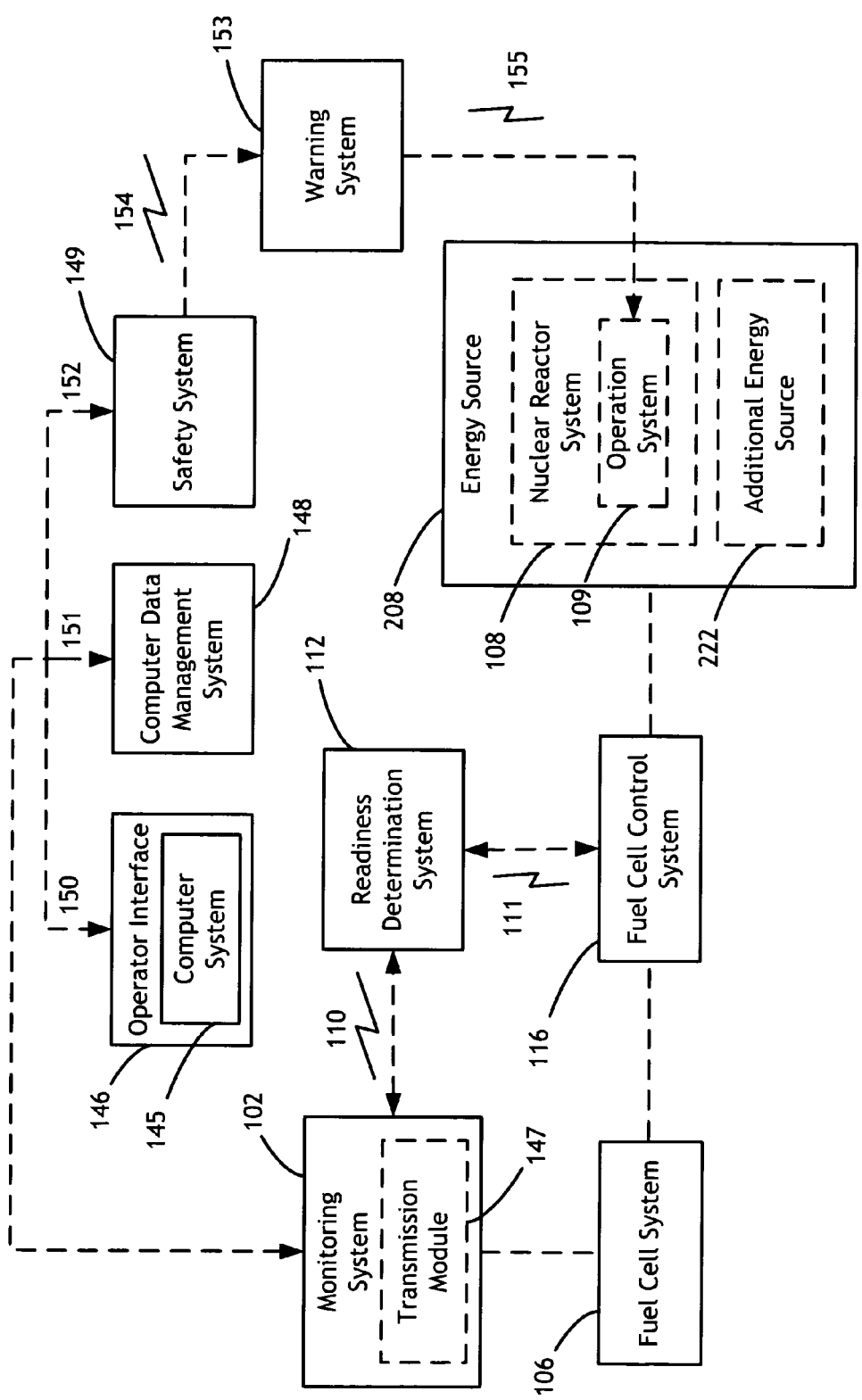
FIG. 1E is a block diagram illustrating a system for determining a state of operational readiness of a fuel cell backup system of a nuclear reactor system.

Referring now to FIG. 1E, the monitoring system 102 may be communicatively coupled to a readiness determination system 112, an operator interface system 146, a computer data management system 148 or a safety system 149 of the fuel cell system 106. For example, the monitoring system 102 may include a monitoring system transmission module 147 (e.g., a transmitter, a network port, or the like) configured to transmit a digital or analog signal 110, such as a wireline (e.g., copper wire or fiber optic line) or a wireless (e.g., radio frequency signal) signal from the monitoring system 102 to the readiness determination system 112. For instance, the monitoring system 102 may monitor a readiness state of the fuel cell system 106. Then, the monitoring system transmission module 147 may transmit a signal 110 (e.g., a signal indicative of the monitored readiness state) to the readiness determination system 112. In response to the signal 110 transmitted from the monitoring system transmission module 147, the readiness determination system 112 may provide a readiness determination of the fuel cell system 106.

By way of another example, the monitoring system 102 may include a monitoring system transmission module 147 configured to transmit a digital or analog signal 150 from the monitoring system 102 to an operator interface system 146 of the fuel cell system 106. For instance, the monitoring system 102 may monitor a readiness state of the fuel cell system 106. Then, the monitoring system transmission module 147 of the monitoring system 102 may transmit a signal 150 (e.g., a signal indicative of the monitored readiness state) to an operator controlled computer system 145 equipped with a visual or audio output device (e.g., computer terminal equipped with display system).

In an additional example, the monitoring system may include a monitoring system transmission module 147 configured to transmit a digital or analog signal 151 from the monitoring system to a computer data management system 148. For instance, the monitoring system 102 may monitor a readiness state of the fuel cell system 106. Then, the monitoring system transmission module 147 of the monitoring system 102 may transmit a signal 151 to a computer data management system 148 configured to archive the monitored readiness state data of the fuel cell system 106.

Further, the monitoring system transmission module 147 of the monitoring system 102 may transmit a signal 151 to a data management system maintained on a computer network, wherein the data management system is configured to archive the monitored readiness state data of the fuel cell system 106.

In another example, the monitoring system may include a monitoring system transmission module 147 configured to transmit a digital or analog signal 152 from the monitoring system to a safety system 149 of the fuel cell system 106. For instance, the monitoring system 102 may monitor a readiness state of the fuel cell system 106. Then, the monitoring system transmission module 147 of the monitoring system 102 may transmit a signal 152 to a safety system 149 of the fuel cell system 106.

In a further embodiment, the safety system 149 of the fuel cell system 106 may be communicatively coupled to a warning system 153 of the fuel cell system 106. For instance, the monitoring system 102 may monitor a readiness state of the fuel cell system 106. Then, the monitoring system transmission module 147 of the monitoring system 102 may transmit a signal 152 to a safety system 152 of the fuel cell system 106. In turn, the safety system 149 of the fuel cell system 106 may transmit a signal 154 to a warning system, such as an alarm system, of the fuel cell system 106.

Further, the warning system 153 communicatively coupled to the safety system 154 of the fuel cell system 106 may transmit a signal 155 to an operation system 109 of the nuclear reactor system 108. For instance, the monitoring system 102 may monitor a readiness state of the fuel cell system 106. Then, the monitoring system transmission module 147 of the monitoring system 102 may transmit a signal 152 to a safety system 149 of the fuel cell system 106. In turn, the safety system 149 of the fuel cell system 106 may transmit a signal 154 to a warning system 153, such as an alarm system, of the fuel cell system 106. Next, the warning system 153 may further transmit a signal 155 to an operation system 109, such as a warning system, a control system, a coolant system or a safety system, of the nuclear reactor system 108.

In addition, the safety system 149 of the fuel cell system 106 may transmit a signal 156 to an operator interface system 146 of the fuel cell system 106. For instance, the monitoring system 102 may monitor a readiness state of the fuel cell system 106. Then, the monitoring system transmission module 147 of the monitoring system 102 may transmit a signal 152 to a safety system 149 of the fuel cell system 106. In turn, the safety system 149 of the fuel cell system 106 may transmit a signal 154 to a warning system 153, such as an alarm system, of the fuel cell system 106. Next, the warning system 153 may transmit a signal 156 to an operator interface system 146 (e.g., computer system equipped with a visual display system) of fuel cell system 106.

It should be recognized by those skilled in the art that the monitoring system 102 may simultaneously or consecutively transmit signals to two or more of the group including, but not limited to, a readiness determination system 112, an operator interface system 146, a computer data management system 148 or a safety system 149 of the fuel cell system 106. For example, a monitoring system transmission module 147 of the monitoring system 102 may simultaneously transmit a signal to the readiness determination system 112, an operator interface system 146, a computer data management system 148 and a safety system 149 of the fuel cell system 106. By way of another example, a monitoring system transmission module 147 of the monitoring system 102 may consecutively transmit a signal to the readiness determination system 112, an operator interface system 146, a computer data management system 148 and a safety system 149 of the fuel cell system 106. For instance, a monitoring system transmission module 147 of the monitoring system 102 may first transmit a signal to the readiness determination system 112. Then, a monitoring system transmission module 147 of the monitoring system 102 may transmit a signal to the operator interface system 146. Next, a monitoring system transmission module 147 of the monitoring system 102 may transmit a signal to the computer data management system 148. Then, a monitoring system transmission module 147 of the monitoring system 102 may transmit a signal to the safety system 149 of the fuel cell system 106.

Further, the signal transmitted from the monitoring system 102 to the readiness determination system 112, an operator interface system 146, a computer data management system 148 or a safety system 149 may include, but is not limited to, the monitored readiness state of the fuel cell system 106 or a signal indicative of the monitored readiness state of the fuel cell system 106 measured by the monitoring system 102. For example, a monitoring system communication module 147 of a thermal monitoring system 126 may transmit a digital signal containing information representative of the temperature characteristics of the portion of the fuel cell system 106 monitored by the monitoring system 102 to the readiness determination system 112, an operator output system 146, a computer data management system 148, or a safety system 149.

The above description should not be interpreted as a limitation but merely an illustration as it is further contemplated that the monitoring system 102 may transmit a signal to receiving objects other than the readiness determination system 112, an operator interface system 146, a computer data management system 148 or a safety system 149.

Figure 1F:
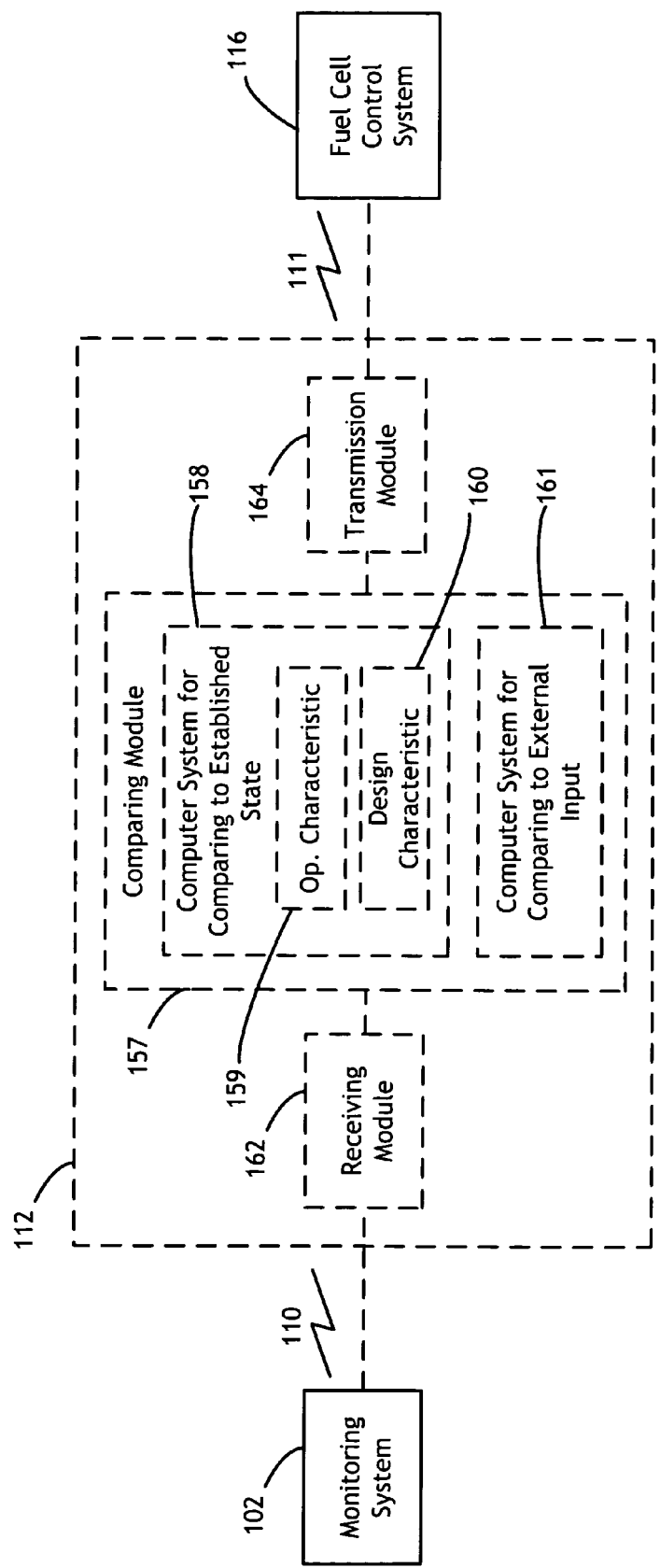
FIG. 1F is a block diagram illustrating a readiness determination system for determining a state of readiness of a fuel cell system.

Referring now to FIG. 1F, the readiness determination system 112 may include a comparing module 157 configured to compare the monitored readiness state to an established readiness state or an external input. For example, the comparing module 157 of the readiness determination system 112 may include, but is not limited to, a computer system 158 programmed to produce a readiness determination of the fuel cell system 106 by comparing the monitored state of readiness to an established state of readiness. For instance, upon receiving the signal 110 indicative of the monitored state of readiness from the monitoring system 102, a programmed computer system 158 of the readiness determination system 112 may produce a readiness determination of the fuel cell system 106 by comparing the monitored state of readiness to an established state of readiness. For example, the monitored state of readiness transmitted by the monitoring system 112 may contain information related to the present temperature of one or more of the fuel cells 122 of the fuel cell system 106. The programmed computer 158 of the readiness determination system 112 may then produce a readiness determination of the fuel cell system 106 by comparing that monitored temperature data of the fuel cells 122 of the fuel cell system 106 to an established temperature profile for the one or more fuel cells 122 of the fuel cell system 106 given the present operating state of the nuclear reactor system 108. In another instance, the monitored state of readiness transmitted by the monitoring system 102 may contain information related to the present pressure state of one or more of the reactant gases 124 of the fuel cell system 106. The programmed computer 158 of the readiness determination system 112 may then produce a readiness determination by comparing that monitored pressure state of the reactant gases 124 to an established pressure profile for the reactant gases 124 given the present operating state of the nuclear reactor system 108. It should be appreciated that the readiness determination system 112 may compare multiple operating states of the fuel cell system 106 to multiple established states of the fuel cell system 106, wherein the established states of the fuel cell system 106 are defined by one or more characteristics of the nuclear reactor system 108. For example, the monitored state of readiness may include data indicative of the temperature, pressure, and humidity of portions of the fuel cell block 117 and/or the reactant gases 124 of the fuel cell system 106. This data may then be compared by the programmed computer 158 of the readiness determination system 112 to an established operating state which provides an acceptable temperature, pressure, and humidity of portions of the fuel cell block 117 and/or the reactant gases 124 of the fuel cell system 106 under the present operating conditions of the nuclear reactor system 108.

In some embodiments, the readiness determination 112 may be communicatively coupled to the monitoring system 102 (e.g., monitoring system communication module 154) via a readiness determination system receiving module 162. For example, the readiness determination system receiving module 162 may include, but is not limited to, a receiver, a network port, or the like configured to receive a digital or analog signal 110 indicative of the monitored state of readiness transmitted by a portion of the monitoring system 102, such as transmission module 154 of the monitoring system 102. For instance, the monitoring system 102 may monitor a readiness state of the fuel cell system 106. Then, the monitoring system transmission module 147 may transmit a signal 110 (e.g., a signal indicative of the monitored readiness state) to the readiness determination system receiving module 162. Next, the readiness determination system receiving module 162 may transmit a signal 163 to a comparing module 157 (e.g., programmed comparing computer system 158) of the readiness determination system 112. In response to the signal 163 relayed from the readiness monitoring system 102 by the readiness determination system receiving module 162, the programmed computer system 158 of the comparing module 157 of the readiness determination system 112 may provide a readiness determination of the fuel cell system 106.

In additional embodiments, the readiness determination system 112 may be communicatively coupled to a fuel cell control system 116. For example, the readiness determination system 112 may include a readiness determination system transmission module 164 (e.g., a transmitter, a network port, or the like) configured to transmit a digital or analog signal 111, such as a wireline (e.g., copper wire or fiber optic line) or a wireless (e.g., radio frequency signal) signal, from the readiness determination system 112 to the fuel cell control system 116. For instance, the monitoring system 102 may monitor a readiness state of the fuel cell system 106. Then, the monitoring system transmission module 147 may transmit a signal 110 (e.g., a signal indicative of the monitored readiness state) to the readiness determination system receiving module 162. Next, the readiness determination system receiving module 162 may transmit a signal 163 to a comparing module 157 (e.g., programmed comparing computer system 158) of the readiness determination system 112. Then, the computer system 158 of the comparing module 157 of the readiness determination system 112 may provide a readiness determination by comparing the monitored readiness state to an established readiness state or an external input. The readiness determination provided by the comparing module 157 may then be relayed via a signal 165 to the transmission module 164 of the readiness determination system 112. Then, the readiness determination system transmission module 164 may transmit a signal 111 indicative of the readiness determination to the fuel cell control system 116.

It is further contemplated that the communicative coupling between the various components of the system 100 described in the preceding description may be accomplished via a digital network system. For example, the monitoring system 102, the readiness determination system 112, the fuel cell control system 116, the operator interface system 146, the computer data management system 148, the safety system 149 of the fuel cell system 106 and one or more operation systems 109 of the nuclear reactor system 108 may be communicatively coupled via a common computer communication network.

Further, it is contemplated that some components of the system 100 may be disposed in integrated circuits or printed on printed circuit boards. For instance, the receiving module 162, the comparing module 157, and the transmission module 164 of the readiness determination system 112 may all be disposed on a common printed circuit board.

In a further embodiment, the computer system 158 of the readiness determination system 112 programmed to compare the monitored readiness state to an established readiness state may include, but is not limited to, a computer system 159 programmed to compare the monitored readiness state of the fuel cell system to an established operating readiness state, wherein the established operating state is a function of an operational characteristic of the nuclear reactor system.

For example, the operational characteristic of the nuclear reactor system 108 may include, but is not limited to, an operational characteristic of the nuclear reactor core of the nuclear reactor system 108. For instance, the comparing module 157, using the programmed computer system 159, may compare the monitored readiness state of the fuel cell system 106 to an established readiness state of the fuel cell system, wherein the established readiness state is a function of an operational characteristic of the nuclear reactor core of the nuclear reactor system 108. For instance, an operational characteristic of the nuclear reactor core may include, but is not limited to, one or more thermal characteristics, such as core temperature or the rate of change of the core temperature (e.g., local or average). In another instance, the operational characteristic of the nuclear reactor core may include, but is not limited to, the power level of the nuclear reactor core or the reactivity of the nuclear reactor core. Additionally, the operational characteristic of the nuclear reactor core may include, but is not limited to, the pressure in the nuclear reactor core or the rate of change of the pressure in the nuclear reactor core. In a further example, the operational characteristic of the nuclear reactor core may include, but is not limited to, the void fraction in the nuclear reactor. In another example, the operational characteristic of the nuclear reactor core may include, but is not limited to, the projected after heat in the nuclear reactor core.

By way of another example, the operational characteristic of the nuclear reactor system 108 may include, but is not limited to, a characteristic of an operation system 109 of the nuclear reactor system 108. For instance, the comparing module 157, using the programmed computer system 159, may compare the monitored readiness state of the fuel cell system 106 to an established readiness state of the fuel cell system, wherein the established readiness state is a function of a characteristic of an operation system of the 108. Further, the operation system 109 of the nuclear reactor system 108 may include, but is not limited to, a control system of the nuclear reactor system, a coolant system of the nuclear reactor system, a shutdown system of the nuclear reactor system, a monitoring system of the nuclear reactor system, or a safety system of the nuclear reactor.

In another embodiment, the computer system 158 of the readiness determination system 112 programmed to compare the monitored readiness state to an established readiness state may include, but is not limited to, a computer system 160 programmed to compare the monitored readiness state of the fuel cell system to an established operating readiness state, wherein the established operating state is a function of a design characteristic of the nuclear reactor system 108. For instance, the comparing module 157, using the programmed computer system 160, may compare the monitored readiness state of the fuel cell system 106 to an established readiness state of the fuel cell system, wherein the established readiness state is a function of a design characteristic of the nuclear reactor core of the nuclear reactor system 108.

For example, the design characteristic of the nuclear reactor system 108 may include, but is not limited to, a design characteristic of the nuclear reactor core of the nuclear reactor system 108. For instance, the comparing module 157, using the programmed computer system 160, may compare the monitored readiness state of the fuel cell system 106 to an established readiness state of the fuel cell system, wherein the established readiness state is a function of a design characteristic of the nuclear reactor core of the nuclear reactor system 108. For example, a design characteristic of the nuclear reactor core may include, but is not limited to, the responsiveness of a safety system of the nuclear reactor system 108 to a design basis accident. A design basis accident may include, but is not limited to, loss of off-site power, reactivity initiated events (e.g., rod withdrawal), loss of flow transients (e.g., pump malfunction), or loss of coolant (e.g., guillotine break or blowdown malfunction). Further, a design characteristic may include, but is not limited to, the ability of the safety system of the nuclear reactor system 108 to reestablish coolant flow in the event of a coolant flow loss or the time necessary for the safety system to shut down the nuclear reactor core.

By way of another example, a design characteristic of the nuclear reactor core may include, but is not limited to, the time required for a fuel element of the nuclear reactor system to reach a specified temperature upon loss of coolant flow. For instance, the design characteristic may include, but is not limited to, the time necessary for a portion of a fuel pin assembly to heat to a specified temperature in the event of fuel pump malfunction. Further, the design characteristic may include the time necessary for a a collection of fuel pin assemblies to heat to a specified temperature in the event of fuel pump malfunction.

In some embodiments, the comparing module 157 of the readiness determination system 112 may include, but is not limited to, a computer system 161 programmed to compare the monitored state of readiness to an external input signal. For example, upon receiving the signal 110 indicative of the monitored state of readiness from the monitoring system 102, a programmed computer system 161 of the readiness determination system 112 may produce a readiness determination of the fuel cell system 106 by comparing the monitored state of readiness to an external input signal (e.g., signal provided by safety system of nuclear reactor system or signal produced by a computer generated simulation). For example, the monitored state of readiness transmitted by the monitoring system 112 may contain information related to the present temperature of one or more of the fuel cells 122 of the fuel cell system 106. The programmed computer 161 of the readiness determination system 112 may then produce a readiness determination of the fuel cell system 106 by comparing that monitored temperature data of the fuel cells 122 of the fuel cell system 106 to a preferred temperature profile given the present operating state of the nuclear reactor system 108 provided by an external input signal. In another instance, the monitored state of readiness transmitted by the monitoring system 102 may contain information related to the present pressure state of one or more of the reactant gases 124 of the fuel cell system 106. The programmed computer 161 of the readiness determination system 112 may then produce a readiness determination by comparing that monitored pressure state of the reactant gases 124 to a preferred pressure given the present operating state of the nuclear reactor system 108 provided by an external input signal. It should be appreciated that the readiness determination system 112 may compare multiple operating states of the fuel cell system 106 to multiple data sets provided by an external input, wherein the data sets provided by the external input are indicative of one or more characteristics of the nuclear reactor system 108. For example, the monitored state of readiness may include data indicative of the temperature, pressure, and humidity of portions of the fuel cell block 117 and/or the reactant gases 124 of the fuel cell system 106. This data may then be compared by the programmed computer 161 of the readiness determination system 112 to data provided by an external input, which provides an acceptable temperature, pressure, and humidity of portions of the fuel cell block 117 and/or the reactant gases 124 of the fuel cell system 106 under the present operating conditions of the nuclear reactor system 108.

Figure 2A:
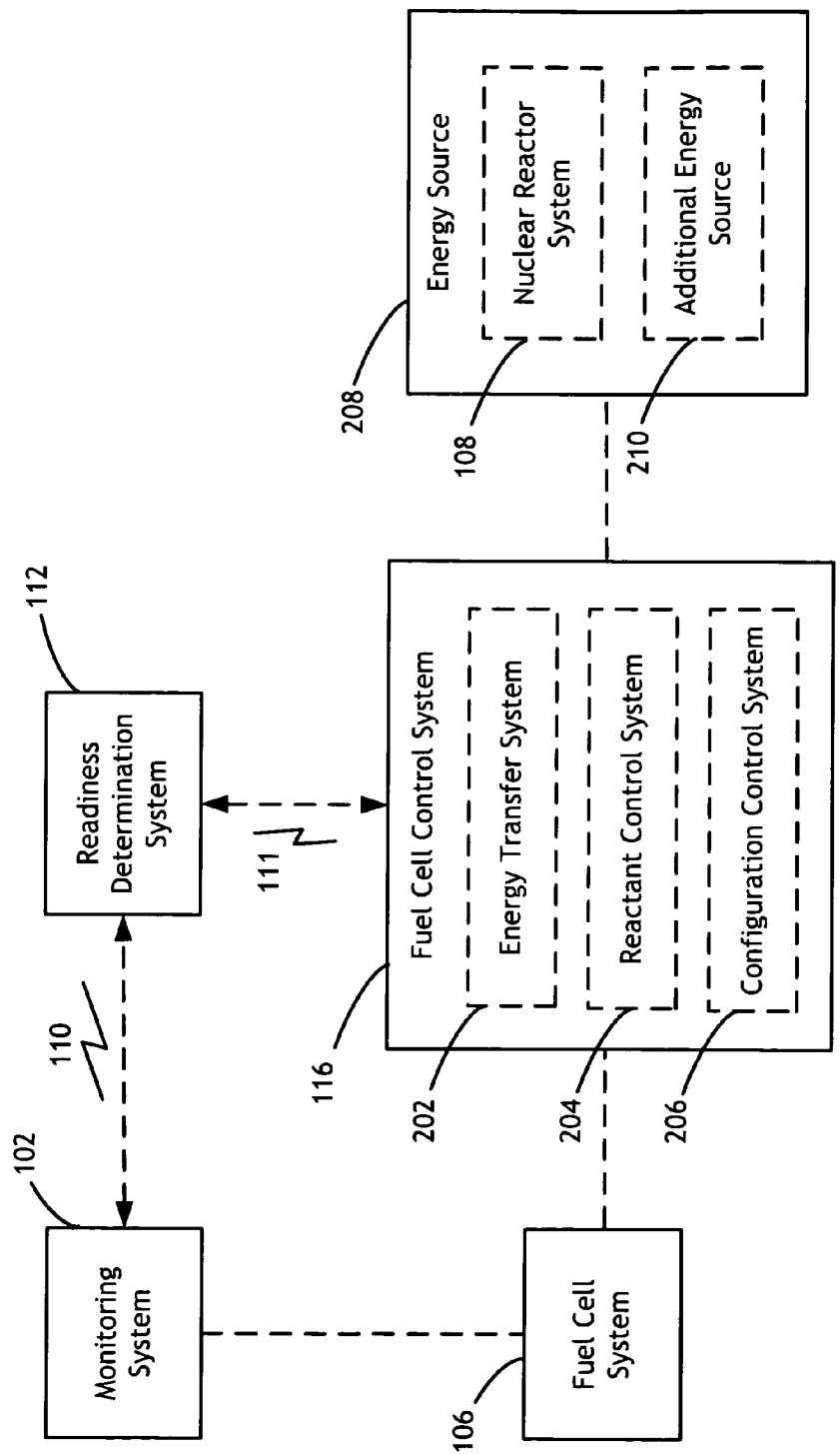
FIG. 2A is a block diagram illustrating a system for adjusting a characteristic of a fuel cell system in response to a readiness determination.
Figure 2B:
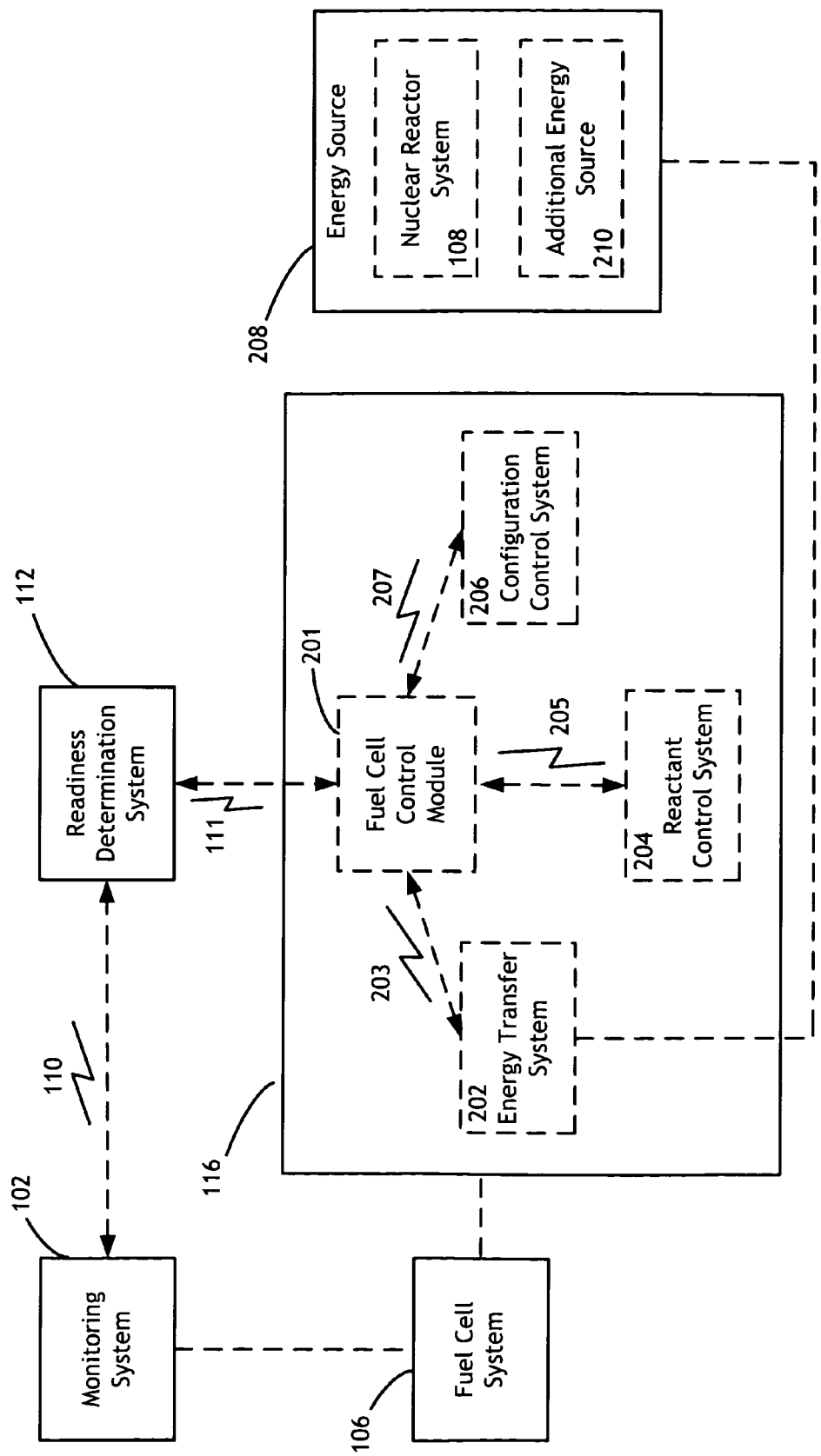
FIG. 2B is a block diagram illustrating a system for adjusting a characteristic of a fuel cell system in response to a readiness determination.

Referring now to FIGS. 2A and 2B, the fuel cell control system 116 may include a fuel cell control module 201 communicatively coupled to one or more subsystems (e.g., energy transfer system 202, reactant control system 1204, or configuration control system 206) of the fuel cell control system 116. For example, the fuel cell control system 116 may include a fuel cell control module 201 (e.g., computer controlled data management system) communicatively coupled to an energy transfer system 202 of the fuel cell control system 116 by the transmission of a digital or analog signal 203. For instance, the fuel cell control module 201 may be communicatively coupled to an energy transfer control module 234 of energy transfer system 202. In another example, the fuel cell control system 116 may include a fuel cell control module 201 communicatively coupled to a reactant control system 204 of the fuel cell control system 116 by the transmission of a digital or analog signal 205. For instance, the fuel cell control module 201 may be communicatively coupled to a reactant control module 246 of the reactant control system 204. By way of an additional example, the fuel cell control system 116 may include a fuel cell control module 201 communicatively coupled to a configuration control system 206 of the fuel cell control system 116 by the transmission of a digital or analog signal 207. For instance, the fuel cell control system 116 may include a fuel cell control module 201 communicatively coupled to a configuration control module 260 of the configuration control system 206 of the fuel cell control system 116 by the transmission of a digital or analog signal 207.

In additional embodiments, the fuel cell control module 201 of the fuel cell control system 116 may be communicatively coupled to the readiness determination system 112. For example, the fuel cell control module 201 may include a fuel cell control module configured to receive a signal 111 indicative of the readiness determination from the readiness determination system 112. For instance, the fuel cell control module 201 may include, but is not limited to, a receiver, a transmitter, one or more network ports, or the like, allowing for the fuel cell control module 201 to receive a signal 111 from the readiness determination system 112 and then subsequently transmit one or more signals to the energy transfer system 202, the reactant control system 204, or the configuration control system 206.

For example, the monitoring system 102 may monitor a readiness state of the fuel cell system 106. Then, the monitoring system transmission module 147 may transmit a signal 110 (e.g., a signal indicative of the monitored readiness state) to the readiness determination system receiving module 162. Next, the readiness determination system receiving module 162 may transmit a signal 163 to a comparing module 157 (e.g., programmed comparing computer system 158) of the readiness determination system 112. Then, the computer system 158 of the comparing module 157 of the readiness determination system 112 may provide a readiness determination by comparing the monitored readiness state to an established readiness state or an external input. The readiness determination provided by the comparing module 157 may then be relayed via a signal 165 to the transmission module 164 of the readiness determination system 112. Then, the readiness determination system transmission module 164 may transmit a signal 111 indicative of the readiness determination to the fuel cell control module 201 of the fuel cell control system 116. The fuel cell control module 201 may then transmit an instruction signal to a subsystem (e.g., energy transfer system 202, a reactant control system 204, or a configuration control system 206) of the fuel cell control system 116.

For instance, the readiness determination system 112 may provide a readiness determination of the fuel cell system 106 and then transmit a signal 111 indicative of the readiness determination to the fuel cell control system 201. In response to the transmitted signal 111 from the readiness determination system 201, the fuel cell control module 201 may transmit an instruction signal 203 to an energy transfer system 202 (e.g., energy transfer system control module 234) of the fuel cell control system 201 in order to adjust a characteristic of the fuel cell system 106.

In another instance, the readiness determination system 112 may provide a readiness determination of the fuel cell system 106 and then transmit a signal 111 indicative of the readiness determination to the fuel cell control system 201. In response to the transmitted signal 111 from the readiness determination system 201, the fuel cell control module 201 may transmit an instruction signal 205 to reactant control system 204 (e.g., reactant control module 246) of the fuel cell control system 201 in order to adjust a characteristic of the fuel cell system 106.

Further, the readiness determination system 112 may provide a readiness determination of the fuel cell system 106 and then transmit a signal 111 indicative of the readiness determination to the fuel cell control system 201. In response to the transmitted signal 111 from the readiness determination system 201, the fuel cell control module 201 may transmit an instruction signal 207 to configuration control system 206 (e.g., configuration control module 260) of the fuel cell control system 201 in order to adjust a characteristic of the fuel cell system 106.

It will be appreciated by those skilled in the art that the fuel cell control module 201 may include signal processing and computer data management hardware and/or software configured to receive a signal transmitted from the readiness determination system 112 and, based upon that signal, determine appropriate instructions (e.g., via a preprogrammed computer algorithm) for the various subsystems. Then, the fuel cell control module 201 may transmit those appropriate instructions to the required fuel cell control subsystems, such as the energy transfer system 202 (e.g., energy transfer control module 234), the reactant control system 204 (e.g., the reactant control module 246), or the configuration control system 206 (e.g., the configuration control module 260).

It will be appreciated by those skilled in the art that the communicative coupling between the fuel cell control module 201 and the fuel cell control subsystems 202-206 and the communicative coupling the between fuel cell control module 201 and the readiness determination system 112 may be achieved in various manners. For example, the described components may be communicatively coupled via a digital or analog signal transmitted along a transmission line (e.g., copper wire, coaxial cable, or fiber optic cable) or via a digital or analog wireless signal (e.g., radio frequency signal). It should also be appreciated that the communicative coupling may be achieved via a network connection, wherein the fuel cell control module 201, the readiness determination system transmission module 164, and the various subsystem control modules (i.e., energy transfer control module 234, reactant control module 204 and configuration control module 260) of the fuel cell control system 116 are communicatively coupled via a common digital network.

It should be recognized that communicative coupling described in the preceding description does not represent a limitation, but rather an illustration as one skilled in the art will appreciate that the communicative coupling between the readiness determination system 112 and the fuel cell control module 201 and the communicative coupling between the fuel cell control module 201 and the various subsystems of the fuel cell control system 116 may be achieved through a variety of configurations.

Figure 2C:
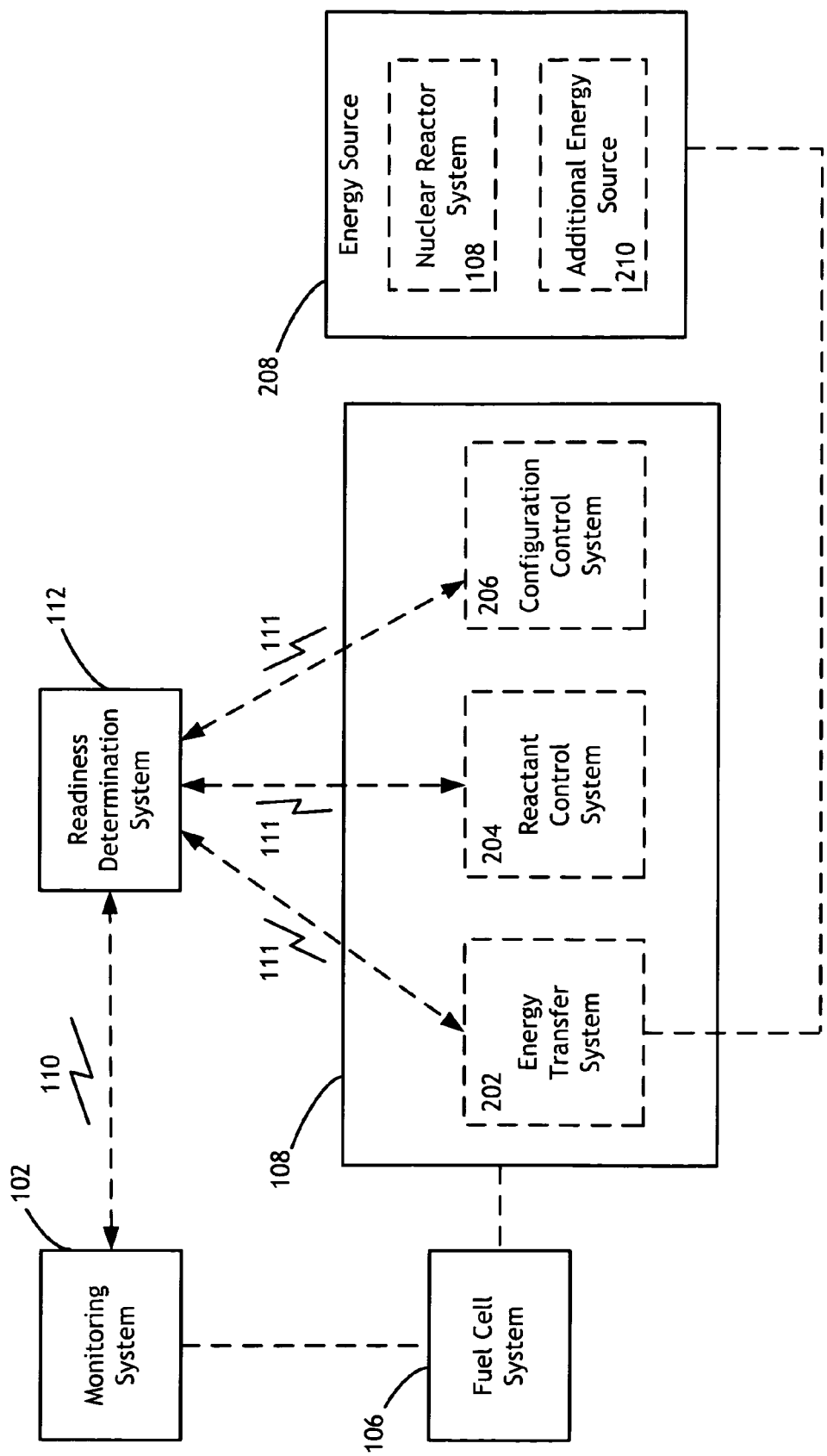
FIG. 2C is a block diagram illustrating a system for adjusting a characteristic of a fuel cell system in response to a readiness determination.

Referring now to FIG. 2C, the readiness determination system 112 may be directly communicatively coupled to a subsystem (e.g. energy transfer system 202, reactant control system 204 or configuration control system 206) of the fuel cell control system 116. For example, a monitoring system 102 may monitor a readiness state of the fuel cell system 106. Then, the monitoring system 102 may transmit a signal 110 indicative of the monitored readiness state to the readiness determination system 112. Next, the readiness determination system may provide a readiness determination by comparing the monitored readiness state to an established readiness state or an external input. Then, the readiness determination system 112 may transmit a signal 111 indicative of the readiness determination directly to an energy transfer system 202 (e.g., energy transfer control module 234) of the fuel cell control system 116. In response to the transmitted signal 111 from the readiness determination system 112, the energy transfer system 202 may transfer energy from an energy source to a portion of the fuel cell system 106 in order to adjust one or more characteristics of the fuel cell system 106.

In another example, a monitoring system 102 may monitor a readiness state of the fuel cell system 106. Then, the monitoring system 102 may transmit a signal 110 indicative of the monitored readiness state to the readiness determination system 112. Next, the readiness determination system 112 may provide a readiness determination by comparing the monitored readiness state to an established readiness state or an external input. Then, the readiness determination system 112 may transmit a signal 111 indicative of the readiness determination directly to reactant control system 204 (e.g., reactant control module 246) of the fuel cell control system 116. In response to the transmitted signal 111 from the readiness determination system 112, the reactant control system 204 may adjust one or more conditions (e.g., temperature, pressure or humidity) of one or more of the reactants (e.g., fuel or oxidant) of the fuel cell system 106 in order to adjust one or more characteristics of the fuel cell system 106. By way of an additional example, a monitoring system 102 may monitor a readiness state of the fuel cell system 106. Then, the monitoring system 102 may transmit a signal 110 indicative of the monitored readiness state to the readiness determination system 112. Next, the readiness determination system may provide a readiness determination by comparing the monitored readiness state to an established readiness state or an external input. Then, the readiness determination system 112 may transmit a signal 111 indicative of the readiness determination directly to configuration control system 206 (e.g., configuration control module 260) of the fuel cell control system 116. In response to the transmitted signal 111 from the readiness determination system 112, the configuration control system 206 may adjust the electrical configuration of the fuel cells 122 of the fuel cell system 106 in order to establish a readiness state in the fuel cell system 106. It should also be appreciated that the communicative coupling may be achieved via a network connection, wherein the readiness determination system 112, and the various subsystem control modules (i.e., energy transfer control module 234, reactant control module 246 and configuration control module 260) of the fuel cell control system 108 are connected to a common network. It should be recognized that communicative coupling described in the preceding description does not represent a limitation, but rather an illustration as one skilled in the art will appreciate that the communicative coupling between the readiness determination system 112 and the various subsystems of the fuel cell control system 116 may be achieved through a variety of configurations.

In some embodiments, the one or more characteristics of the fuel cell system 106 adjusted by the fuel cell control system 116 may include, but are not limited to, a characteristic of one or more of the fuel cells 122 of the fuel cell system 106. For example, the fuel cell control system 116 may adjust a temperature, a pressure state, a humidity level or an electrical output level within a portion of one or more of the fuel cells 122 of the fuel cell system 106. For instance, in response to the signal 111 indicative of the readiness determination transmitted by the readiness determination system 112, the fuel cell control system 116 may adjust the temperature or rate of change of temperature in one or more of the fuel cells 122 of the fuel cell system 106. By way of another example, in response to the signal 111 indicative of the readiness determination transmitted by the readiness determination system 112, the fuel cell control system 116 may adjust an electrical output level (e.g., current output level or voltage output level) in one or more of the fuel cells 122 of the fuel cell system 106.

In other embodiments, the one or more characteristics of the fuel cell system 106 adjusted by the fuel cell control system 116 may include, but is not limited to, a characteristic of one or more of the reactant gases of the fuel cell system 106. For example, the fuel cell control system 116 may adjust a temperature, a pressure, a humidity level, or a flow rate in the fuel stream or oxidant stream (e.g., air or reservoir supplied oxidant) of the fuel cell system 106. For instance, in response to the signal 111 indicative of the readiness determination transmitted by the readiness determination system 112, the fuel cell control system 116 may adjust a temperature in one or both of the reactant gases of the fuel cell system 106. In another instance in response to the signal 111 indicative of the readiness determination transmitted by the readiness determination system 112, the fuel cell control system 116 may adjust a flow rate in one or both of the reactant gases of the fuel cell system 106.

Referring now to FIGS. 2A through 2H, the fuel cell control system 116 may include an energy transfer system 202 configured to transfer energy from one or more energy sources 208 (e.g., nuclear reactor system 108 or an additional energy source 210) to a portion of the fuel cell system 106. For example, a fuel cell monitoring system 102 may monitor a readiness state of the fuel cell system 106. Then, the fuel cell monitoring system 102 may transmit a signal 110 indicative of the monitored state of readiness of the fuel cell system 106 to the readiness determination system 112. The readiness determination system may provide a readiness determination by comparing the monitored state of readiness to an established state of readiness or an external input. Then, the readiness determination system 112 may transmit a signal 111 indicative of the readiness determination to the fuel cell control system 116. In response to the signal 111 transmitted by the readiness determination system 112, the fuel cell control system 116 using an energy transfer system 202 configured to transfer energy from an energy source 208 to a portion of the fuel cell system 106 may adjust a characteristic of the fuel cell system 106 by transferring energy (e.g., thermal energy or electrical energy) from an energy source 210 (e.g., portion of the nuclear reactor system 108 or an additional energy source 10210) to a portion (e.g., a conditioning system 228 or portion of the fuel cell system block 117) of the fuel cell system 106.

Figure 2D:
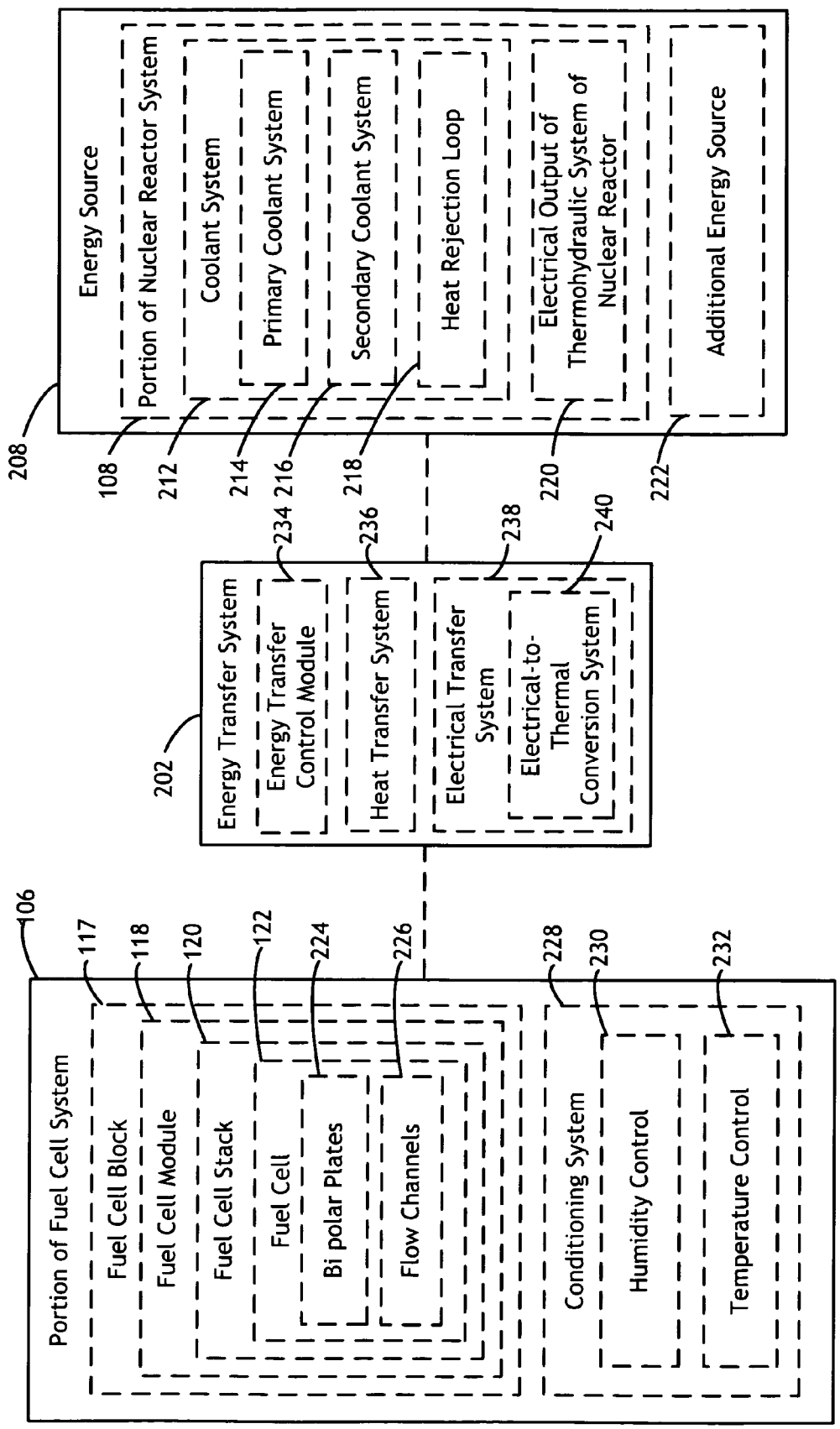
FIG. 2D is a block diagram illustrating an energy transfer system for transferring energy from an energy source to a fuel cell system.

Referring now to FIG. 2D, the energy source 208 may include, but is not limited to, a portion of the nuclear reactor system 108 associated with the fuel cell system 106. For example, in response to the signal 111 indicative of the readiness determination transmitted by the readiness determination system 112, the energy transfer system 202 of the fuel cell control system 116 may transfer energy from a portion of the nuclear reactor system 108 to a portion of the fuel cell system 106 in order to adjust a characteristic of the fuel cell system 106.

In a further embodiment, the portion of the nuclear reactor system 108 may include, but is not limited to, a portion of a coolant system 212 of the nuclear reactor system 108. For example, in response to the signal 111 indicative of the readiness determination transmitted by the readiness determination system 112, the energy transfer system 202 of the fuel cell control system 116 may transfer energy from a portion of the coolant system 212 of the nuclear reactor system 108 to a portion of the fuel cell system 106 in order to adjust a characteristic of the fuel cell system 106.

In some embodiments, the coolant system may include a primary coolant system 214 of the nuclear reactor system 108. For example, in response to the signal 111 indicative of the readiness determination transmitted by the readiness determination system 112, the energy transfer system 202 of the fuel cell control system 116 may transfer energy from a portion of the primary coolant system 214 (e.g., primary coolant loop), of the nuclear reactor system 108 to a portion of the fuel cell system 106 in order to adjust a characteristic of the fuel cell system 106.

In another embodiment, the coolant system 212 may include a secondary coolant system 216 of the nuclear reactor system 108. For example, in response to the signal 111 indicative of the readiness determination transmitted by the readiness determination system 112, the energy transfer system 202 of the fuel cell control system 116 may transfer energy from a portion of the secondary coolant system 216 (e.g., secondary coolant loop) of the nuclear reactor system 108 to a portion of the fuel cell system 106 in order to adjust a characteristic of the fuel cell system 106.

In another embodiment, the coolant system 212 may include a waste heat rejection loop 218 of the nuclear reactor system 108. For example, in response to the signal 111 indicative of the readiness determination transmitted by the readiness determination system 112, the energy transfer system 202 of the fuel cell control system 116 may transfer energy from a portion of the waste heat rejection loop 218 (e.g., waste heat rejection loop transferring heat to cooling towers of the nuclear reactor system 108) of the nuclear reactor system 108 to a portion of the fuel cell system 106 in order to adjust a characteristic of the fuel cell system 106.

In a further embodiment, the portion of the nuclear reactor system 108 may include, but is not limited to, an electrical output of a thermohydraulic system 220 of the nuclear reactor system 108. For example, in response to the signal 111 indicative of the readiness determination transmitted by the readiness determination system 112, the energy transfer system 202 of the fuel cell control system 116 may transfer energy from an electrical output of a thermohydraulic system 220 (e.g., electrical output of a generator coupled to a turbine of the nuclear reactor system) of the nuclear reactor system 108 to a portion of the fuel cell system 106 in order to adjust a characteristic of the fuel cell system 106. It will be appreciated by those skilled in the art that electricity supplied from an external electrical power 'grid' to a portion of the fuel cell system 106 in fact represents electricity supplied, in part, by a turbine-generator system of the nuclear reactor system 108 in contexts wherein the nuclear reactor system 108 supplies electricity to the external power grid. Therefore, supplemental electrical power (e.g., power used to maintain or establish temperature in the fuel cell system 106) that is transferred from the external electrical grid to a portion of the fuel cell system 106 (e.g., temperature control system) is in fact, at least in part, supplied by the nuclear reactor system 108.

In another embodiment, the energy source 208 may include, but is not limited to, an additional energy source 222. For example, in response to the signal 111 indicative of the readiness determination transmitted by the readiness determination system 112, the energy transfer system 202 of the fuel cell control system 116 may transfer energy from a portion of an additional non-nuclear energy source 222 to a portion of the fuel cell system 106 in order to adjust a characteristic of the fuel cell system 106.

In a further embodiment, the additional energy source 222 may include, but is not limited to, a non-nuclear thermohydraulic electrical generator system. For example, in response to the signal 111 indicative of the readiness determination transmitted by the readiness determination system 112, the energy transfer system 202 of the fuel cell control system 116 may transfer energy from an electrical output of a non-nuclear powered electrical generator (e.g., diesel powered generator or coal powered generator) to a portion of the fuel cell system 106 in order to adjust a characteristic of the fuel cell system 106.

In another embodiment, the additional energy source 222 may include, but is not limited to, an energy storage system.

For example, in response to the signal 111 indicative of the readiness determination transmitted by the readiness determination system 112, the energy transfer system 202 of the fuel cell control system 116 may transfer energy from an energy storage system (e.g., electrical battery, electrical capacitor, or thermal storage system) to a portion of the fuel cell system 106 in order to adjust a characteristic of the fuel cell system 106.

Referring again to FIG. 2D, the portion of the fuel cell system 106 may include, but is not limited to, the fuel cell block 117 of the fuel cell system 106. For example, in response to the signal 111 indicative of the readiness determination transmitted by the readiness determination system 112, the energy transfer system 202 of the fuel cell control system 116 may transfer energy from an energy source 208 to a portion of the fuel cell block 117 of the fuel cell system 106 in order to adjust a characteristic of the fuel cell system 106. For instance, energy may be transferred from a portion of the nuclear reactor system 108 to the fuel cell block 117 of the fuel cell system 106 in order to establish a desired operating temperature of the fuel cell system 106.

In a further embodiment, the portion of the fuel cell block 117 may include one or more fuel cell modules of the fuel cell system 106. For example, in response to the signal 111 indicative of the readiness determination transmitted by the readiness determination system 112, the energy transfer system 202 of the fuel cell control system 116 may transfer energy from an energy source 208 to one or more fuel cell modules 118 of the fuel cell system 106 in order to adjust a characteristic of the fuel cell system 106. For instance, energy may be transferred from a portion of the nuclear reactor system 108 to a portion of a fuel cell module 118 of the fuel cell system 106 in order to establish a desired operating temperature of the fuel cell system 106

In a further embodiment, the portion of the fuel cell block 117 may include one or more fuel cell stacks of the fuel cell system 106. For example, in response to the signal 111 indicative of the readiness determination transmitted by the readiness determination system 112, the energy transfer system 202 of the fuel cell control system 116 may transfer energy from an energy source 208 to a portion of one or more individual fuel cell stacks 120 of the fuel cell system 106 in order to adjust a characteristic of the fuel cell system 106. For instance, energy may be transferred from a portion of the nuclear reactor system 108 to a portion of a fuel cell stack 118 of the fuel cell system 106 in order to establish a desired operating temperature of the fuel cell system 106.

In further embodiment, the portion of the fuel cell block 117 may include one or more individual fuel cells 122 of one or more fuel cell stacks 120 of the fuel cell block 117. For example, in response to the signal 111 indicative of the readiness determination transmitted by the readiness determination system 112, the energy transfer system 202 of the fuel cell control system 116 may transfer energy from an energy source 208 to a portion of one or more individual fuel cells of a fuel cell stack 120 of the fuel cell system 106 in order to adjust a characteristic of the fuel cell system 106. For instance, energy may be transferred from a portion of the nuclear reactor system 108 to the individual fuel cells 122 of the fuel cell system 106 in order to establish a desired operating temperature of the fuel cell system 106. It will be recognized by those skilled in the art that heating individual fuel cell stacks 120 and individual fuel cells 122 allows for more precise control of local thermal conditions within the fuel cell system 106 than a global heating system.

In a further embodiment, the portion of a fuel cell 122 may include, but is not limited to, the bipolar plates 124 of a fuel cell 122 of the fuel cell system 106. For example, in response to the signal 111 indicative of the readiness determination transmitted by the readiness determination system 112, the energy transfer system 202 of the fuel cell control system 116 may transfer energy from an energy source 208 to one or more bipolar plates 224 of one or more fuel cells 122 in a fuel cell stack 120 of the fuel cell system 106 in order to adjust a characteristic of the fuel cell system 106. For instance, thermal energy may be transferred from a portion of the heat rejection loop 218 of the nuclear reactor system 108 to the bipolar plates 224 of one or more fuel cells 122 of one or more fuel cell stacks 120 of the fuel cell system 106 in order to establish a desired operating temperature of the fuel cell system 106. In another instance, thermal energy may be transferred from a portion of primary coolant system 214 of the nuclear reactor system 108 to the bipolar plates 224 of one or more fuel cells 122 of one or more fuel cell stacks 120 of the fuel cell system 106 in order to establish a desired operating temperature of the fuel cell system 106.

Further, the energy transfer system 202 of the fuel cell control system 116 may transfer thermal energy from an energy source 108 to the flow channels 226 of the bipolar plates 224 of one or more fuel cells 122 of one or more fuel cell stacks 120 of the fuel cell system 106 in order to adjust a characteristic of the fuel cell system 106. For instance, thermal energy may be transferred from a portion of the heat rejection loop 218 of the nuclear reactor system 106 to the flow channels 226 of the bipolar plates 224 of one or more fuel cells 122 of the fuel cell system 106 in order to establish a desired operating temperature of the fuel cell system 106.

It will be appreciate by those skilled in the art that energy may be transferred from an energy source 108 to the fuel cell system 106 in various ways. For instance, electrical energy from an electrical output of the reactor-generator system may be transferred to an electrical heater in thermal communication with a portion of the fuel cell system 106 in order to establish a desired fuel cell operating temperature. In another instance, a heat transfer system 236 may transfer thermal energy directly from a portion of the nuclear reactor system 108 to a portion of the fuel cell system 106 in order to establish a desired fuel cell operating temperature. The preceding description is not to be construed as a limitation but rather merely an illustration as it is recognized that the preferred mechanism for energy transfer is dependent upon the specific context the present invention is implemented.

In another embodiment, the portion of the fuel cell system 106 may include a conditioning system 228 of the fuel cell system 106. For example, in response to the signal 111 indicative of the readiness determination transmitted by the readiness determination system 112, the energy transfer system 202 of the fuel cell control system 116 may transfer energy from an energy source 208 to one or more conditioning systems 228 of the fuel cell system 106 in order to adjust a characteristic of the fuel cell system 106. For instance, the conditioning system 228 may use the thermal or electrical energy transferred from the energy source 208 to adjust the conditions of the fuel cell system 106.

In a further embodiment, the condition system 228 may include a humidity control system 230 of the fuel cell system 106. For example, in response to the signal 111 indicative of the readiness determination transmitted by the readiness determination system 112, the energy transfer system 202 of the fuel cell control system 116 may transfer energy from an energy source 208 to a humidity control system 230 of the fuel cell system 106 in order to adjust the humidity level in the reactant gas stream or a fuel cell membrane of one or more fuel cells 122 of the fuel cell system 106. For instance, the humidity control system 230 (e.g., humidifier) may use the thermal energy transferred from the energy source 108 to adjust the humidity level in the reactant gas (e.g., fuel or oxidant) in order to adjust an overall operating state of the fuel cell system 106. In another instance, the humidity control system 230 may use the thermal energy transferred from the energy source 108 to adjust the humidity level in the fuel cell membrane of one or more fuel cells 122 of the fuel cell system 106 in order to adjust an overall operating state of the fuel cell system 106.

In another embodiment, the conditioning system 228 may include a temperature control system 232 of the fuel cell system 106. For example, in response to the signal 111 indicative of the readiness determination transmitted by the readiness determination system 112, the energy transfer system 202 of the fuel cell control system 116 may transfer energy from an energy source 208 to a temperature control system 232 of the fuel cell system 106 in order to adjust the temperature in a portion the fuel cell system 106. For instance, the temperature control system 232 (e.g., temperature control feedback system) may use the energy transferred from the energy source 108 to adjust the temperature of a portion (e.g., reactant gas, bipolar plates, or fuel cell membrane) of the fuel cell system 106 in order to adjust the temperature of a portion of the fuel cell system 106 in order to adjust an overall operating state of the fuel cell system 106.

Referring again to FIG. 2D, the energy transfer system 202 of the fuel cell control system 116 may include a heat transfer system 236 configured to transfer thermal energy from one or more energy sources 108 to a portion of the fuel cell system 106. For example, in response to the signal 111 indicative of the readiness determination transmitted by the readiness determination system 112, the heat transfer system 236 configured to transfer thermal energy from one or more energy sources 108 to a portion of the fuel cell system 106 may adjust a characteristic of the fuel cell system 106 by transferring thermal energy from a portion of the nuclear reactor system 108 (e.g., heat rejection loop, portion of the primary coolant system or portion, of secondary coolant system) to a portion of the fuel cell system 106, such as the bipolar plates 224 of one or more of fuel cells 22, the flow channels 226 of one or more fuel cells 122, or one or more conditioning systems 228 (e.g., humidity control system 230 or temperature control system 232).

Further, the heat transfer system 236 of the fuel cell control system 116 may be configured to transfer thermal energy from an energy source 108 to a portion of the fuel cell system 106 via thermal convection (e.g., natural convection or forced convection via fluid pumps(s)). Additionally, the heat transfer system 236 of the fuel cell control system 116 may be configured to transfer thermal energy from an energy source 108 to a portion of the fuel cell system 106 via thermal conduction. It will be appreciated by those skilled in the art that the heat transfer system 236 may be configured to transfer thermal energy from a portion of an energy source 108 to the fuel cell system 106 using both thermal conduction and thermal convection.

Referring now to FIGS. 2D through 1H, the heat transfer system 236 may include a heat supply loop 242. For example, in response to the signal 111 indicative of the readiness determination transmitted by the readiness determination system 112, the heat transfer system 236 of the fuel cell control system 108 may adjust a characteristic of the fuel cell system 106 by transferring thermal energy from an energy source 103 to a portion of the fuel cell system 106 using one or more heat supply loops 242. For instance, as illustrated in FIG. 2E, in response to the signal 111 indicative of the readiness determination transmitted by the readiness determination system 112, the heat transfer system 236 of the fuel cell control system 116 may adjust a characteristic of the fuel cell system 106 by transferring thermal energy from a portion of the nuclear reactor system 108 (e.g., waste heat rejection loop 218, primary coolant system 214 or secondary coolant system 216) to a portion of the fuel cell system 106 (e.g., conditioning system 228 or bipolar plates 224 of a fuel cell 122) using one or more heat supply loops 242.

Figure 2E:
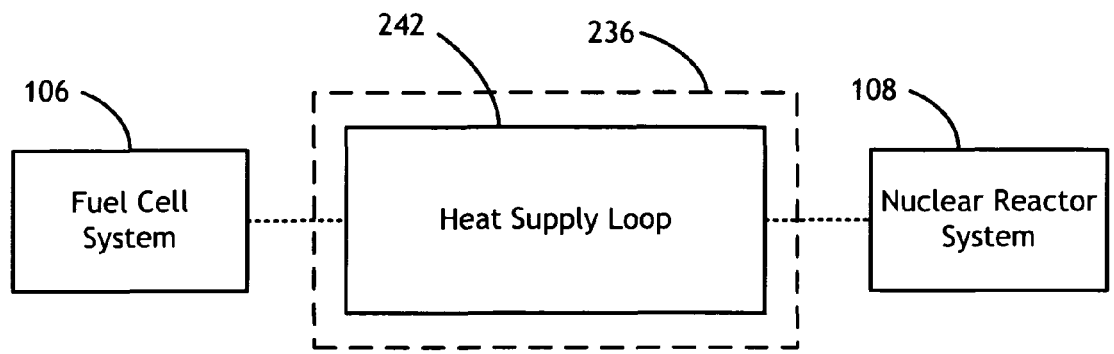
FIG. 2E is a block diagram illustrating a heat transfer system for transferring thermal energy from an energy source to a fuel cell system.

In a further embodiment, illustrated in FIG. 2E, the heat supply loop 242 may comprise a heat supply loop 242 having a first portion in thermal communication with a portion of the nuclear reactor system 108 (e.g., primary coolant loop, secondary coolant loop, or a heat rejection loop) and a second portion in thermal communication with a portion of the fuel cell system 106 (e.g., condition system 228 or portion of fuel cell block 117). For instance, in response to the signal 111 indicative of the readiness determination transmitted by the readiness determination system 112, the heat transfer system 236 of the fuel cell control system 116 may adjust a characteristic of the fuel cell system 106 by transferring thermal energy from a portion of the nuclear reactor system 108 to a portion of the fuel cell system 106 using one or more heat supply loops 242 having a first portion in thermal communication with a heat rejection loop 218 of the nuclear reactor system 108 and a second portion in thermal communication with the bipolar plates 224 of one or more fuel cells 122 of the fuel cell system 106.

In another instance, in response to the signal 111 indicative of the readiness determination transmitted by the readiness determination system 112, the heat transfer system 236 of the fuel cell control system 116 may adjust a characteristic of the fuel cell system 106 by transferring thermal energy from a portion of the nuclear reactor system 108 to a portion of the fuel cell system 106 using one or more heat supply loops 242 having a first portion in thermal communication with a heat rejection loop 218 of the nuclear reactor system 108 and a second portion in thermal communication with a conditioning system 228 of the fuel cell system 108.

Figure 2F:
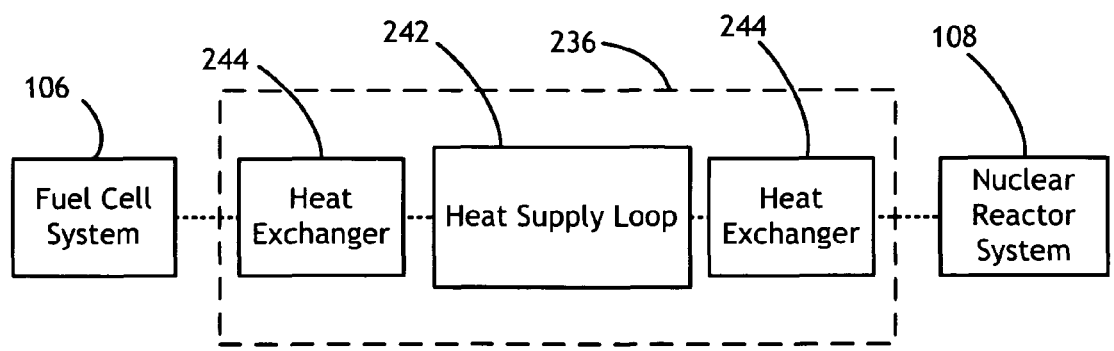
FIG. 2F is a block diagram illustrating a heat transfer system for transferring thermal energy from an energy source to a fuel cell system.

In another embodiment, illustrated in FIG. 2F, the heat transfer system 236 may include one or more heat exchangers 244. For example, in response to the signal 111 indicative of the readiness determination transmitted by the readiness determination system 112, the heat transfer system 236 of the fuel cell control system 116 may adjust a characteristic of the fuel cell system 106 by transferring thermal energy from an energy source 103 to a portion of the fuel cell system 106 using one or more heat exchangers 244. For instance, the heat exchanger 244 may comprise a heat exchanger having a first portion in thermal communication with a portion of the nuclear reactor system 108 (e.g., primary coolant loop) and a second portion in thermal communication with a portion of the fuel cell system 106 (e.g., flow channels 226 of one or more fuel cells 122).

In a further embodiment, the heat transfer system 236 of the fuel cell control system 108 may include a combination of one or more heat exchange loops 242 and one or more heat exchangers 244. For example, as illustrated in FIG. 2F, a first portion of a first heat exchanger 244 may be in thermal communication with a portion of the nuclear reactor system 108, while a second portion of the first heat exchanger 244 may be in thermal communication with a heat supply loop 242. Further, a first portion of a second heat exchanger 244 may be in thermal communication with a portion of the fuel cell system 106, while a second portion of the second heat exchanger 244 may be in thermal communication with the heat supply loop 242. Collectively, the first heat exchanger-heat supply loop-second heat exchanger system acts to transfer thermal energy from a portion of the nuclear reactor system 108 to a portion of the fuel cell system 106 in order to adjust a characteristic of the fuel cell system 106 in response to the signal 111 indicative of the readiness determination transmitted by the readiness determination system 112 to the fuel cell control system 116.

Figure 2G:
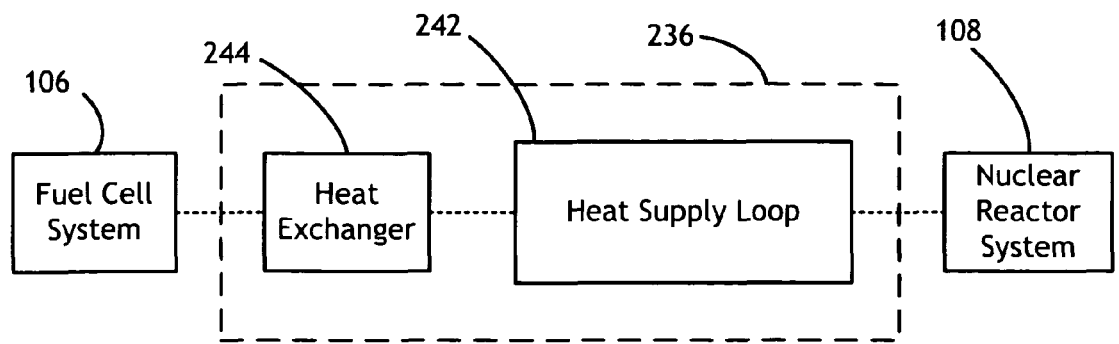
FIG. 2G is a block diagram illustrating a heat transfer system for transferring thermal energy from an energy source to a fuel cell system.

By way of another example, illustrated in FIG. 2G, a first portion of a heat exchanger 244 may be in thermal communication with a portion of the nuclear reactor system 108, while a second portion of the heat exchanger 244 may be in thermal communication with a first portion of the heat supply loop 242. In addition, a second portion of the heat supply loop 242 may be in direct thermal communication with a portion of the fuel cell system 106 with no interposed heat exchanger. For instance, the second portion of the heat supply loop 242 may be coupled to a portion of the fuel cell system 106 so that the heat supply loop fluid may be in direct thermal communication (i.e., heat supply fluid is allowed to flow through a portion of the fuel cell system) with a portion of the fuel cell system 106, thus transferring thermal energy directly from the fluid circulated in the heat supply loop to the fuel cell system 106.

Figure 2H:
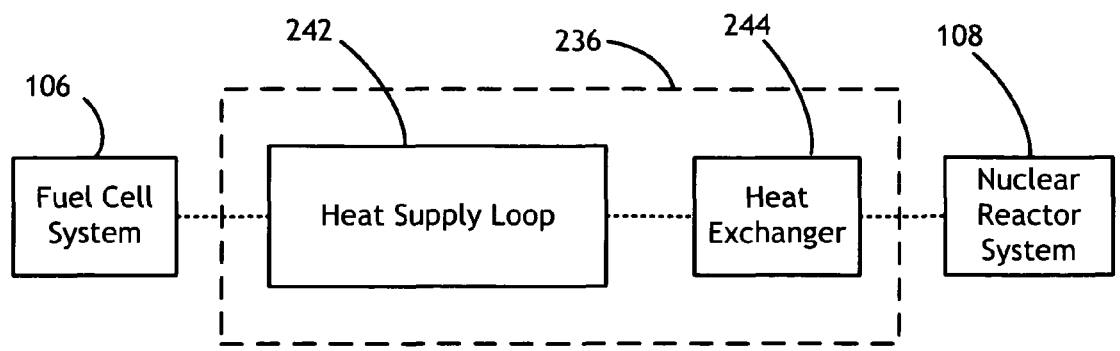
FIG. 2H is a block diagram illustrating a heat transfer system for transferring thermal energy from an energy source to a fuel cell system.

In an additional example, illustrated in FIG. 2H, a first portion of the heat supply loop 242 may be in direct thermal communication with a portion of the nuclear reactor system 108. Further, a first portion of a heat exchanger 244 may be in thermal communication with a second portion of the heat supply loop 242, while a second portion of the heat exchanger 244 is in thermal communication with a portion of the fuel cell system 106. For instance, the first portion of heat supply loop 242 may be coupled to a heat rejection loop 218 of the nuclear reactor system 108 so that a portion of the fluid (e.g., water) transferred in the heat rejection loop 218 is allowed to flow through the heat supply loop 242. Thermal energy may then be transferred from the heat rejection loop fluid diverted through the heat supply loop 242 to a portion of the fuel cell system 106 via the heat exchanger 244 connected between the second portion of the heat supply loop 242 and the portion of the fuel cell system 106.

In another embodiment, the heat transfer system 236 may include a direct fluid exchange system. For example, the heat transfer system 236 may include a heat supply loop 242 configured to transfer fluid from a portion of the nuclear reactor system 108 (e.g., heat rejection loop 218) to a portion of the fuel cell system 106. For instance, a first portion of a heat supply loop 242 may be coupled to a heat rejection loop 218 of the nuclear reactor system 108 so that a portion of the heat rejection fluid (e.g., water) may flow through the heat supply loop 242. Additionally, a second portion of the heat supply loop 242 may be coupled to a portion of the fuel cell system 106 so that the heat rejection fluid may be circulated through a portion of the fuel cell system 106 via the heat supply loop 242. As a result, thermal energy from the fluid circulated in the heat rejection loop 218 may be transferred from the heat rejection fluid to a portion of the fuel cell system 106.

It is further contemplated that in order to achieve effective thermal energy transfer via the heat supply loop 242 one or more fluid pumps and one or more valve systems may be utilized in order to circulate the heat rejection fluid through the nuclear reactor system-heat supply loop-fuel cell system circuit. For instance, a fluid carrying heat supply loop 242 may couple a portion of the nuclear reactor system 108 and a portion of the fuel cell system 106, allowing the heat rejection liquid to flow through a portion of the fuel cell system 106. The rate of fluid flow may be controlled by the heat transfer system 236 of the fuel cell control system 108. For instance, a valve system and/or fluid pumps (e.g., mechanical pumps) may be controlled to volumetrically limit the flow through the heat supply circuit. It is further contemplated that the fuel cell control module 201 of the fuel cell control system 116 may transmit an instruction signal to the heat transfer system 236 (e.g. via the energy transfer module 145).

In addition, it is further recognized that polymer electrolyte membrane (PEM) fuel cells are particularly useful in implementing the present invention as PEM fuel cells have been shown to have an optimal operating temperature (approximately 60 to 160° C.) near the waste heat temperatures of a variety of nuclear reactor systems (e.g., PWR system or BWR system). It is further contemplated that solid oxide fuel cells, which have an optimal operating temperature (approximately 600 to 1000° C.) much higher than PEM fuel cells, may be implemented in the context of a high temperature gas reactor, wherein the heat rejection occurs at a higher temperature than in PWR and BWR reactor systems.

Referring again to FIG. 2D, the energy transfer system 202 configured to transfer energy from one or more energy sources 208 to a portion of the fuel cell system 106 may include an electrical transfer system 238 configured to transfer electrical energy form one or more energy sources 208 to a portion of the fuel cell system 106. For example, in response to the signal 111 indicative of the readiness determination transmitted by the readiness determination system 112, the electrical transfer system 238 configured to transfer electrical energy from one or more energy sources 208 to a portion of the fuel cell system 106 may adjust a characteristic of the fuel cell system 106 by transferring electrical energy from a portion of the nuclear reactor system 108 (e.g., electrical output of reactor thermohydraulic system) to a portion of the fuel cell system 106, such as a conditioning system 228 (e.g., temperature control system 232 or humidity control system 230) of the fuel cell system 106.

In a further embodiment, the electrical transfer system 238 configured to transfer electrical energy form one or more energy sources 208 to a portion of the fuel cell system 106 may include an electrical energy-to-thermal energy conversion system 240. For example, the electrical energy-to-thermal energy conversion system 240 may include, but not limited to, a resistive heating coil or a thermoelectric device configured to convert a portion of the electrical energy produced by the reactor thermohydraulic system to thermal energy. For instance, in response to the signal 111 indicative of the readiness determination transmitted by the readiness determination system 112, the electrical-to-thermal conversion system 240 of the fuel cell control system 116 may adjust a characteristic of the fuel cell system 106 by converting electrical energy from the electrical output of a thermohydraulic system to thermal energy using a resistive heating coil and transferring that thermal energy to a portion of the fuel cell system 106.

It will be recognized by those skilled in the art that electrical energy may be used to supplement the heating of a given fuel cell system in instances where the employed fuel cells 122 of the fuel cell system 106 have an optimal operating temperature above the waste heat temperature of the associated nuclear reactor system 108. For example, in a molten carbonate fuel cell (MCFC) system associated with a light water reactor having a heat rejection temperature of 80° C., additional energy must be supplied to the MCFC system in order to reach the system's optimal operating temperature (approximately 600 to 700° C.). It is contemplated that electrical energy may be transferred from an electrical output of a thermohydraulic system of the associated nuclear reactor system 108 to a portion of the MCFC system in order to provide supplemental energy to the MCFC system so that the MCFC system's optimal operating temperature may be achieved and/or maintained. It should be recognized that the preceding description is not a limitation but merely an illustration as a variety of fuel cell types and nuclear reactor types may be implemented in the context of the present of invention.

Figure 2I:
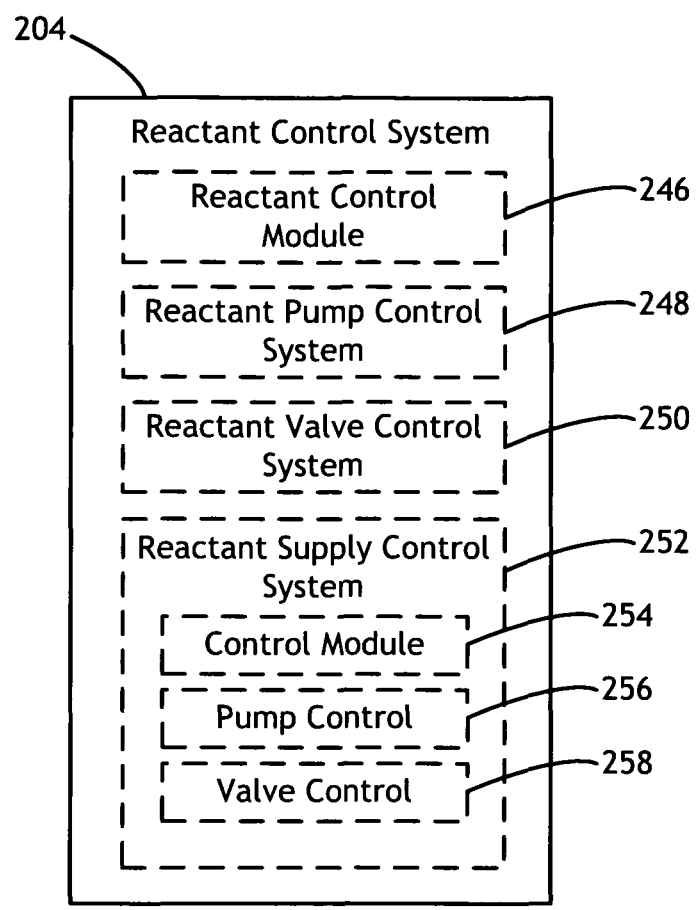
FIG. 2I is a block diagram illustrating a reactant control system for adjusting a condition of the reactant gases of a fuel cell system.

Referring now to FIG. 2I, the fuel cell control system 116 may include a reactant control system 204 configured to adjust one or more conditions of one or more of the reactant gases of the fuel cell system 106. For example, in response to the signal 111 indicative of the readiness determination transmitted by the readiness determination system 112, the fuel cell control system 116 using a reactant control system 204 configured to adjust a condition (e.g., mass flow rate or pressure) of one or more of the reactant gases (e.g., fuel or oxidant) of the fuel cell system 106 may adjust a characteristic of the fuel cell system 106.

In a further embodiment, the reactant control system 204 may include, but is not limited to, a reactant pump control system 248 or a reactant valve control system 250. For example, in response to the signal 111 indicative of the readiness determination transmitted by the readiness determination system 112, a reactant pump control system 248 of the fuel cell control system 116 may adjust a characteristic of the fuel cell system 106 by adjusting a condition (e.g., mass flow rate or pressure) of one or more of the reactant gases (e.g., fuel or oxidant) of the fuel cell system 106. For instance, in response to the signal 111 indicative of the readiness determination transmitted by the readiness determination system 112, a reactant pump control system 248 of the reactant control system 204 of the fuel cell control system 116 may adjust (e.g., increase or decrease) the pumping rate of the reactant pumps of the fuel cell system 106. In another instance, in response to the signal 111 indicative of the readiness determination transmitted by the readiness determination system 112, a reactant pump control system 248 of the reactant control system 204 of the fuel cell control system 116 may activate or deactivate one or more of the reactant pumps of the fuel cell system 106.

By way of another example, in response to the signal 111 indicative of the readiness determination transmitted by the readiness determination system 112, a reactant valve control system 250 of the fuel cell control system 116 adjust a characteristic of the fuel cell system 106 by adjusting a condition (e.g., mass flow rate or pressure) of one or more of the reactant gases (e.g., fuel or oxidant) of the fuel cell system 106. For instance, in response to the signal 111 indicative of the readiness determination transmitted by the readiness determination system 112, a reactant valve control system 250 of the reactant control system 204 of the fuel cell control system 116 may adjust the flow rate of one or more of the reactant gases by controlling one or more reactant valves of the fuel cell system 106.

It will be recognized by those skilled in the art that reactant pump control system 248 and the reactant valve control system 250 may be used independently or in conjunction with one another to adjust the flow rate or pressure of the fuel gas or oxidant gas of the fuel cell system 106. In addition, it should be recognized that by adjusting the pressure or flow rate of the reactant gases a fuel cell control system 116 may adjust one or more characteristics of the fuel cell system 106. For example, the voltage and current output levels of a given fuel cell system 106 may be adjusted by increasing or decreasing the reactant pressure in one or more fuel cells 122 of the fuel cell system 106. By way of another example, the temperature of one or more fuel cells may be adjusted by changing the flow rate of the reactant gases. For instance, given a reactant gas held at ambient temperatures, the fuel cell control system 116 may decrease the temperature of a fuel cell membrane of one or more fuel cells 122 at elevated temperatures by increasing the flow rate of the reactant gases being fed into the fuel cell 122. By way of an additional example, the humidity level of one or more fuel cells may be adjusted by changing the flow rate of the reactant gases. For instance, given a reactant having a first humidity level, the fuel cell control system 106 may decrease or increase the humidity level in a fuel cell membrane by increasing or decreasing the flow rate of the reactant gas being fed into the fuel cell 122. The preceding description should not be interpreted as a limitation but rather an illustration as it is contemplated that a number of other implementations of the present invention may be applicable in related contexts.

In another embodiment, the reactant control system 204 of the fuel cell control system 106 may be used to pre-load a reactant into one or more fuel cells 122 of the fuel cell system 106. For example, in response to the signal 111 indicative of the readiness determination transmitted by the readiness determination system 112, a reactant control system 204 of the fuel cell control system 116 may establish a condition in the fuel cell system 106 by pre-loading a reactant into the fuel cell system 106. For instance, in response to a heightened temperature level measurement of the nuclear reactor core of the nuclear reactor system 108, the reactant control system 204 may pre-load fuel into the fuel cells 122 of the fuel cell system 106. By pre-loading fuel into the fuel cell system 106 the response time required for the fuel cell system 106 to respond to a nuclear reactor system 108 malfunction may be shortened.

In another embodiment, the reactant control system 204 of the fuel cell control system 116 may be used to unload a reactant from one or more fuel cells 122 of the fuel cell system 106. For example, in response to the signal 111 indicative of the readiness determination transmitted by the readiness determination system 112, a reactant control system 204 of the fuel cell control system 106 may adjust a characteristic of the fuel cell system by unloading a reactant from the fuel cell system 106. The response time required for a given fuel cell system at lower nuclear reactor core temperatures is smaller than the response time required for the fuel cell system at higher temperature. In response to a lowered nuclear reactor core temperature level measurement, the reactant control system 204 may unload fuel from the fuel cells of the fuel cell system 106.

In another embodiment, the reactant control system 204 of the fuel cell control system 116 may include a reactant supply control system 252 configured to adjust one or more supply conditions of one or more of the reactant gases of the fuel cell system 106. For example, a reactant supply control system 252 may include a reactant supply control system configured to control the number of reactant supply tanks supplying reactant gas to the fuel cell system 106. For example, in response to the signal 111 indicative of the readiness determination transmitted by the readiness determination system 112, the reactant supply control system 252 of the fuel cell control system 106 may adjust a characteristic of the fuel cell system 106 by increasing or decreasing the number of reactant reservoir tanks supplying reactant gas to the fuel cells 122 of the fuel cell system 106.

It is further contemplated that the reactant control system 204 may include a reactant control module 246 suitable for controlling the subsystems of the reactant control system (e.g., reactant pump control system 248, reactant valve control system 250 or reactant supply control system 252) in response to a signal transmitted from a fuel cell control module 201 or the readiness determination transmission module 164. The reactant control module 246 may include a computer data processing system equipped with signal processing and transmission hardware and software configured to receive a signal transmitted by the fuel cell control module 201 or readiness determination transmission module 164.

It is also contemplated that the reactant supply control system 252 may include pump 256 and valve 258 control subsystems that are controlled by a reactant supply control module 254 configured to respond to a signal transmitted from the reactant control module 246, the fuel cell control module 201, or the readiness determination transmission module 164. The reactant supply control module 254 may include a computer data processing system equipped with signal processing and transmission hardware and software configured to receive a signal transmitted by the reactant control module 246, the fuel cell control module 210 or readiness determination transmission module 164.

Figure 2J:
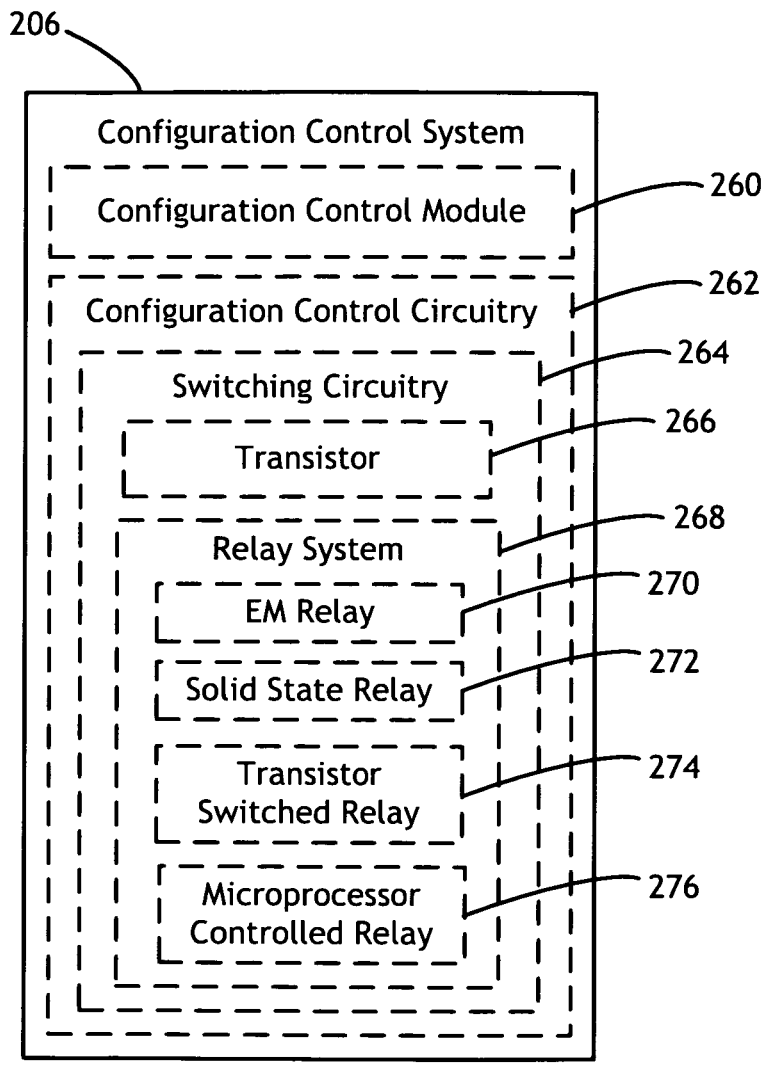
FIG. 2J is a block diagram illustrating a configuration control system for adjusting an electrical configuration of a fuel cell system.

Referring now to FIG. 2J, the fuel cell control system 116 may include a configuration control system 206 configured to adjust (i.e., reconfigure) an electrical coupling configuration of two or more of the fuel cells 122 of the fuel cell system 106. For example, in response to the signal 111 indicative of the readiness determination transmitted by the readiness determination system 112, the configuration control system 206 of the fuel cell control system 116 may adjust a characteristic of the fuel cell system 106 by adjusting the electrical coupling configuration (e.g., adjusting the electrical circuit arrangement) of two or more of the fuel cells 122 of the fuel cell system 106. For example, the configuration control system may be used to switch the electrical configuration of the fuel cell system 106 from a first configuration to a second configuration in order to adjust the electrical output characteristics (e.g., output current level or voltage level) of the fuel cell system 106.

In a further embodiment, the configuration control system 206 may include configuration control circuitry 262. For example, the configuration control circuitry 262 may include, but is not limited to, switching circuitry 264. For example, in response to the signal 111 indicative of the readiness determination transmitted by the readiness determination system 112, the configuration control system 206 of the fuel cell control system 116 may adjust a characteristic of the fuel cell system 106 by adjusting the electrical coupling configuration of two or more of the fuel cells 122 of the fuel cell system 106 using switching circuitry 264.

Further, the switching circuitry 264 may include, but is not limited to, one or more transistors 266 (e.g., NPN transistor or PNP transistor) or one or more relay systems 268. For example, the relay system 268 may include, but is not limited to, an electromagnetic relay system 270 (e.g., a solenoid based relay system), a solid state relay system 272, a transistor switched electromagnetic relay system 274, or a microprocessor controlled relay system 276. For instance, in response to the signal 111 indicative of the readiness determination transmitted by the readiness determination system 112, the configuration control system 206 of the fuel cell control system 116 may adjust a characteristic of the fuel cell system 106 by adjusting the electrical coupling configuration of two or more of the fuel cells of the fuel cell system 106 using a transistor switched relay system 266.

It is further contemplated that the configuration control system 206 may include a configuration control module 260 suitable for controlling the configuration control circuitry 262 in response to a signal transmitted from a fuel cell control module 201 or directly from the readiness determination system transmission module 164. The configuration control module 260 may include a computer data processing system equipped with signal processing and hardware and software configured to receive a signal transmitted by the fuel cell control module 201 or the readiness determination system transmission module 164.

By way of an additional example, the microprocessor controlled relay system 276, may include, but is not limited to a microprocessor controlled relay system programmed to respond to one or more conditions (e.g., a signal transmitted from fuel cell control module 201 or a signal from the readiness determination system 112). For instance, in response to the signal 111 indicative of the readiness determination transmitted by the readiness determination system 112, the configuration control system 206 of the fuel cell control system 116 may adjust a characteristic of the fuel cell system 106 by adjusting the electrical coupling configuration of two or more of the fuel cells of the fuel cell system 106 using a microprocessor controlled relay system programmed to respond to a signal transmitted from the configuration control module 260, fuel cell control module 201, or the readiness determination system 112.

By way of another example, the configuration switching circuitry 262 may adjust the electrical coupling configuration of two or more of the fuel cells 122 of the fuel cell system 106 by switching a parallel configuration of two or more fuel cells 122 (or fuel cell stacks 120 or fuel cell modules 118) to a series configuration. Conversely, the configuration switching circuitry 262 may adjust the electrical coupling configuration of two or more of the fuel cells 122 of the fuel cell system 106 by switching a series configuration of two or more fuel cells 122 (or fuel cell stacks 120 or fuel cell modules 118) to a parallel configuration. It should be appreciated that the configuration control circuitry 262 may include a number of switching circuitry components which can be controlled independently such that a portion of the switching circuitry components can used to adjust the overall fuel cell system 106 electrical coupling configuration by adjusting the electrical configuration of fuel cells 122 (or fuel cell stacks 120 or fuel cell modules 118) on an individual basis. In addition, the configuration control circuitry 262 may adjust the electrical configuration of the fuel cell system 106 by adjusting the quantity of fuel cells 122 operating within the fuel cell system 106. For example, the configuration control circuitry 262 may be used to couple additional fuel cells (or fuel cell stacks 120 or fuel cell modules 118) to the fuel cell system 106. Conversely, the configuration control circuitry 262 may be used to disconnect fuel cells 122 (or fuel cell stacks 120 or fuel cell modules 118) from the fuel cell system 106.

Figure 2K:
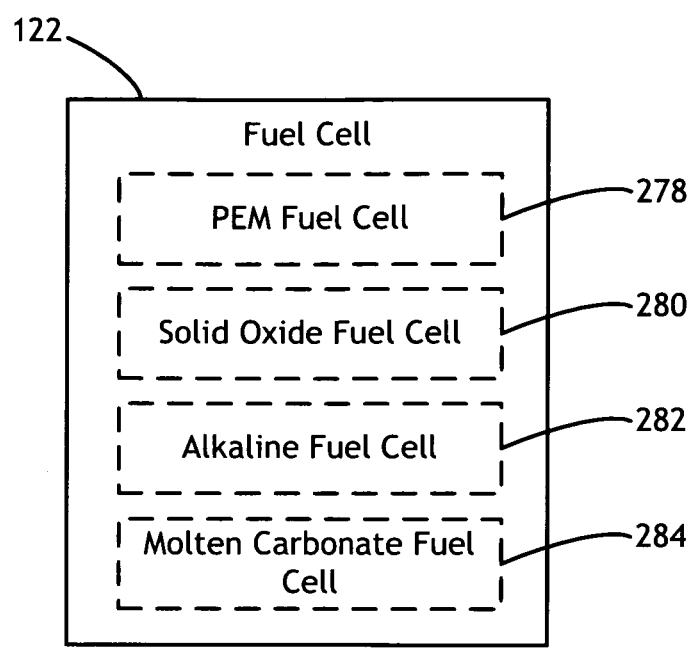
FIG. 2K is a block diagram illustrating types of fuel cells suitable for implementation in the present invention.

Referring now to FIG. 2K, one or more of the fuel cells 122 of the fuel cell system 106, may include, but are not limited to, a polymer electrolyte fuel cell 278, a solid oxide fuel cell 280, an alkaline fuel cell 282, or a molten carbonate fuel cell 284. For example, in response to the signal 111 indicative of the readiness determination transmitted by the readiness determination system 112, a fuel cell control system 116 may adjust a characteristic a fuel cell system 106 having one or more polymer electrolyte fuel cells 278. By way of another example, in response to the signal 111 indicative of the readiness determination transmitted by the readiness determination system 112, a fuel cell control system 116 may adjust a characteristic a fuel cell system 106 having one or more solid oxide fuel cells 280.

Figure 2L:
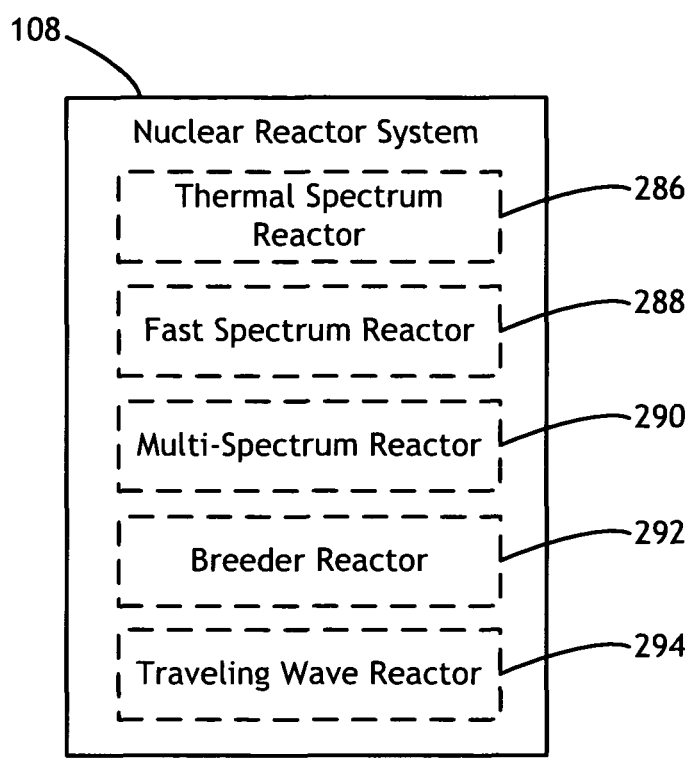
FIG. 2L is a block diagram illustrating types of nuclear reactors suitable for implementation in the present invention.

Referring now to FIG. 2L, the nuclear reactor of the nuclear reactor system 108, may include, but is not limited to, a thermal spectrum nuclear reactor 286, a fast spectrum nuclear reactor 288, a multi-spectrum nuclear reactor 290, a breeder nuclear reactor 292, or a traveling wave reactor 294. For example, the fuel cell system 106 of the present invention may be associated with a thermal spectrum nuclear reactor system 286. By way of another example, the fuel cell system 106 of the present invention may be associated with a traveling wave nuclear reactor system 294.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either subcomponent operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 3:
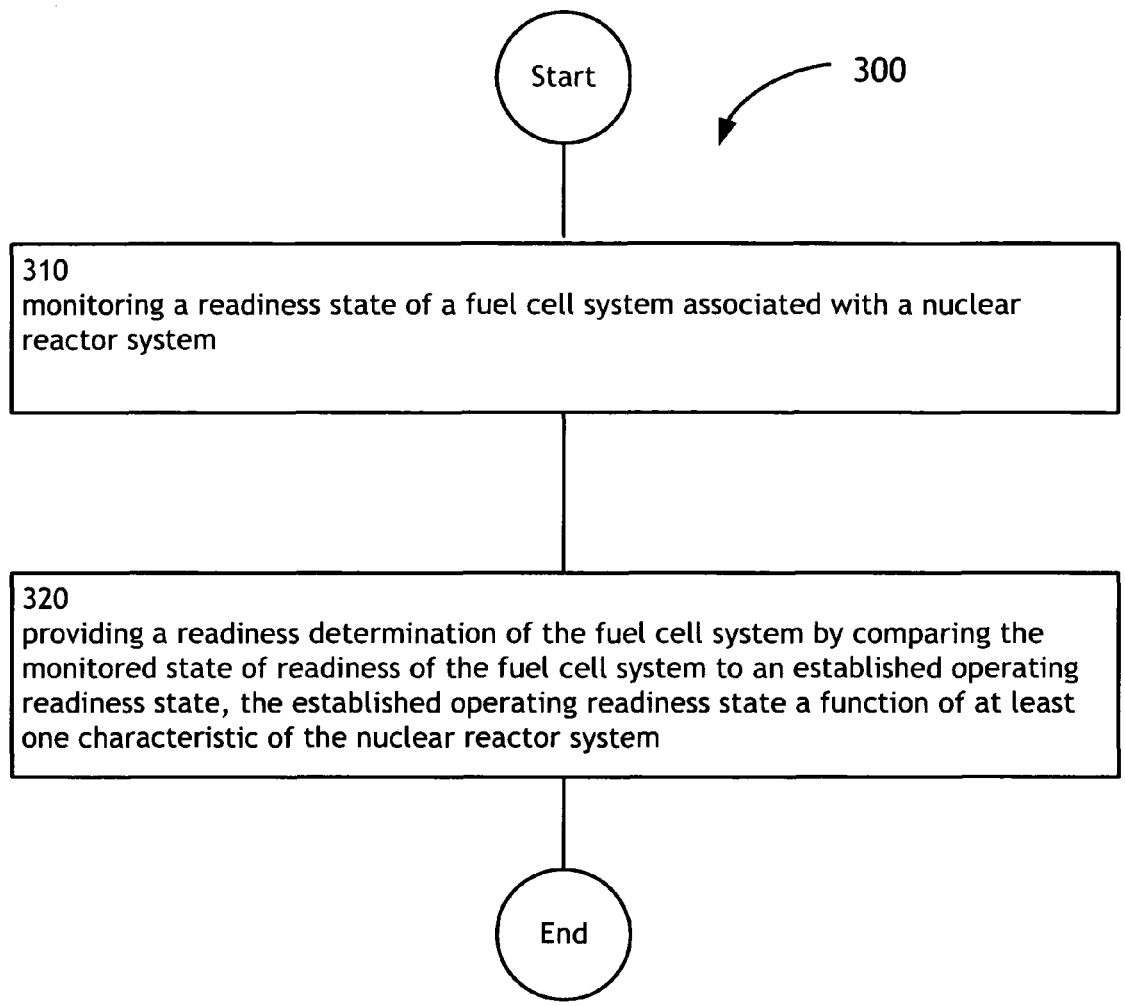
FIG. 3 is a high-level flowchart of a method for determining a state of operational readiness of a fuel cell backup system of a nuclear reactor system.

FIG. 3 illustrates an operational flow 300 representing example operations related to determining a state of operational readiness of a fuel cell backup system of a nuclear reactor system. In FIG. 3 and in following figures that include various examples of operational flows, discussion and explanation may be provided with respect to the above-described examples of FIGS. 1A through 2L, and/or with respect to other examples and contexts. However, it should be understood that the operational flows may be executed in a number of other environments and contexts, and/or in modified versions of FIGS. 1A through 2L. Also, although the various operational flows are presented in the sequence(s) illustrated, it should be understood that the various operations may be performed in other orders than those which are illustrated, or may be performed concurrently.

After a start operation, the operational flow 300 moves to a monitoring operation 310. The monitoring operation 310 depicts monitoring a readiness state of a fuel cell system associated with a nuclear reactor system. For example, as shown in FIGS. 1A through 2L, a fuel cell monitoring system 102 may monitor a readiness state of a portion of the fuel cell system 106. For instance, a fuel cell monitoring system 102 may monitor a readiness state of a portion of a fuel cell block (e.g., one or more fuel cells 122 of the fuel cell block) 117 of the fuel cell system 106. In another instance, a fuel cell monitoring system 102 may monitor a readiness state of a reactant gas 124 of the fuel cell system 106.

Then, the providing operation 320 depicts providing a readiness determination of the fuel cell system by comparing the monitored state of readiness of the fuel cell system to an established operating readiness state, the established operating readiness state a function of at least one characteristic of the nuclear reactor system. For example, as shown in FIGS. 1A through 2L, in response to a signal (e.g., digital or analog signal transmitted wirelessly or by wireline) indicative of the monitored state of readiness transmitted by the fuel cell monitoring system 102, the readiness determination system 112 may provide a readiness determination by comparing the monitored state of readiness to an established state of readiness. For instance, a programmed computer system 158 may compare the monitored state of readiness to an established state of readiness of the fuel cell system 106 for similar nuclear reactor system 108 conditions.

Figure 4:
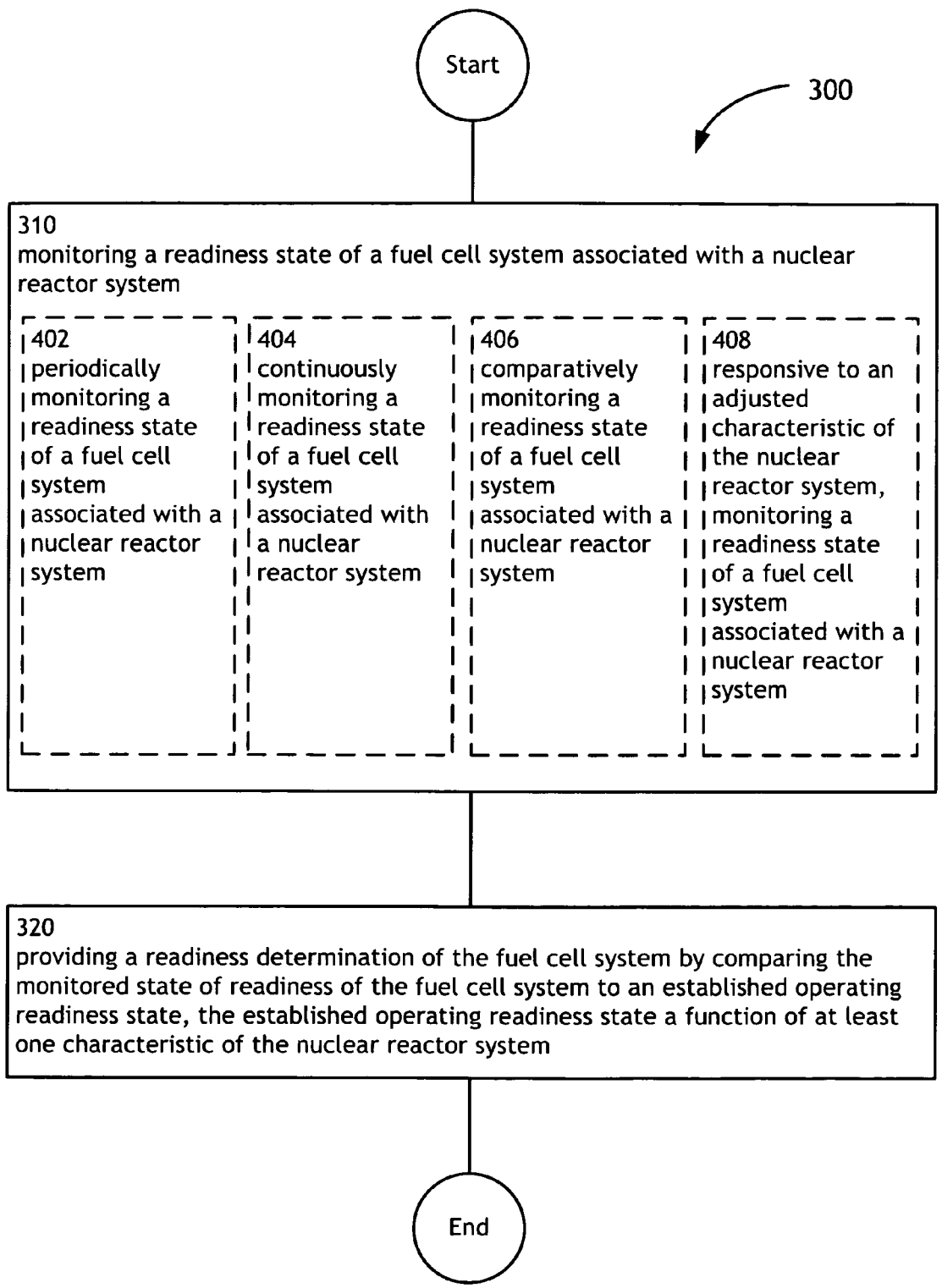
FIGS. 4 through 19 are high-level flowcharts depicting alternate implementations of FIG. 3.

FIG. 4 illustrates alternative embodiments of the example operational flow 300 of FIG. 3. FIG. 4 illustrates example embodiments where the monitoring operation 310 may include at least one additional operation. Additional operations may include an operation 402, an operation 404, an operation 406 and/or an operation 408.

The operation 402 illustrates periodically monitoring a readiness state of a fuel cell system associated with a nuclear reactor system. For example, as shown in FIGS. 1A through 2L, a fuel cell monitoring system 140 configured to periodically monitor the fuel cell system 106 may periodically monitor a readiness state of a portion of the fuel cell system 106. For instance, a periodic fuel cell monitoring system 140 may monitor a portion of the fuel cell system 106 with a periodicity of 1 second.

The operation 404 illustrates continuously monitoring a readiness state of a fuel cell system associated with a nuclear reactor system. For example, as shown in FIGS. 1A through 2L, a fuel cell monitoring system 141 configured to continuously monitor the fuel cell system 106 may continuously monitor a readiness state of a portion of the fuel cell system 106. For instance, a continuous fuel cell monitoring system 141 may monitor a portion of the fuel cell system 106 continuously after being engaged by an operator, an operator controlled computer system, or a control system.

The operation 406 illustrates comparatively monitoring a readiness state of a fuel cell system associated with a nuclear reactor system. For example, as shown in FIGS. 1A through 2L, a fuel cell monitoring system 142 configured to continuously monitor the fuel cell system 106 may comparatively monitor a readiness state of a portion of the fuel cell system 106. For instance, a comparative fuel cell monitoring system 142 may monitor a portion of the fuel cell system 106 comparatively by comparing the readiness state of a portion of the fuel cell system 106 at a first time to the readiness state of the portion of the fuel cell system 106 at a second time.

The operation 408 illustrates, responsive to an adjusted characteristic of the nuclear reactor system, monitoring a readiness state of a fuel cell system associated with a nuclear reactor system. For example, as shown in FIGS. 1A through 2L, a fuel cell monitoring system 143 configured to monitor the fuel cell system 106 in response to an adjusted characteristic of the nuclear reactor system 108. For instance, a fuel cell monitoring system 143 configured to monitor the fuel cell system 106 in response to an adjusted characteristic of the nuclear reactor system 108 may monitor a portion of the fuel cell system 106 prior to, during, or after an operator or an operator controlled control system of a nuclear reactor system adjusts a characteristic (e.g., power level, coolant flow rate, and the like) of the nuclear reactor system 108.

Figure 5:
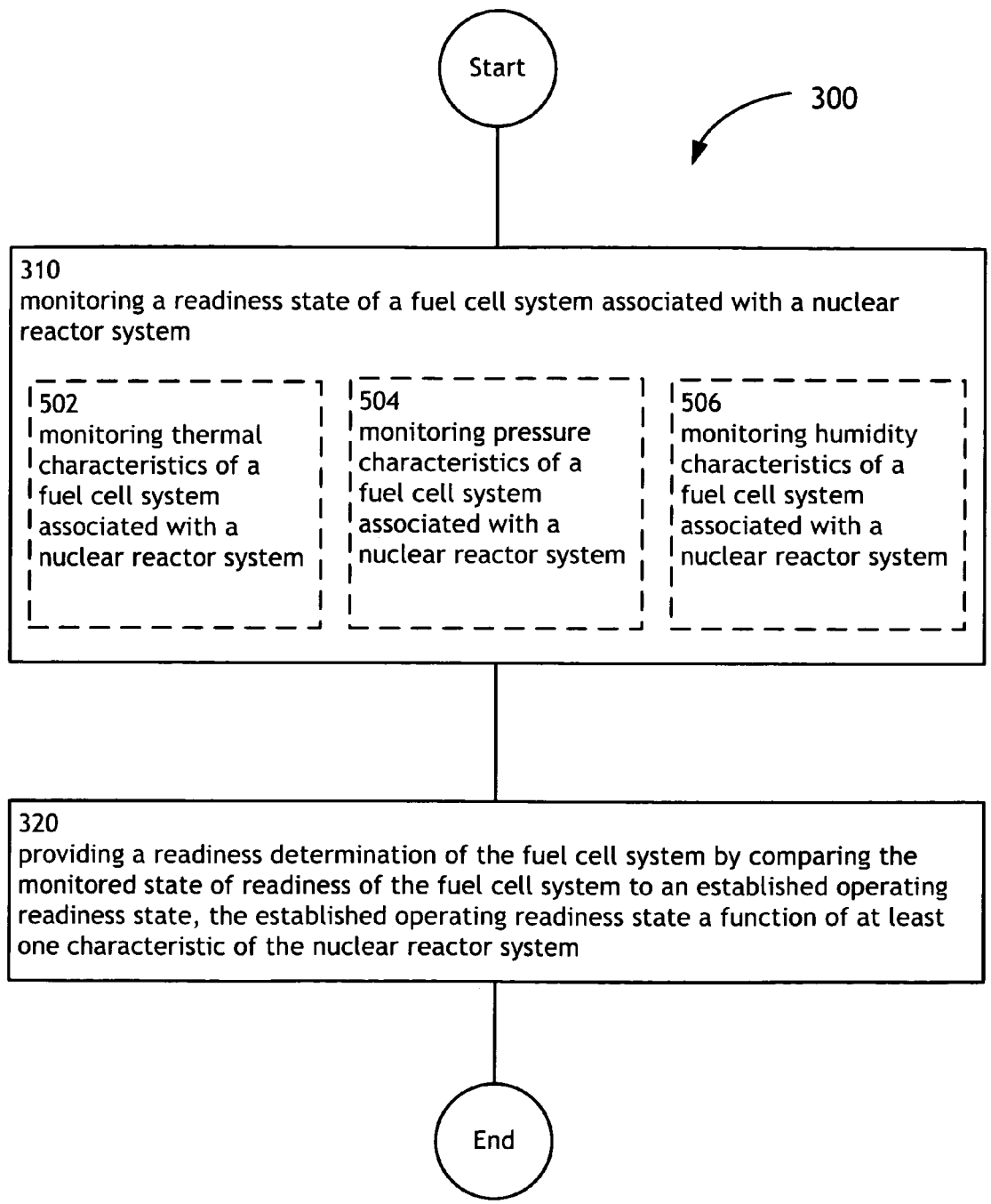

FIG. 5 illustrates alternative embodiments of the example operational flow 300 of FIG. 3. FIG. 5 illustrates example embodiments where the monitoring operation 310 may include at least one additional operation. Additional operations may include an operation 502, an operation 504, and/or an operation 506.

The operation 502 illustrates monitoring thermal characteristics of a fuel cell system associated with a nuclear reactor system. For example, as shown in FIGS. 1A through 2L, a thermal monitoring system 126 (e.g., a thermocouple device) may monitor a thermal characteristic (e.g., temperature of rate of change of change) of a portion of the fuel cell system 106.

Further, the operation 504 monitoring pressure characteristics of a fuel cell system associated with a nuclear reactor system. For example, as shown in FIGS. 1A through 2L, a pressure monitoring system 128 may monitor a pressure characteristic (e.g., pressure or rate of change of pressure) of a portion of the fuel cell system 106.

Further, the operation 506 monitoring humidity characteristics of a fuel cell system associated with a nuclear reactor system. For example, as shown in FIGS. 1A through 2L, a humidity monitoring system 130 may monitor a humidity characteristic (e.g., humidity level or rate of change of humidity level) of a portion of the fuel cell system 106.

Figure 6:
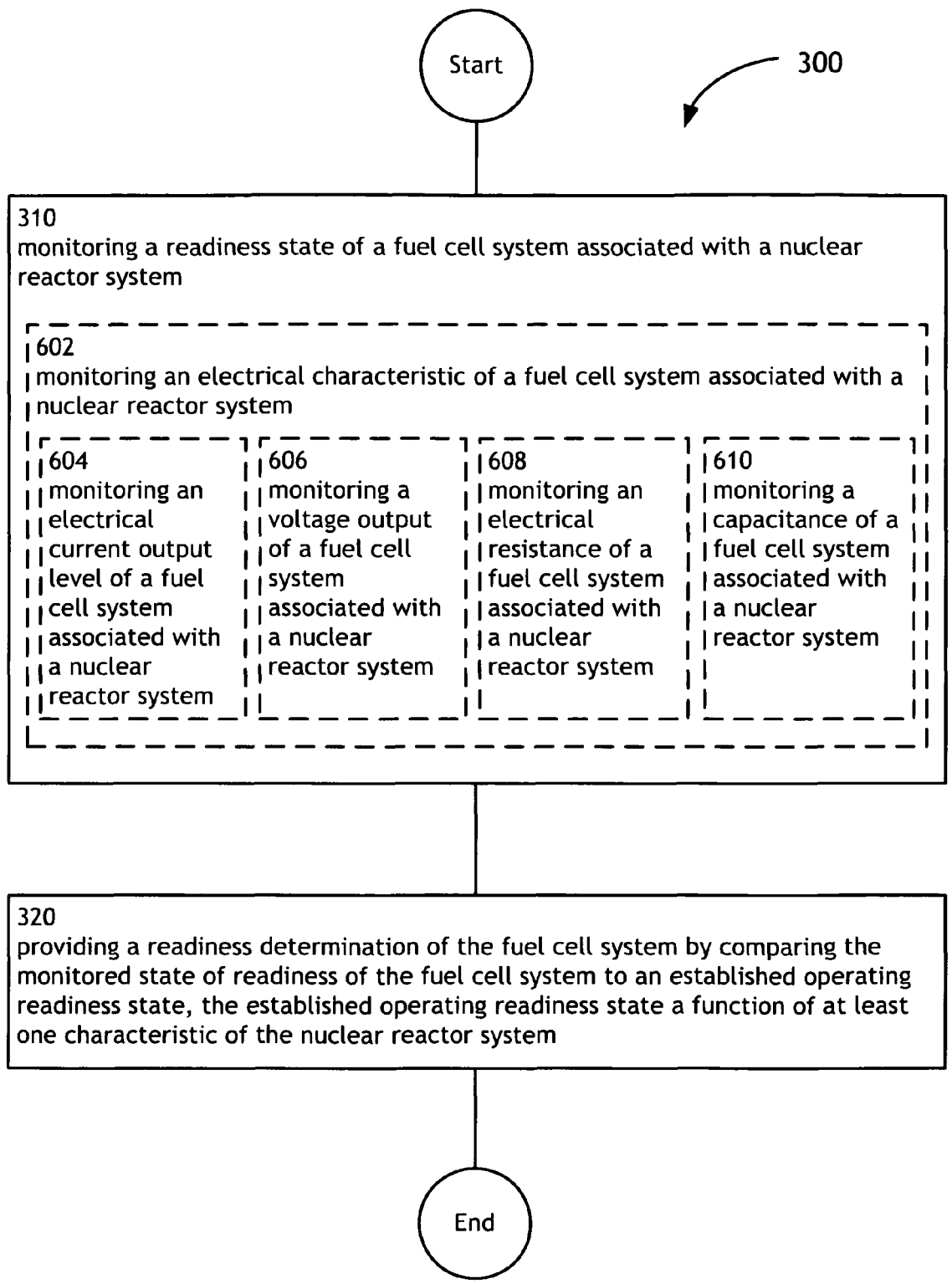

FIG. 6 illustrates alternative embodiments of the example operational flow 300 of FIG. 3. FIG. 6 illustrates example embodiments where the monitoring operation 310 may include at least one additional operation. Additional operations may include an operation 602, an operation 604, an operation 606, an operation 608 and/or an operation 6010.

The operation 602 illustrates monitoring an electrical characteristic of a fuel cell system associated with a nuclear reactor system. For example, as shown in FIGS. 1A through 2L, an electrical monitoring system 132 may monitor an electrical characteristic of a portion of the fuel cell system 106. For instance, an electrical monitoring system 132 may monitor an electrical characteristic of one or more fuel cells 122 of the fuel cell system 106.

Further, the operation 604 illustrates monitoring an electrical current output level of a fuel cell system associated with a nuclear reactor system. For example, as shown in FIGS. 1A through 2L, an electrical current monitoring system 134 (e.g., current meter a data output communicatively coupled to a computer system configured for data management) may monitor the electrical current output of one or more fuel cells 122 of the fuel cell system 106.

Further, the operation 606 illustrates monitoring a voltage output of a fuel cell system associated with a nuclear reactor system. For example, as shown in FIGS. 1A through 2L, a voltage monitoring system 136 (e.g., voltage meter having a data output communicatively coupled to a computer system configured for data management) may monitor the voltage level of one or more fuel cells 122 of the fuel cell system 106.

Further, the operation 608 illustrates monitoring an electrical resistance of a fuel cell system associated with a nuclear reactor system. For example, as shown in FIGS. 1A through 2L, a resistance monitoring system 136 (e.g., an ohm meter having a data output communicatively coupled to a computer system configured for data management) may monitor the resistance of one or more fuel cells 122 of the fuel cell system 106.

Further, the operation 6010 illustrates monitoring a capacitance of a fuel cell system associated with a nuclear reactor system. For example, as shown in FIGS. 1A through 2L, a capacitance monitoring system 137 (e.g., a capacitance meter having a data output communicatively coupled to a computer system configured for data management) may monitor the capacitance of one or more fuel cells 122 of the fuel cell system 106.

Figure 7:
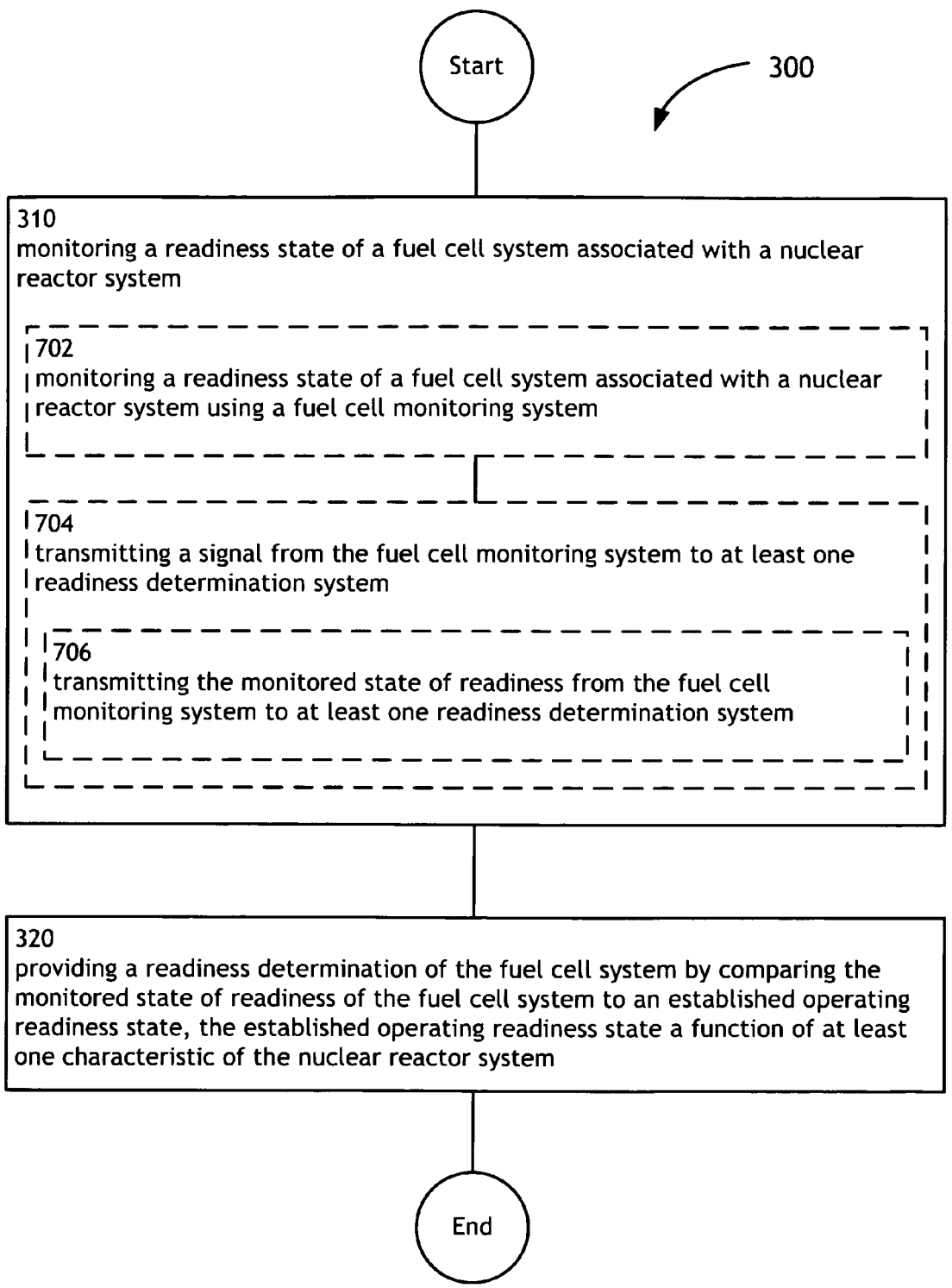

FIG. 7 illustrates alternative embodiments of the example operational flow 300 of FIG. 3. FIG. 7 illustrates example embodiments where the monitoring operation 310 may include at least one additional operation. Additional operations may include an operation 702, an operation 704, and/or an operation 706.

The operation 702 illustrates monitoring a readiness state of a fuel cell system associated with a nuclear reactor system using a fuel cell monitoring system. For example, as shown in FIGS. 1A through 2L, a fuel cell monitoring system 102 may monitor a readiness state of the fuel cell system 106 by monitoring one or more portions (e.g., one or more fuel cells 122 or reactant gases 124) of the fuel cell system 106.

Further, the operation 704 illustrates transmitting a signal from the fuel cell monitoring system to a readiness determination system. For example, as shown in FIGS. 1A through 2L, the fuel cell monitoring system 102 may transmit a signal 110 (e.g., digital or analog signal) to a readiness determination system 112. For instance, a monitoring system transmission module 147 may transmit a signal 110 via a wireline to the receiving module 162 of the readiness determination system 112.

Further, the operation 706 illustrates transmitting the monitored state of readiness from the fuel cell monitoring system to a readiness determination system. For example, as shown in FIGS. 1A through 2L, the fuel cell monitoring system 102 may transmit the monitored readiness state or a signal 110 (e.g., digital or analog signal) indicative of the monitored readiness state to a readiness determination system 112. For instance, a monitoring system transmission module 147 may transmit the monitored readiness state or a signal 110 indicative of the monitored readiness state via a wireline to the receiving module 162 of the readiness determination system 112.

Figure 8:
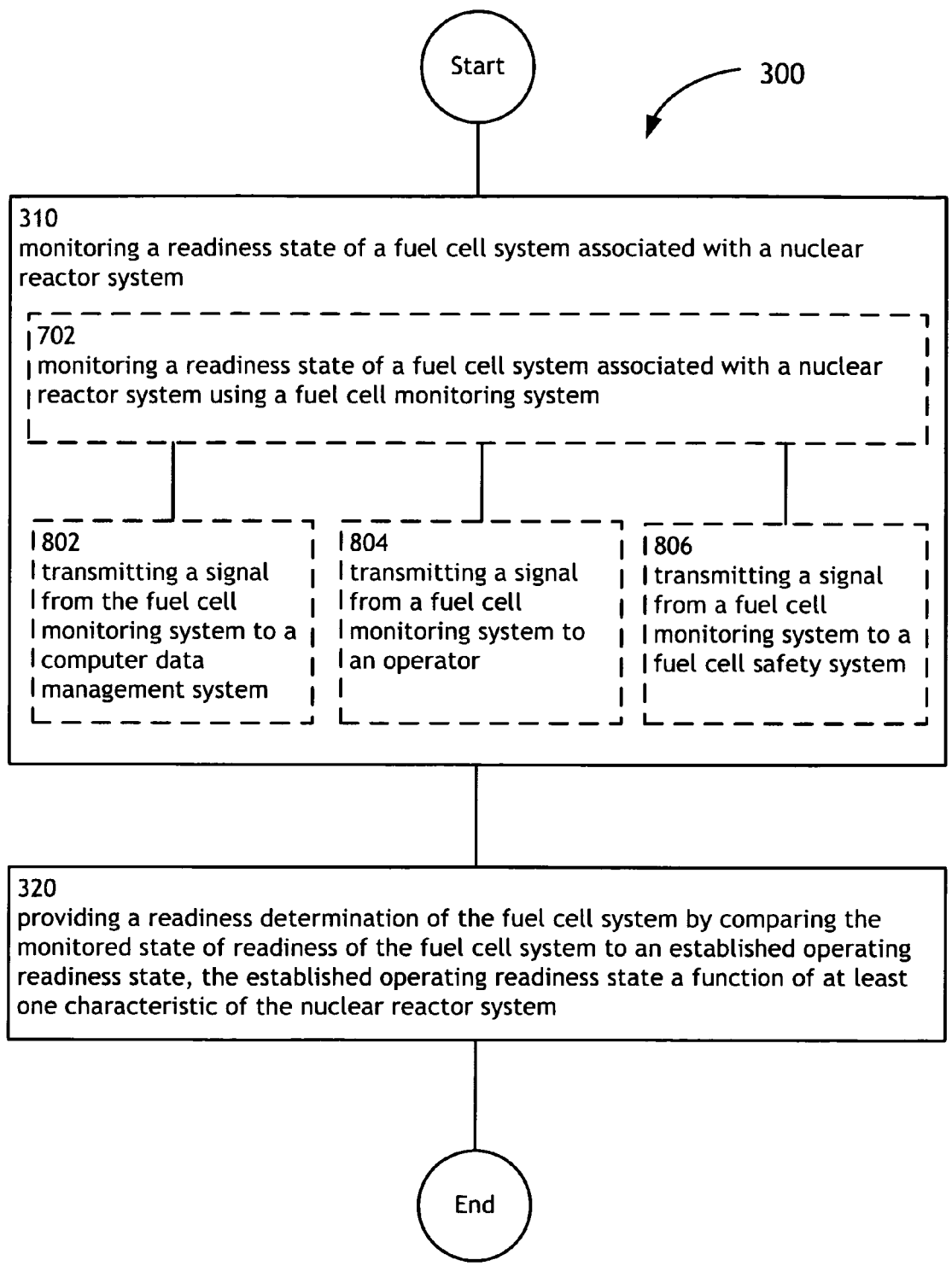

FIG. 8 illustrates alternative embodiments of the example operational flow 300 of FIG. 3. FIG. 8 illustrates example embodiments where the monitoring operation 310 may include at least one additional operation. Additional operations may include an operation 802, an operation 804, and/or an operation 806.

The operation 802 illustrates transmitting a signal from the fuel cell monitoring system to a computer data management system. For example, as shown in FIGS. 1A through 2L, the fuel cell monitoring system 102 may transmit the monitored readiness state or a signal 151 indicative of the monitored readiness state to a computer data management system 148. For instance, a monitoring system transmission module 147 may transmit the monitored readiness state or a signal 151 indicative of the monitored readiness state via a wireline to the computer data management system 148.

Further, the operation 804 illustrates transmitting a signal from a fuel cell monitoring system to an operator. For example, as shown in FIGS. 1A through 2L, the fuel cell monitoring system 102 may transmit the monitored readiness state or a signal 150 indicative of the monitored readiness state to an operator. For instance, a monitoring system transmission module 147 may transmit the monitored readiness state or a signal 150 indicative of the monitored readiness state via a wireline to an operator interface system 146 (e.g., operator controlled computer system 145 equipped with visual and/or audio output system).

Further, the operation 806 illustrates transmitting a signal from a fuel cell monitoring system to a fuel cell safety system. For example, as shown in FIGS. 1A through 2L, the fuel cell monitoring system 102 may transmit the monitored readiness state or a signal 152 indicative of the monitored readiness state to a safety system 149 of the fuel cell system 106. For instance, a monitoring system transmission module 147 may transmit the monitored readiness state or a signal 152 indicative of the monitored readiness state via a wireline to a safety system 149 of the fuel cell system 106.

Figure 9:
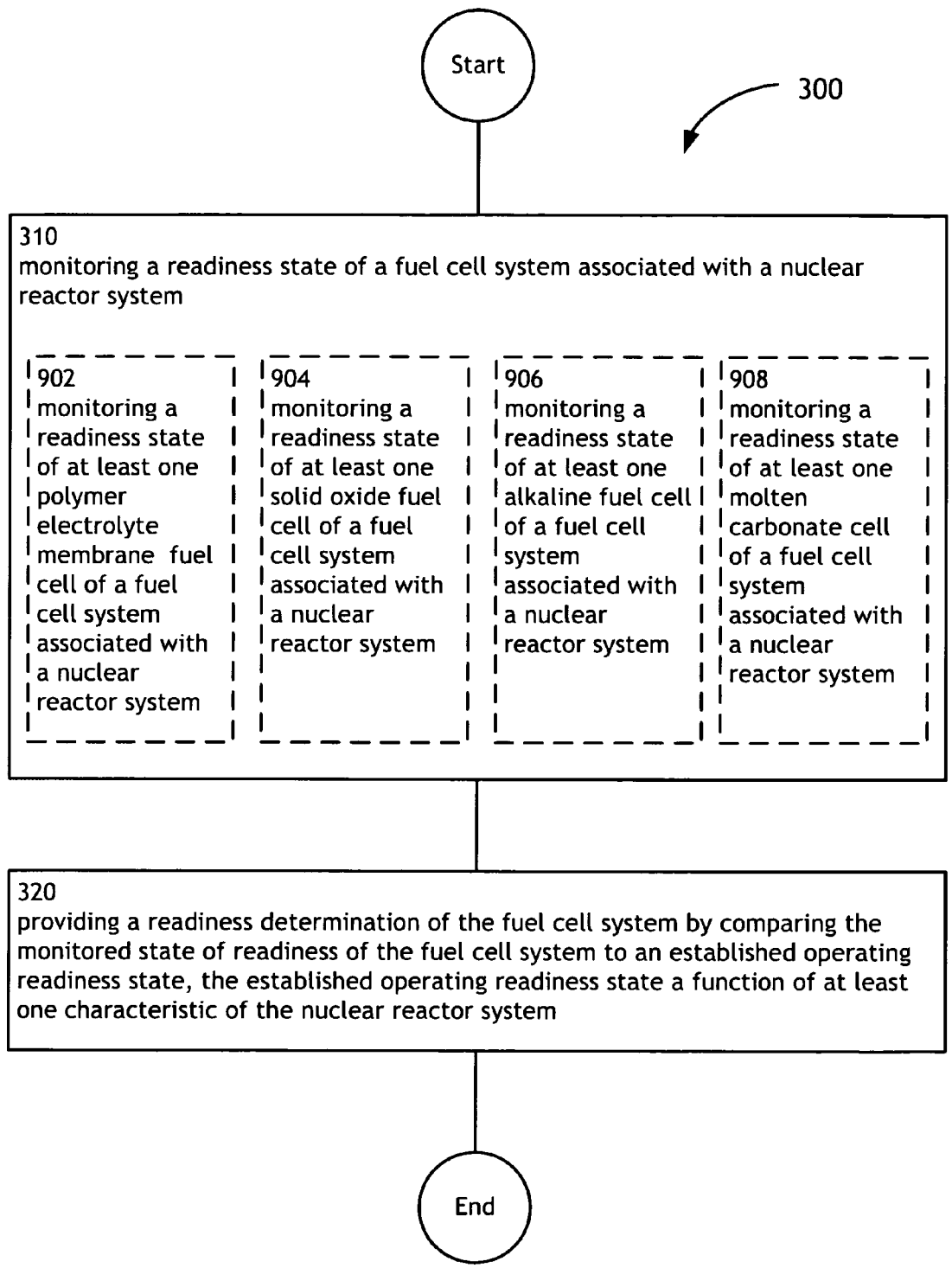

FIG. 9 illustrates alternative embodiments of the example operational flow 300 of FIG. 3. FIG. 9 illustrates example embodiments where the monitoring operation 310 may include at least one additional operation. Additional operations may include an operation 902, an operation 904, an operation 906, and/or an operation 908.

The operation 902 illustrates monitoring a readiness state of at least one polymer electrolyte membrane fuel cell of a fuel cell system associated with a nuclear reactor system. For example, as shown in FIGS. 1A through 2L, a fuel cell monitoring system 102 may monitor a readiness state of a polymer electrolyte membrane fuel cell system 278.

The operation 904 illustrates monitoring a readiness state of at least one solid oxide fuel cell of a fuel cell system associated with a nuclear reactor system. For example, as shown in FIGS. 1A through 2L, a fuel cell monitoring system 102 may monitor a readiness state of a solid oxide fuel cell system 280.

The operation 906 illustrates monitoring a readiness state of at least one alkaline fuel cell of a fuel cell system associated with a nuclear reactor system. For example, as shown in FIGS. 1A through 2L, a fuel cell monitoring system 102 may monitor a readiness state of an alkaline fuel cell system 282.

The operation 908 illustrates monitoring a readiness state of at least one molten carbonate cell of a fuel cell system associated with a nuclear reactor system. For example, as shown in FIGS. 1A through 2L, a fuel cell monitoring system 102 may monitor a readiness state of a molten carbonate fuel cell system 284.

Figure 10:
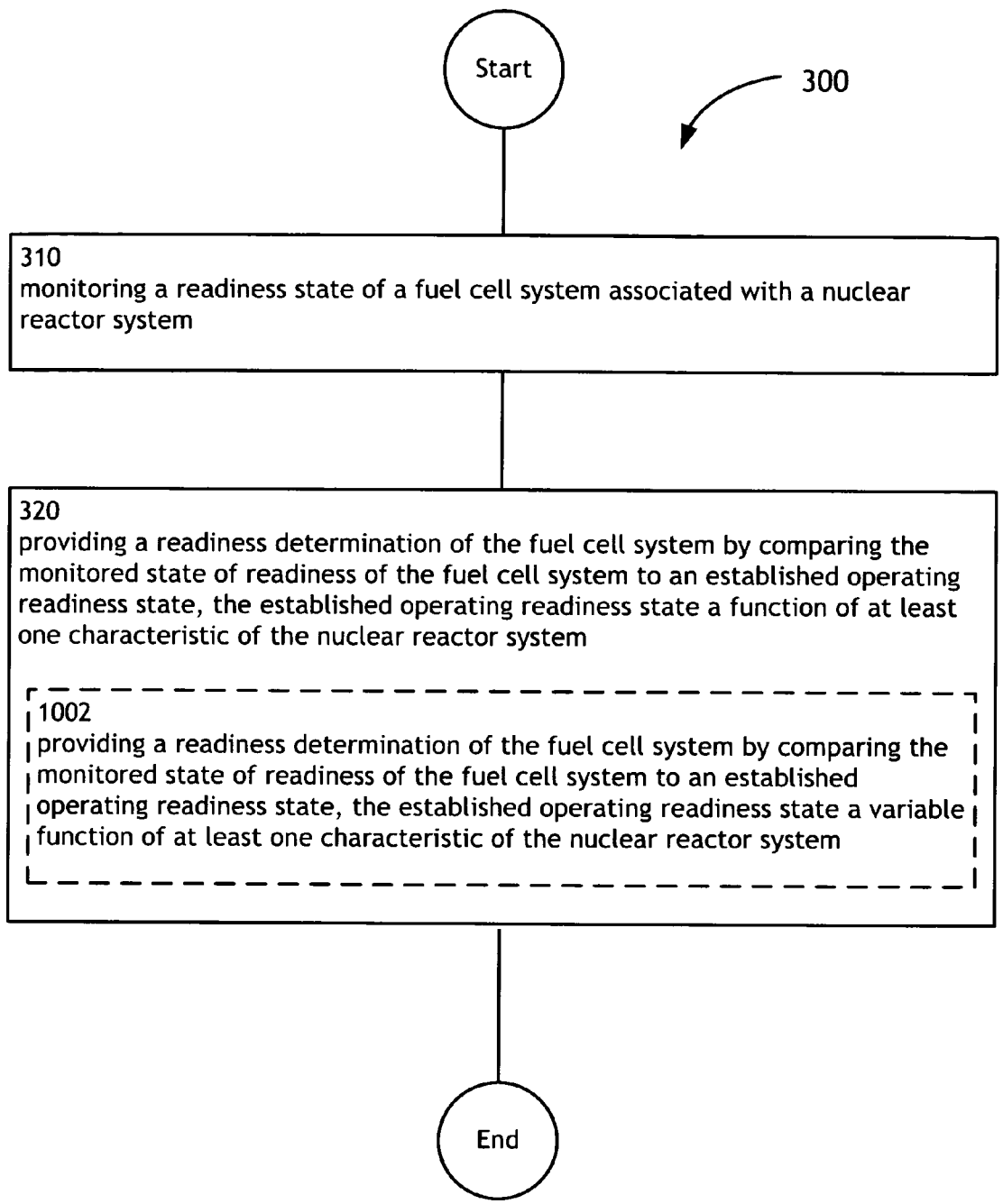

FIG. 10 illustrates alternative embodiments of the example operational flow 300 of FIG. 3. FIG. 10 illustrates example embodiments where the providing operation 320 may include at least one additional operation. Additional operations may include an operation 1002.

The operation 1002 illustrates providing a readiness determination of the fuel cell system by comparing the monitored state of readiness of the fuel cell system to an established operating readiness state, the established operating readiness state a variable function of at least one characteristic of the nuclear reactor system. For example, as shown in FIGS. 1A through 2L, in response to a signal transmitted by the monitoring system 102, a readiness determination system 112 may provide a readiness determination of the fuel cell system 106 by comparing the monitored state of readiness to an established state of readiness, wherein the established state of readiness is a variable function of a characteristic of the nuclear reactor system 108.

Figure 11:
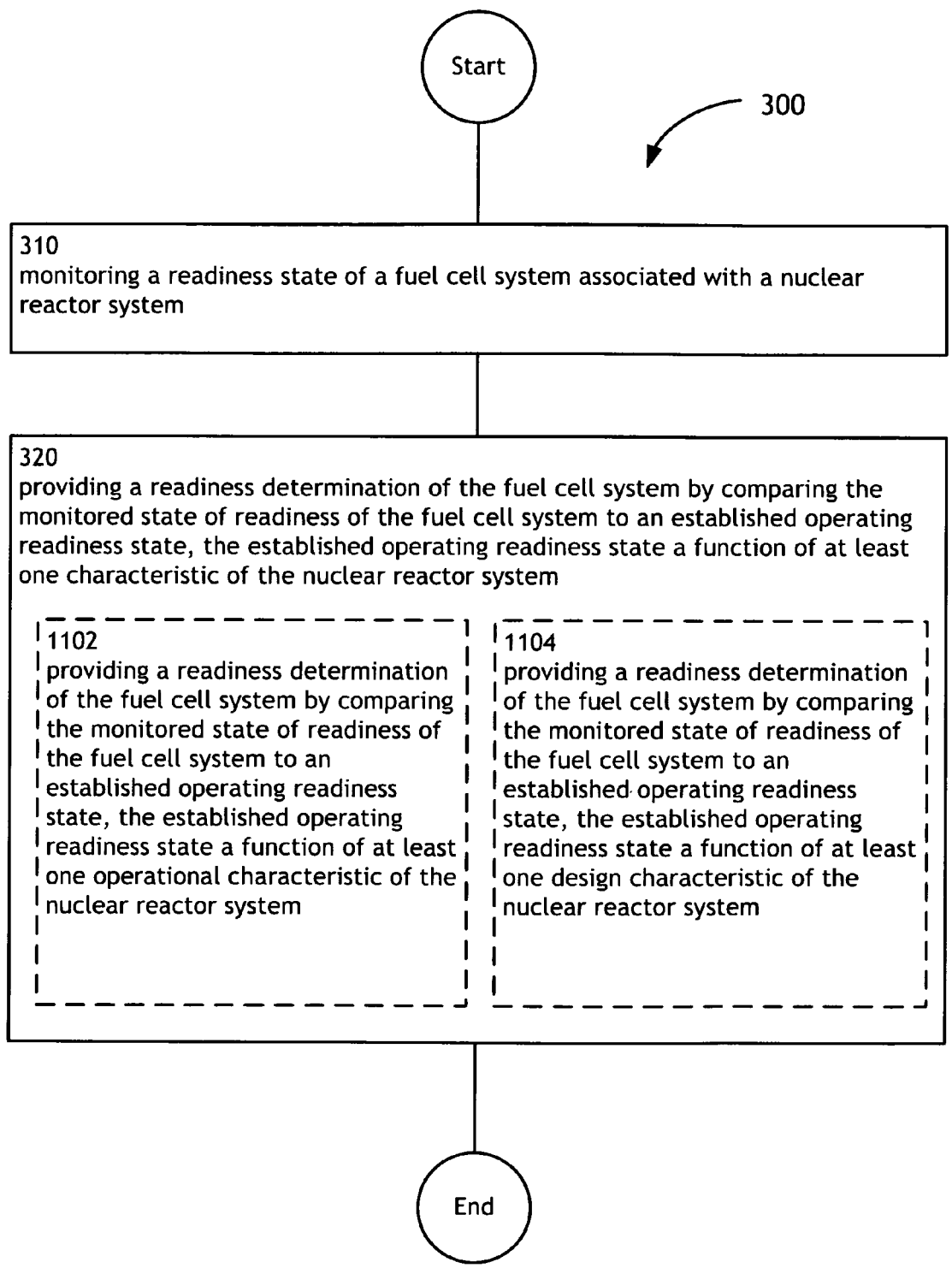

FIG. 11 illustrates alternative embodiments of the example operational flow 300 of FIG. 3. FIG. 11 illustrates example embodiments where the providing operation 320 may include at least one additional operation. Additional operations may include an operation 1102 and/or an operation 1104.

The operation 1102 illustrates providing a readiness determination of the fuel cell system by comparing the monitored state of readiness of the fuel cell system to an established operating readiness state, the established operating readiness state a function of at least one operational characteristic of the nuclear reactor system. For example, as shown in FIGS. 1A through 2L, in response to a signal transmitted by the monitoring system 102, a readiness determination system 112 may provide a readiness determination of the fuel cell system 106 by comparing the monitored state of readiness to an established state of readiness, wherein the established state of readiness is a function of an operational characteristic of the nuclear reactor system 108. For instance, in response to a signal transmitted by the monitoring system 102, a readiness determination system 112 may provide a readiness determination of the fuel cell system 106 by comparing the monitored state of readiness to an established state of readiness, wherein the established state of readiness is a function of the operating temperature of the nuclear reactor core of the nuclear reactor system 108.

The operation 1104 illustrates providing a readiness determination of the fuel cell system by comparing the monitored state of readiness of the fuel cell system to an established operating readiness state, the established operating readiness state a function of at least one design characteristic of the nuclear reactor system. For example, as shown in FIGS. 1A through 2L, in response to a signal transmitted by the monitoring system 102, a readiness determination system 112 may provide a readiness determination of the fuel cell system 106 by comparing the monitored state of readiness to an established state of readiness, wherein the established state of readiness is a function of a design characteristic of the nuclear reactor system 108. For instance, in response to a signal transmitted by the monitoring system 102, a readiness determination system 112 may provide a readiness determination of the fuel cell system 106 by comparing the monitored state of readiness to an established state of readiness, wherein the established state of readiness is a function of the responsiveness of a safety system of a nuclear reactor system 108 to a design basis accident, such as guillotine break.

Figure 12:
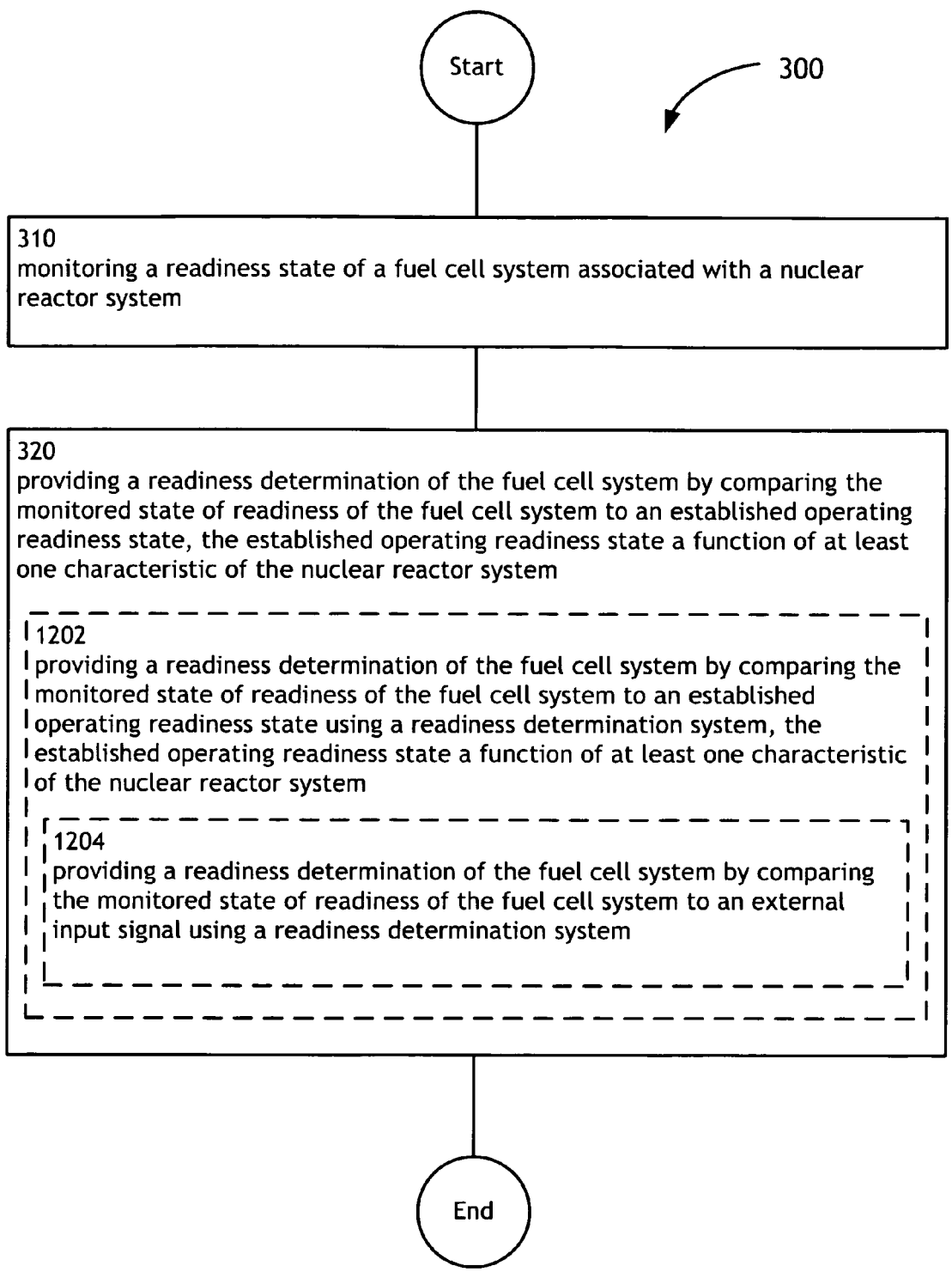

FIG. 12 illustrates alternative embodiments of the example operational flow 300 of FIG. 3. FIG. 12 illustrates example embodiments where the providing operation 320 may include at least one additional operation. Additional operations may include an operation 1202 and/or an operation 1204.

The operation 1202 illustrates providing a readiness determination of the fuel cell system by comparing the monitored state of readiness of the fuel cell system to an established operating readiness state using a readiness determination system, the established operating readiness state a function of at least one characteristic of the nuclear reactor system. For example, as shown in FIGS. 1A through 2L, in response to a signal transmitted by the monitoring system 102, a readiness determination system 112 (e.g., computer system configured to apply a preprogrammed algorithm in order to compare the monitored readiness state to an established readiness state) may provide a readiness determination of the fuel cell system 106 by comparing the monitored state of readiness to an established state of readiness, wherein the established state of readiness is a function of a characteristic of the nuclear reactor system 108.

Further, the operation 1204 illustrates providing a readiness determination of the fuel cell system by comparing the monitored state of readiness of the fuel cell system to an external input signal using a readiness determination system. For example, as shown in FIGS. 1A through 2L, in response to a signal transmitted by the monitoring system 102, a readiness determination system 112 may provide a readiness determination of the fuel cell system 106 by comparing the monitored state of readiness to an external input signal (e.g., signal from a safety system of the nuclear reactor system 108).

Figure 13:
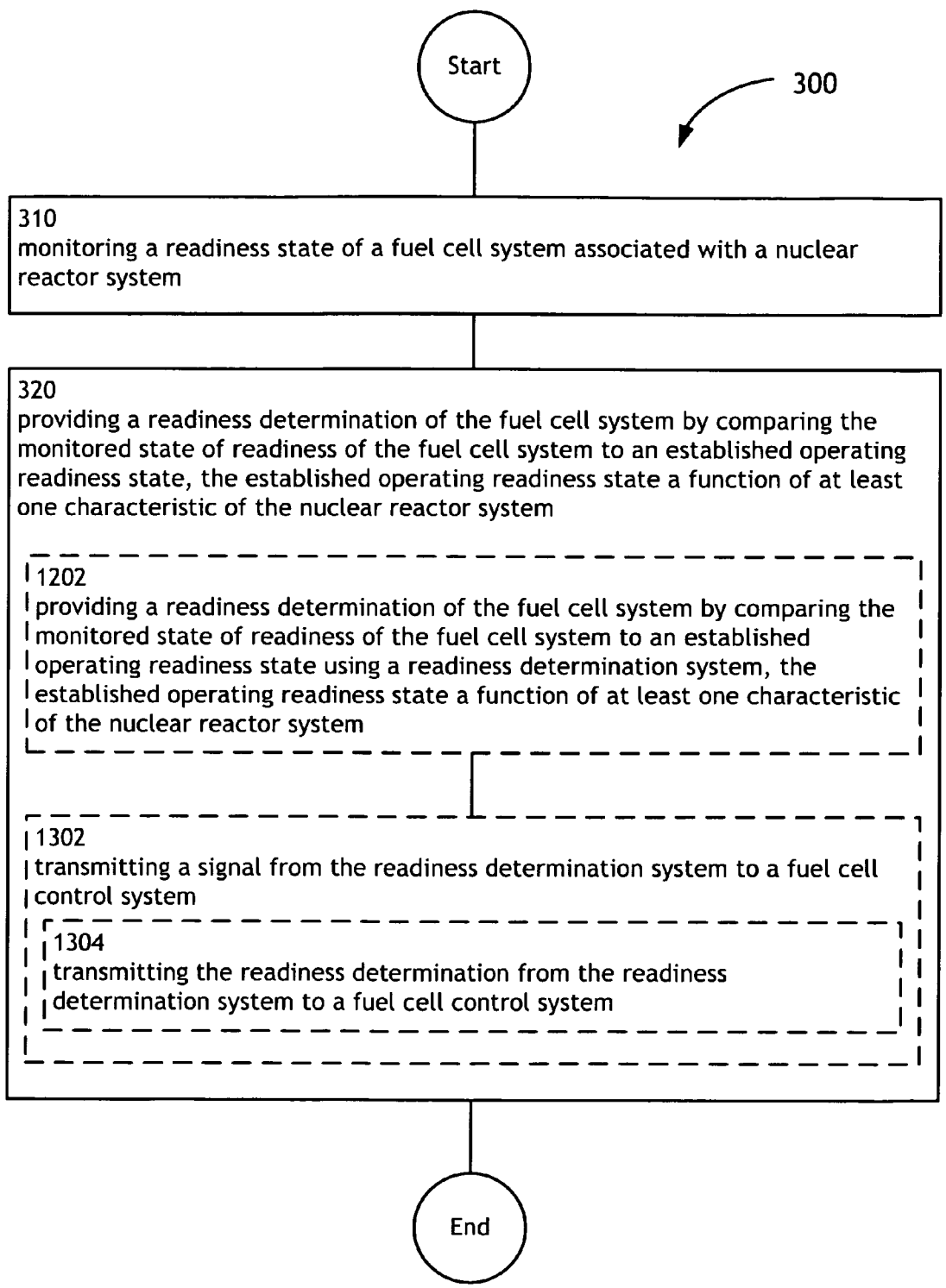

FIG. 13 illustrates alternative embodiments of the example operational flow 300 of FIG. 3. FIG. 13 illustrates example embodiments where the providing operation 320 may include at least one additional operation. Additional operations may include an operation 1302 and/or an operation 1304.

The operation 1302 illustrates transmitting a signal from the readiness determination system to a fuel cell control system. For example, as shown in FIGS. 1A through 2L, upon providing a readiness determination by comparing the monitored state of readiness of the fuel cell system 106 to an established state of readiness, the readiness determination system 112 may transmit a signal 111 to a fuel cell control system 116. For instance, a transmission module 164 of the readiness determination system 112 may transmit a signal 111 to the fuel cell control module 201.

Further, the operation 1304 illustrates transmitting the readiness determination from the readiness determination system to a fuel cell control system. For example, as shown in FIGS. 1A through 2L, upon providing a readiness determination by comparing the monitored state of readiness of the fuel cell system 106 to an established state of readiness, the readiness determination system 112 may transmit the readiness determination or a signal 111 indicative of the readiness determination to a fuel cell control system 116. For instance, a transmission module 164 of the readiness determination system 112 may transmit a signal 111 indicative of the readiness determination to the fuel cell control module 201.

Figure 14:
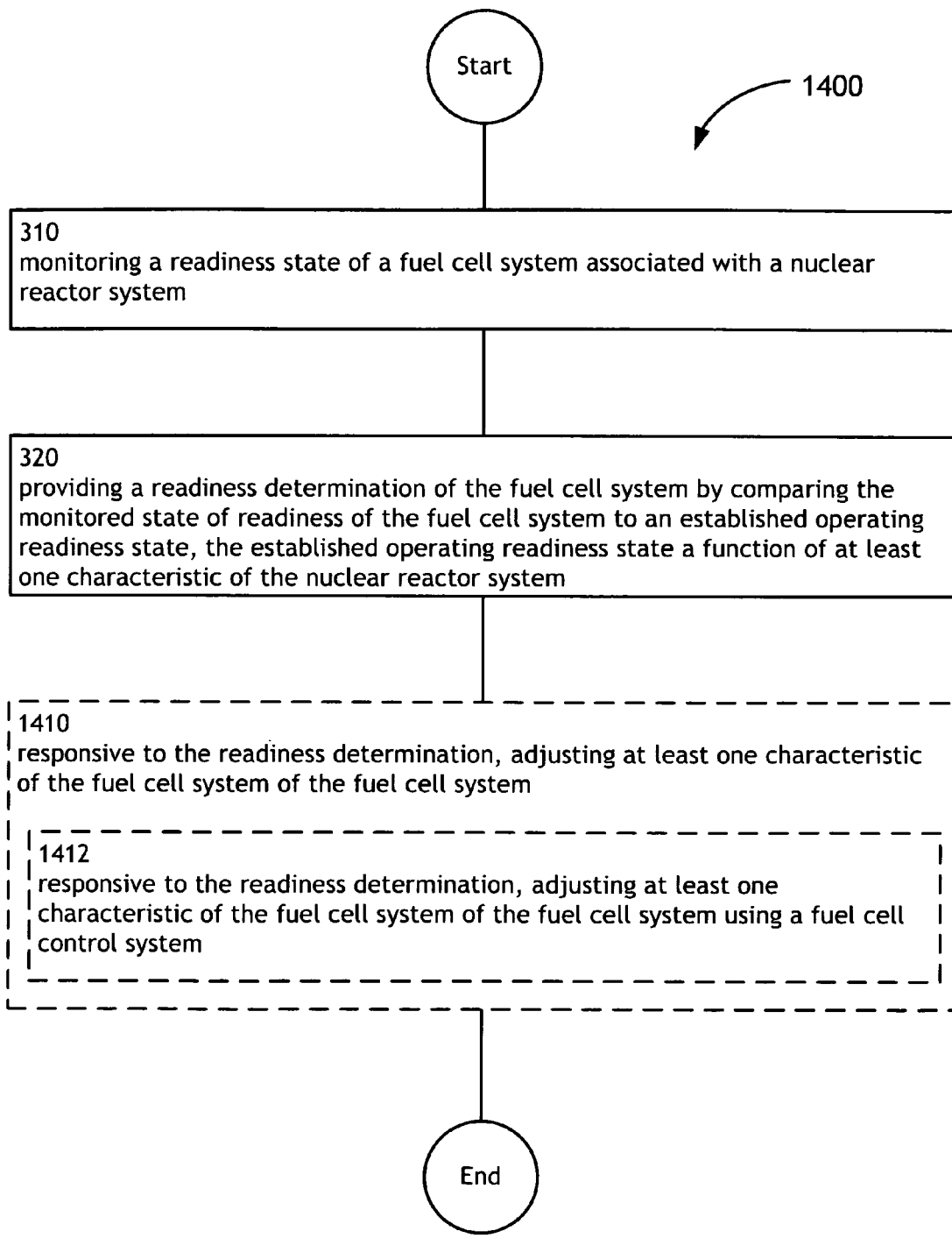

FIG. 14 illustrates an operational flow 1400 representing example operations related to determining a state of operational readiness of a fuel cell backup system of a nuclear reactor system. FIG. 14 illustrates an example embodiment where the example operational flow 300 of FIG. 3 may include at least one additional operation. Additional operations may include an operation 1410, and/or an operation 1412.

After a start operation, a monitoring operation 310, and a providing operation 320, the operational flow 1400 moves to a adjusting operation 1410. The adjusting operation 1410 illustrates, responsive to the readiness determination, adjusting at least one characteristic of the fuel cell system. For example, as shown in FIGS. 1A through 2L, in response to the readiness, one or more characteristics (e.g., temperature, pressure, or electrical characteristics) may be adjusted.

The operation 1412 illustrates, responsive to the readiness determination, adjusting at least one characteristic of the fuel cell system using a fuel cell control system. For example, as shown in FIGS. 1A through 2L, in response to a signal 111 indicative of the readiness determination transmitted by the readiness determination system 112, the fuel cell control system 116 may adjust one or more characteristics of the fuel cell system 106.

Figure 15:
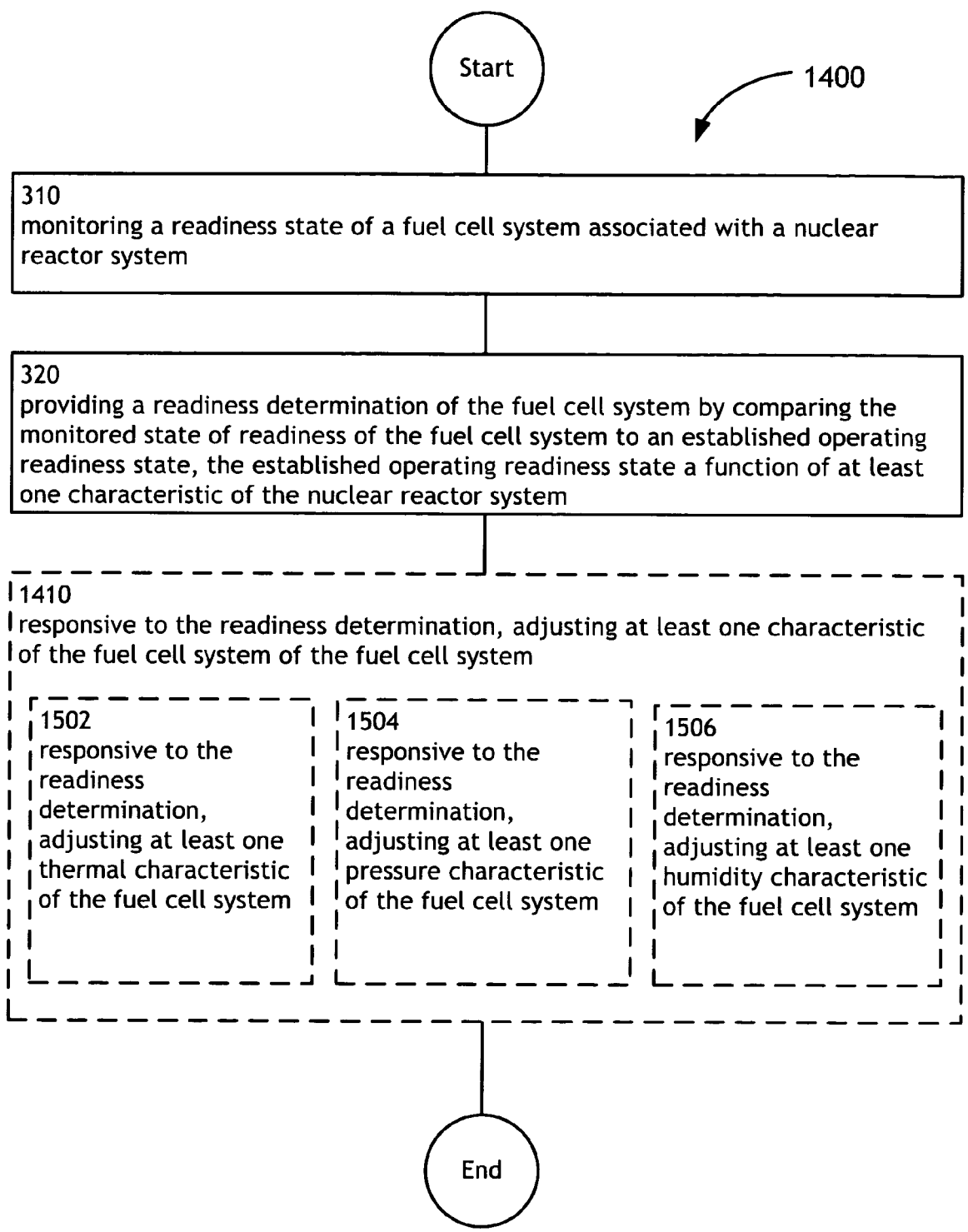

FIG. 15 illustrates alternative embodiments of the example operational flow 1400 of FIG. 14. FIG. 15 illustrates example embodiments where the adjusting operation 1410 may include at least one additional operation. Additional operations may include an operation 1502, an operation 1504, and/or an operation 1506.

The operation 1502 illustrates responsive to the readiness determination, adjusting at least one thermal characteristic of the fuel cell system. For example, as shown in FIGS. 1A through 2L, in response to a signal 111 indicative of the readiness determination transmitted by the readiness determination system 112, the fuel cell control system 116 may adjust the temperature of a portion of the fuel cell system 106. For instance, a fuel cell control system 116 may adjust the temperature of a fuel cell membrane of one or more fuel cells 122 of the fuel cell system 106. In another instance, a fuel cell control system 116 may adjust the temperature of one or more of the reactant gas streams of the fuel cell system 106.

The operation 1504, responsive to the readiness determination, adjusting at least one pressure characteristic of the fuel cell system. For example, as shown in FIGS. 1A through 2L, in response to a signal 111 indicative of the readiness determination transmitted by the readiness determination system 112, the fuel cell control system 116 may adjust the pressure in a portion of the fuel cell system 106. For instance, a fuel cell control system 116 may adjust the pressure in a fuel cell 122 of the fuel cell system 106. In another instance, a fuel cell control system 116 may adjust the pressure of one or more of the reactant gas streams of the fuel cell system 106.

The operation 1506 illustrates, responsive to the readiness determination, adjusting at least one humidity characteristic of the fuel cell system. For example, as shown in FIGS. 1A through 2L, in response to a signal 111 indicative of the readiness determination transmitted by the readiness determination system 112, the fuel cell control system 116 may adjust the humidity level in a portion of the fuel cell system 106. For instance, a fuel cell control system 116 may adjust the humidity level in a fuel cell 122 of the fuel cell system 106. In another instance, a fuel cell control system 116 may adjust the humidity level of one or more of the reactant gas streams of the fuel cell system 106.

Figure 16:
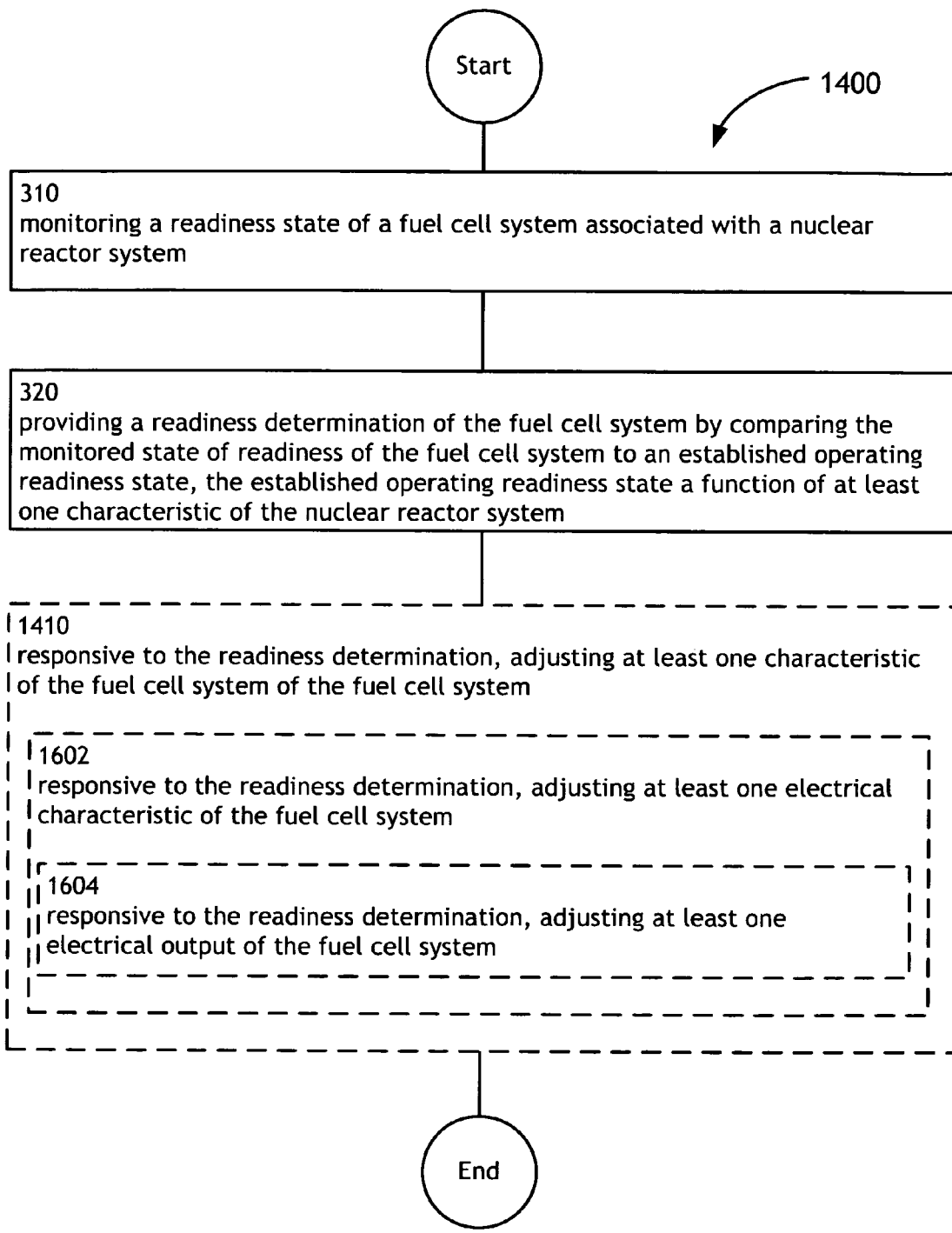

FIG. 16 illustrates alternative embodiments of the example operational flow 1400 of FIG. 14. FIG. 16 illustrates example embodiments where the adjusting operation 1410 may include at least one additional operation. Additional operations may include an operation 1602, and/or an operation 1604.

The operation 1602 illustrates, responsive to the readiness determination, adjusting at least one electrical characteristic of the fuel cell system. For example, as shown in FIGS. 1A through 2L, in response to a signal 111 indicative of the readiness determination transmitted by the readiness determination system 112, the fuel cell control system 116 may adjust an electrical characteristic of a portion of the fuel cell system 106. For instance, a fuel cell control system 116 may adjust an electrical characteristic of one or more fuel cells 122 of the fuel cell system 106.

The operation 1604, responsive to the readiness determination, adjusting at least one electrical output of the fuel cell system. For example, as shown in FIGS. 1A through 2L, in response to a signal 111 indicative of the readiness determination transmitted by the readiness determination system 112, the fuel cell control system 116 may adjust an electrical characteristic of a portion of the fuel cell system 106. For instance, a fuel cell control system 116 may adjust the electrical current output of one or more fuel cells 122 of the fuel cell system 106. In another instance, a fuel cell control system 116 may adjust the voltage of one or more fuel cells 122 of the fuel cell system 106.

Figure 17A:
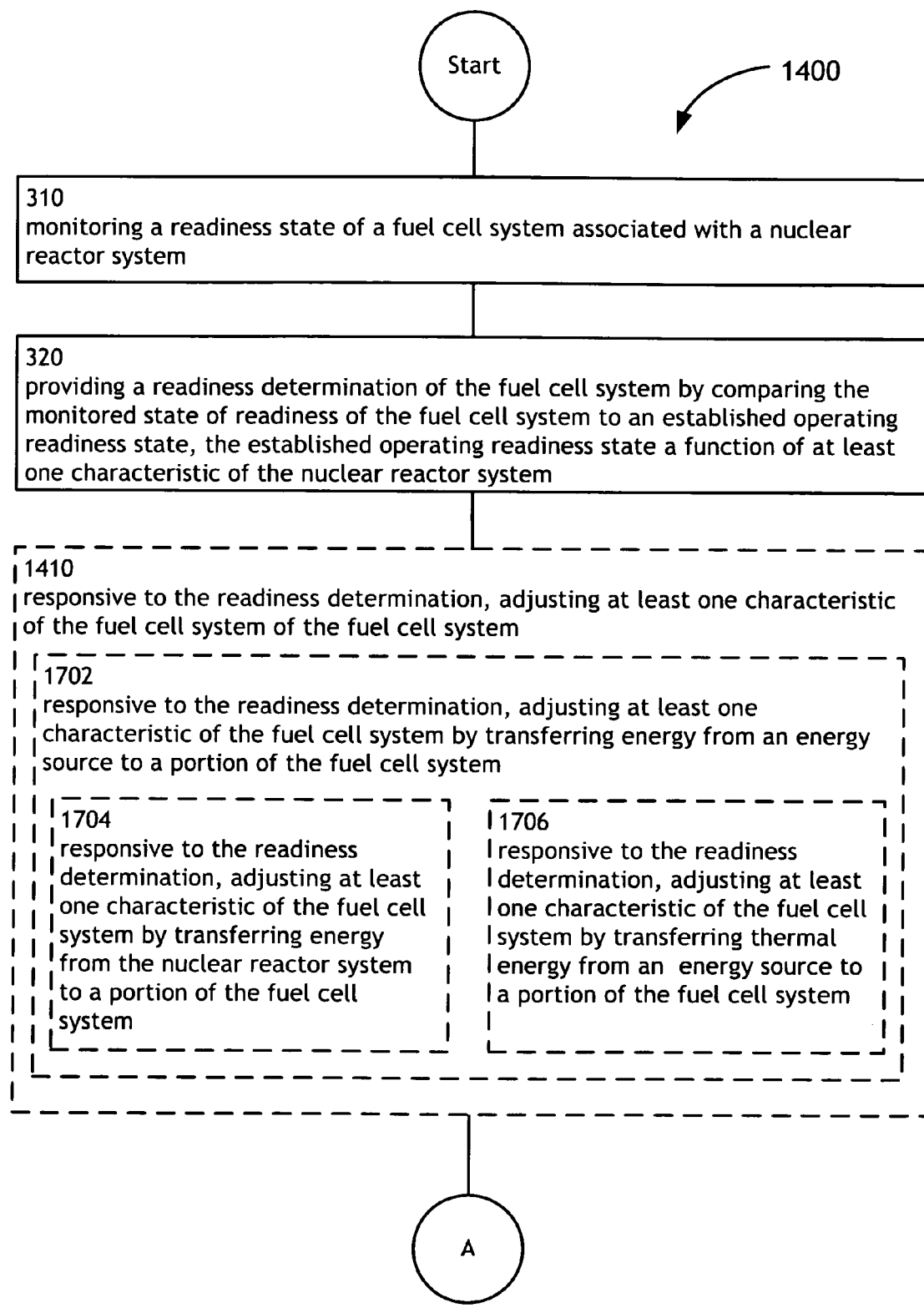
Figure 17B:
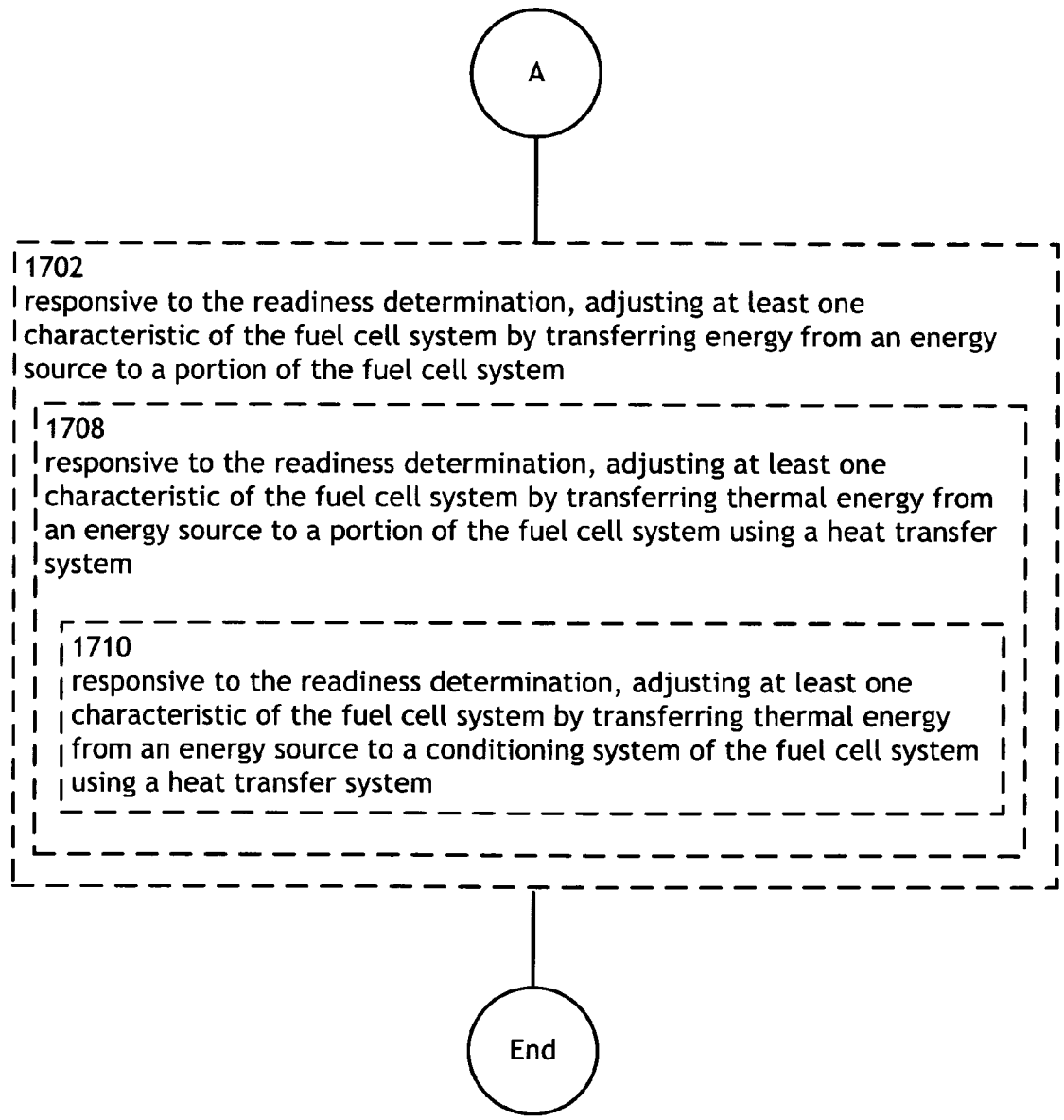

FIGS. 17A and 17B illustrate alternative embodiments of the example operational flow 1400 of FIG. 14. FIGS. 17A and 17B illustrate example embodiments where the adjusting operation 1410 may include at least one additional operation. Additional operations may include an operation 1702, an operation 1704, an operation 1706, and operation 1708 and/or an operation 1710.

The operation 1702 illustrates, responsive to the readiness determination, adjusting at least one characteristic of the fuel cell system by transferring energy from an energy source to a portion of the fuel cell system. For example, as shown in FIGS. 1A through 2L, in response to a signal 111 indicative of the readiness determination transmitted by the readiness determination system 112, the fuel cell control system 116 may adjust a characteristic of the fuel cell system 106 by transferring energy from an energy source 208 (e.g., nuclear reactor system 108 or an additional non-nuclear reactor source 222) to a portion of the fuel cell 106 (e.g., portion of fuel cell block 117 or conditioning system 228) utilizing an energy transfer system 202. For instance, the energy transfer system 202 of the fuel cell control system 116 may transfer energy (e.g., thermal or electrical) from an energy source 208 to the reactant conditioning system of the fuel cell system 106 in order to heat or cool one or more of the reactants of the fuel cell system 106 so as to adjust a temperature of one or both of the reactant streams of the fuel cell system 106 within in an acceptable temperature range.

Further, the operation 1704 illustrates, responsive to the readiness determination, adjusting at least one characteristic of the fuel cell system by transferring energy from the nuclear reactor system to a portion of the fuel cell system. For example, as shown in FIGS. 1A through 2L, in response to a signal 111 indicative of the readiness determination transmitted by the readiness determination system 112, the fuel cell control system 116 may adjust a characteristic of the fuel cell system 106 by transferring energy from a portion of the nuclear reactor system 108 (e.g., portion of the coolant system 212 or portion of the heat rejection loop 218) to a portion of the fuel cell 106 (e.g., portion of fuel cell block 117 or conditioning system 228) utilizing an energy transfer system 202.

Further, the operation 1706 illustrates, responsive to the readiness determination, adjusting at least one characteristic of the fuel cell system by transferring thermal energy from an energy source to a portion of the fuel cell system. For example, as shown in FIGS. 1A through 2L, in response to a signal 111 indicative of the readiness determination transmitted by the readiness determination system 112, the fuel cell control system 116 may adjust a characteristic of the fuel cell system 106 by transferring thermal energy from a portion of the nuclear reactor system 108 (e.g., portion of the coolant system 212 or portion of the heat rejection loop 218) to a portion of the fuel cell 106 (e.g., portion of fuel cell block 117 or conditioning system 228) utilizing an energy transfer system 202.

Further, the operation 1708 illustrates, responsive to the readiness determination, adjusting at least one characteristic of the fuel cell system by transferring thermal energy from an energy source to a portion of the fuel cell system using a heat transfer system. For example, as shown in FIGS. 1A through 2L, in response to a signal 111 indicative of the readiness determination transmitted by the readiness determination system 112, the fuel cell control system 116 may adjust a characteristic of the fuel cell system 106 by transferring thermal energy from a portion of the nuclear reactor system 108 to a portion of the fuel cell system 106 utilizing a heat transfer system 236.

Further, the operation 1710 illustrates, responsive to the readiness determination, adjusting at least one characteristic of the fuel cell system by transferring thermal energy from an energy source to a conditioning system of the fuel cell system using a heat transfer system. For example, as shown in FIGS. 1A through 2L, in response to a signal 111 indicative of the readiness determination transmitted by the readiness determination system 112, the fuel cell control system 116 may adjust a characteristic of the fuel cell system 106 by transferring thermal energy from a portion of the nuclear reactor system 108 to a conditioning system 228 (e.g., humidity control system 230 or temperature control system 232) of the fuel cell system 106 utilizing a heat transfer system 236.

Figure 18:
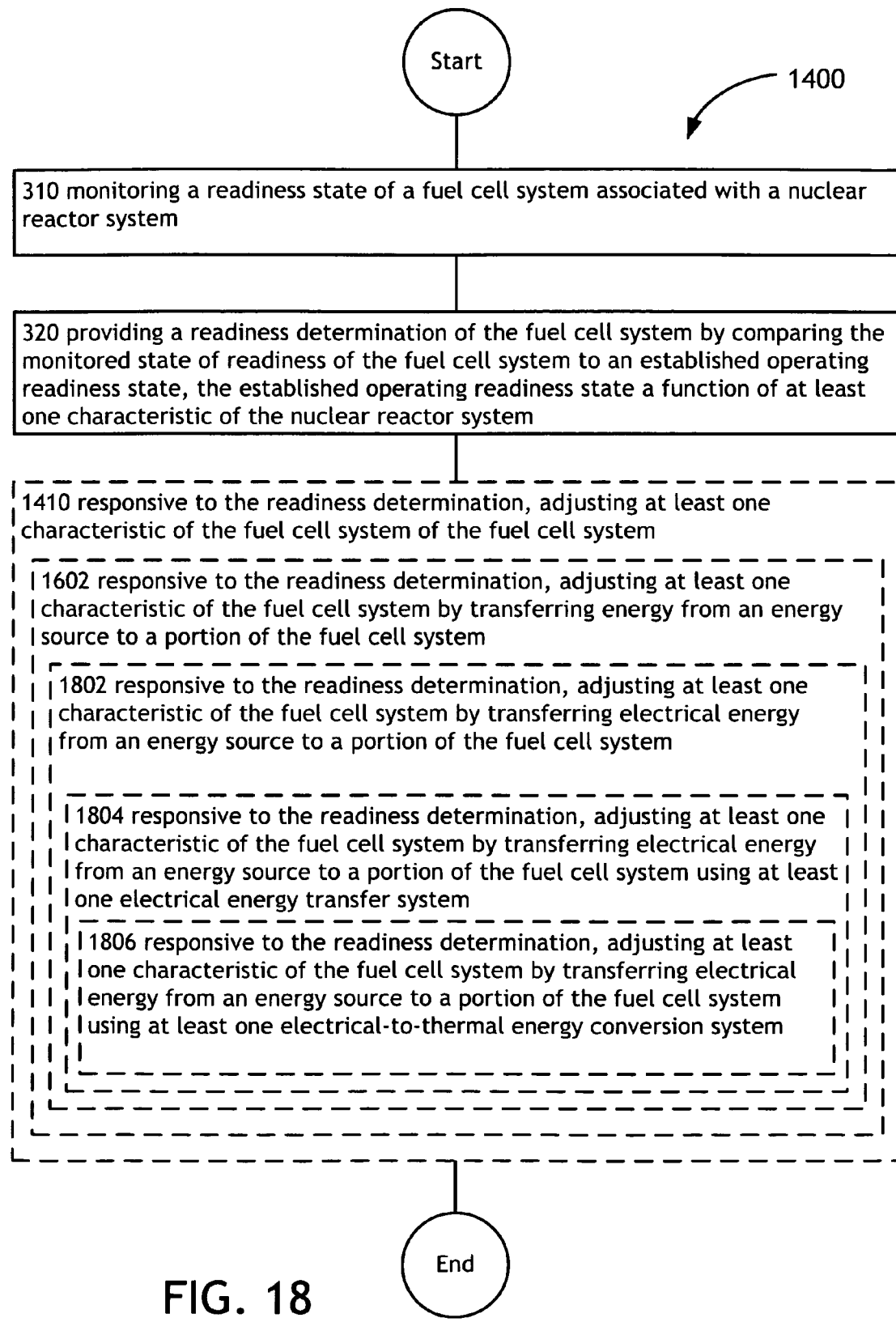
Figure 19:
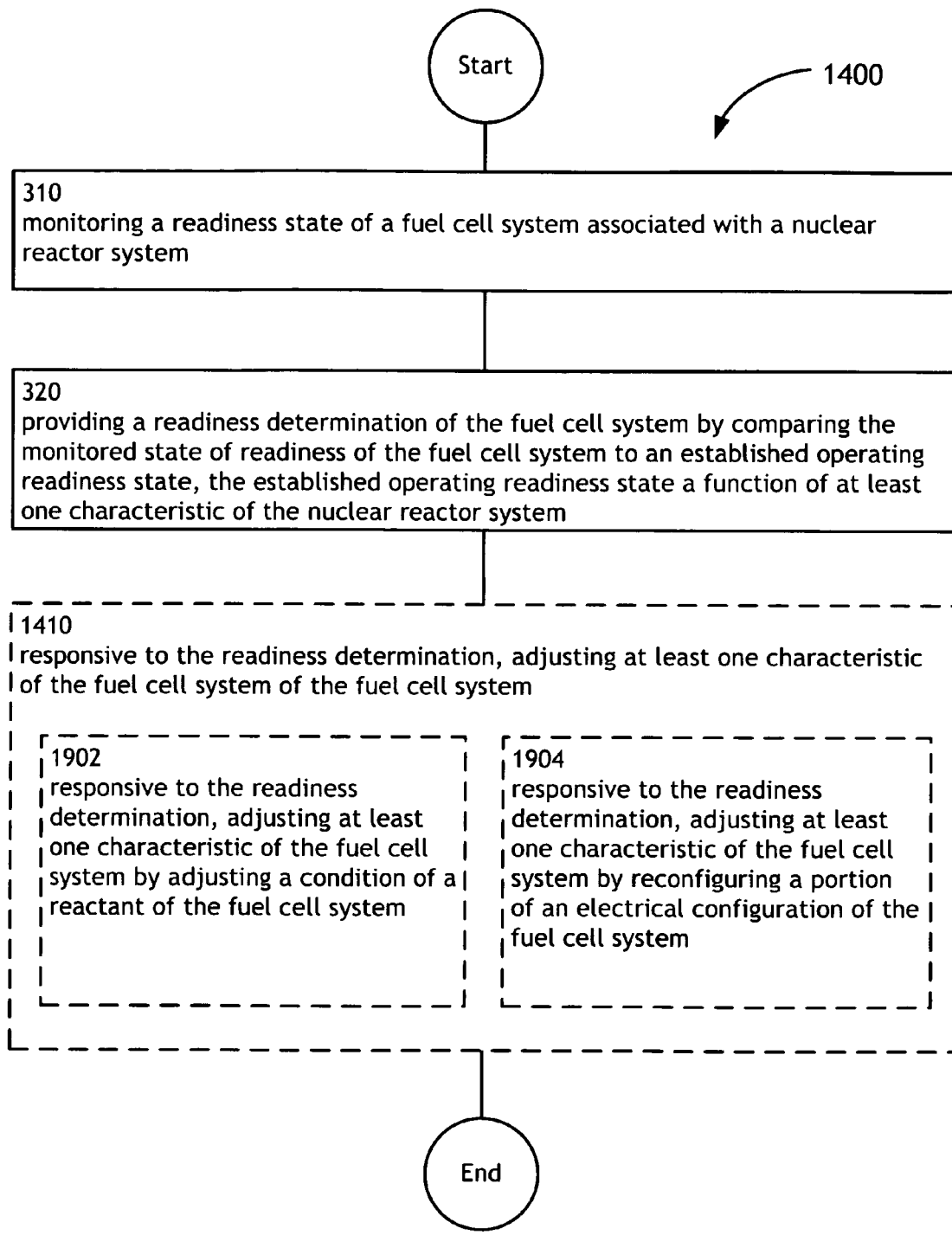

FIG. 18 illustrates alternative embodiments of the example operational flow 1400 of FIG. 14. FIG. 18 illustrates example embodiments where the adjusting operation 1410 may include at least one additional operation. Additional operations may include an operation 1802, an operation 1804, and operation 1808.

The operation 1802 illustrates, responsive to the readiness determination, adjusting at least one characteristic of the fuel cell system by transferring electrical energy from an energy source to a portion of the fuel cell system. For example, as shown in FIGS. 1A through 2L, in response to a signal 111 indicative of the readiness determination transmitted by the readiness determination system 112, the fuel cell control system 116 may adjust a characteristic of the fuel cell system 106 by transferring electrical energy from an energy source 208 (e.g., nuclear reactor system 108 or an additional non-nuclear reactor source 222) to a portion of the fuel cell 106 (e.g., portion of fuel cell block 117 or conditioning system 228).

Further, the operation 1804 illustrates, responsive to the readiness determination, adjusting at least one characteristic of the fuel cell system by transferring electrical energy from an energy source to a portion of the fuel cell system using at least one electrical energy transfer system. For example, as shown in FIGS. 1A through 2L, in response to a signal 111 indicative of the readiness determination transmitted by the readiness determination system 112, the fuel cell control system 116 may adjust a characteristic of the fuel cell system 106 by transferring electrical energy from an energy source 208 to a portion of the fuel cell 106 utilizing an electrical transfer system 238.

Further, the operation 1806 illustrates, responsive to the readiness determination, adjusting at least one characteristic of the fuel cell system by transferring electrical energy from an energy source to a portion of the fuel cell system using at least one electrical-to-thermal energy conversion system. For example, as shown in FIGS. 1A through 2L, in response to a signal 111 indicative of the readiness determination transmitted by the readiness determination system 112, the fuel cell control system 116 may adjust a characteristic of the fuel cell system 106 by transferring electrical energy from an energy source 208 to a portion of the fuel cell 106 utilizing an electrical-to-thermal conversion system 240 (e.g., resistive heating device).

FIG. 18 illustrates alternative embodiments of the example operational flow 1400 of FIG. 14. FIG. 18 illustrates example embodiments where the adjusting operation 1410 may include at least one additional operation. Additional operations may include an operation 1802, an operation 1804, and operation 1808.

The operation 1902 illustrates, responsive to the readiness determination, adjusting at least one characteristic of the fuel cell system by adjusting a condition of a reactant of the fuel cell system. For example, as shown in FIGS. 1A through 2L, in response to a signal 111 indicative of the readiness determination transmitted by the readiness determination system 112, the fuel cell control system 116 may adjust a characteristic of the fuel cell system 106 by adjusting a condition of one more of the reactants utilizing a reactant control system 204 (e.g., reactant pump control system 248 or reactant valve control system 250).

Further, the operation 1904 illustrates, responsive to the readiness determination, adjusting at least one characteristic of the fuel cell system by reconfiguring a portion of an electrical configuration of the fuel cell system. For example, as shown in FIGS. 1A through 2L, in response to a signal 111 indicative of the readiness determination transmitted by the readiness determination system 112, the fuel cell control system 116 may adjust a characteristic of the fuel cell system 106 by reconfiguring a portion of an electrical configuration of the fuel cell system 106 utilizing a configuration control system 206 (e.g., switching circuitry 264 or a relay system 268).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention claimed is:

1. An apparatus, comprising:
   a nuclear reactor;
   a fuel cell associated with the nuclear reactor;
   a fuel cell monitoring system monitoring a readiness state of the fuel cell associated with the nuclear reactor;
   a readiness determination system;
   a fuel cell control system including a heat transfer system, the heat transfer system including a heat supply loop, the heat supply loop in thermal communication with a waste heat rejection loop of the nuclear reactor to selectively transfer thermal energy from the waste heat rejection loop of the nuclear reactor to a portion of the fuel cell, in response to one or more signals from the readiness determination system, to establish an operating readiness state condition of the fuel cell within a set of readiness parameters in response to a monitored temperature of the core of the nuclear reactor from a nuclear reactor monitoring system by increasing the temperature of the fuel cell,
   wherein the readiness determination system includes one or more processors communicatively coupled to the fuel cell control system and the fuel cell monitoring system, the one or more processors configured to:
      provide a readiness determination of the fuel cell by comparing the monitored state of readiness of the fuel cell to an established operating readiness state condition, the established operating readiness state condition being a function of at least one characteristic of the nuclear reactor; and
      transmit one or more signals indicative of the readiness determination to the fuel cell control system so as to direct the fuel cell control system to selectively transfer thermal energy from the waste heat rejection loop of the nuclear reactor to a portion of the fuel cell via the heat supply loop.

2. The apparatus of claim 1, wherein the operating readiness state condition is a variable function of a characteristic of the nuclear reactor.

3. The apparatus of claim 1, wherein the fuel cell monitoring system configured to monitor a readiness state condition of a fuel cell system associated with a nuclear reactor system comprises:
   a fuel cell monitoring system configured to periodically monitor a readiness state condition of a fuel cell system associated with a nuclear reactor system.

4. The apparatus of claim 1, wherein the fuel cell monitoring system configured to monitor a readiness state of a fuel cell system associated with a nuclear reactor system comprises:
a fuel cell monitoring system configured to continuously monitor a readiness state of a fuel cell system associated with a nuclear reactor system.

5. The apparatus of claim 1, wherein the fuel cell monitoring system configured to monitor a readiness state of a fuel cell system associated with a nuclear reactor system comprises:
a fuel cell monitoring system configured to comparatively monitor a readiness state of a fuel cell system associated with a nuclear reactor system.

6. The apparatus of claim 1, wherein the fuel cell monitoring system comprises:
a fuel cell monitoring system monitoring a readiness state condition of a fuel cell associated with a nuclear reactor in response to an adjusted characteristic of the nuclear reactor.

7. The apparatus of claim 1, wherein the fuel cell monitoring system comprises:
a thermocouple device monitoring a thermal characteristic of a fuel cell associated with a nuclear reactor.

8. The apparatus of claim 1, wherein the fuel cell monitoring system comprises:
a pressure monitoring system monitoring a pressure characteristic of a fuel cell associated with a nuclear reactor.

9. The apparatus of claim 1, wherein the fuel cell monitoring system comprises:
a humidity monitoring system monitoring a humidity characteristic of a fuel cell associated with a nuclear reactor.

10. The apparatus of claim 1, wherein the fuel cell monitoring system comprises:
an electrical monitoring system monitoring an electrical characteristic of a fuel cell associated with a nuclear reactor.

11. The apparatus of claim 10, wherein the electrical monitoring system comprises:
an electrical monitoring system monitoring an electrical current output level of a fuel cell associated with a nuclear reactor.

12. The apparatus of claim 10, wherein the electrical monitoring system comprises:
an electrical monitoring system monitoring a voltage output of a fuel cell associated with a nuclear reactor.

13. The apparatus of claim 10, wherein the electrical monitoring system comprises:
an electrical monitoring system monitoring an electrical resistance of a fuel cell associated with a nuclear reactor.

14. The apparatus of claim 10, wherein the electrical monitoring system comprises:
an electrical monitoring system monitoring a capacitance of a fuel cell associated with a nuclear reactor.

15. The apparatus of claim 1, wherein the fuel cell monitoring system comprises:
a fuel cell monitoring system transmitting a signal from the fuel cell monitoring system to the readiness determination system.

16. The apparatus of claim 15, wherein the fuel cell monitoring system comprises:
a fuel cell monitoring system transmitting the monitored state of readiness from the fuel cell monitoring system to at least one readiness determination system.

17. The apparatus of claim 1, wherein the fuel cell monitoring system comprises:
a fuel cell monitoring system transmitting a signal from the fuel cell monitoring system to a computer data management system.

18. The apparatus of claim 1, wherein the fuel cell monitoring system comprises:
a fuel cell monitoring system transmitting a signal from the fuel cell monitoring system to an operator.

19. The apparatus of claim 1, wherein the fuel cell monitoring system comprises:
a fuel cell monitoring system transmitting a signal from a fuel cell monitoring system to a fuel cell safety system.

20. The apparatus of claim 1, wherein the one or more processors of the readiness determination system are further configured to:
provide a readiness determination of the fuel cell by comparing the monitored state of readiness of the fuel cell to an established operating readiness state, the established operating readiness state a function of at least one operational characteristic of the nuclear reactor.

21. The apparatus of claim 1, wherein the one or more processors of the readiness determination system are further configured to:
provide a readiness determination of the fuel cell by comparing the monitored state of readiness of the fuel cell to an established operating readiness state condition, the established operating readiness state condition a function of at least one design characteristic of the nuclear reactor.

22. The apparatus of claim 1, wherein the one or more processors of the readiness determination system are further configured to:
provide a readiness determination of the fuel cell by comparing the monitored state of readiness of the fuel cell to an external input signal.

23. The apparatus of claim 1, wherein the fuel cell control system is configured to:
adjust at least one pressure characteristic of the fuel cell in response to the readiness determination.

24. The apparatus of claim 1, wherein the fuel cell control system is further configured to:
adjust at least one humidity characteristic of the fuel cell in response to the readiness determination.

25. The apparatus of claim 1, wherein the fuel cell control system is further configured to:
adjust at least one electrical characteristic of the fuel cell in response to the readiness determination.

26. The apparatus of claim 25, wherein the fuel cell control system is further configured to:
adjust at least one electrical output of the fuel cell in response to the readiness determination.

27. The apparatus of claim 1, wherein the fuel cell control system is further configured to:
adjust at least one characteristic of the fuel cell system by transferring energy from an energy source to a portion of the fuel cell in response to the readiness determination.

28. The apparatus of claim 1, wherein the heat supply loop selectively transfers thermal energy from the waste heat rejection loop of the nuclear reactor to a conditioning system of the fuel cell in response to one or more signals from the readiness determination system.

29. The apparatus of claim 1, wherein the fuel cell control system includes a reactant control system.

30. The apparatus of claim 29, wherein the reactant control system adjusts at least one characteristic of the fuel cell by adjusting a condition of a reactant of the fuel cell.

31. The apparatus of claim 30, wherein the reactant control system includes a reactant supply control system, wherein the reactant supply control system adjusts at least one characteristic of the fuel cell by adjusting a supply condition of a reactant of the fuel cell.

32. The apparatus of claim 30, wherein the reactant control system includes a reactant pump control system.

33. The apparatus of claim 30, wherein the reactant control system includes a reactant valve control system.

34. The apparatus of claim 1, wherein the fuel cell control system adjusts at least one characteristic of the fuel cell system by reconfiguring a portion of an electrical configuration of two or more fuel cells in response to the readiness determination.

35. The apparatus of claim 34, wherein the fuel cell control system includes a configuration control system, wherein the configuration control system adjusts at least one characteristic of two or more fuel cells by reconfiguring a portion of an electrical configuration the two or more fuel cells in response to the readiness determination.

36. The apparatus of claim 35, wherein the configuration control system includes configuration control circuitry.

37. The apparatus of claim 1, wherein the fuel cell comprises:
a polymer electrolyte membrane fuel cell.

38. The apparatus of claim 1, wherein the fuel cell system comprises:
a solid oxide fuel cell system.

39. The apparatus of claim 1, wherein the fuel cell system comprises:
an alkaline fuel cell system.

40. The apparatus of claim 1, wherein the fuel cell system comprises:
a molten carbonate fuel cell system.

* * * * *